(12) United States Patent  (10) Patent No.: US 8,180,735 B2
Ansari et al.  (45) Date of Patent: May 15, 2012

(54) MANAGED FILE BACKUP AND RESTORE AT REMOTE STORAGE LOCATIONS THROUGH MULTI-SERVICES GATEWAY AT USER PREMISES

(75) Inventors: Amir Ansari, Plano, TX (US); George A. Cowgill, Farmersville, TX (US); Leon E. Nicholls, Plano, TX (US); Atousa Raissyan, Potomac, MD (US); Jude P. Ramayya, Wylie, TX (US); Ramprakash Masina, Wylie, TX (US); Alvin R. McQuarters, Euless, TX (US)

(73) Assignee: Prodea Systems, Inc., Plano, TX (US)

( * ) Notice: Subject to any disclaimer, the term of this patent is extended or adjusted under 35 U.S.C. 154(b) by 82 days.

(21) Appl. No.: 12/521,756

(22) PCT Filed: Sep. 7, 2007

(86) PCT No.: PCT/US2007/019483
§ 371 (c)(1),
(2), (4) Date: Apr. 23, 2010

(87) PCT Pub. No.: WO2008/085201
PCT Pub. Date: Jul. 17, 2008

(65) Prior Publication Data
US 2010/0205152 A1   Aug. 12, 2010

Related U.S. Application Data

(60) Provisional application No. 60/882,865, filed on Dec. 29, 2006, provisional application No. 60/882,862, filed on Dec. 29, 2006.

(51) Int. Cl.
*G06F 17/30* (2006.01)

(52) U.S. Cl. .......... 707/640; 707/654; 726/12; 709/218; 709/219; 380/255

(58) Field of Classification Search .................. 707/640, 707/654, 999.204; 709/218, 219; 380/54, 380/255; 726/12
See application file for complete search history.

(56) References Cited

U.S. PATENT DOCUMENTS 6,301,609 B1   10/2001   Aravamuden et al.
(Continued)

FOREIGN PATENT DOCUMENTS

EP   1113659   7/2001
(Continued)

OTHER PUBLICATIONS

Duenas, Juan C. An End-to-End Service Provisioning scenario for the Residential Environment, IEEE Communications Magazine, Sep. 2005, pp. 94-100.

(Continued)

*Primary Examiner* — Leslie Wong
(74) *Attorney, Agent, or Firm* — Haynes and Boone, LLP

(57) ABSTRACT

The disclosed examples of a system for providing and managing backup and restore services of one or more endpoint devices include at least one gateway device at a user premises and a service management center. The gateway device has a first interface for enabling bi-directional communications with one or more of the endpoint devices associated with the gateway device, a second interface for enabling bi-directional communications for the one or more endpoint devices via a wide area network, and for enabling at least some bidirectional communications with at least one storage area external to the user premises via the wide area network. The gateway device also has a processor configured to manage backups and restores of data between the one or more of the endpoint devices and the at least one storage area. The service management center is external to the user premises and communicates with the gateway device via the wide area network, and controls access by the gateway device to the at least one storage area.

43 Claims, 28 Drawing Sheets

U.S. PATENT DOCUMENTS

| | | | |
|---|---|---|---|
| 6,487,646 | B1 | 11/2002 | Adams et al. |
| 6,526,581 | B1 | 2/2003 | Edson |
| 6,681,232 | B1 | 1/2004 | Sistanizadeh et al. |
| 6,735,619 | B1 | 5/2004 | Sawada |
| 6,850,979 | B1 | 2/2005 | Saulpaugh et al. |
| 6,871,193 | B1 | 3/2005 | Campbell |
| 6,898,276 | B1 | 5/2005 | Millet et al. |
| 6,930,598 | B2 | 8/2005 | Weiss |
| 6,957,275 | B1 | 10/2005 | Sekiguchi |
| 6,961,335 | B1 | 11/2005 | Millet et al. |
| 6,965,614 | B1 | 11/2005 | Osterhout et al. |
| 7,035,270 | B2 | 4/2006 | Moore, Jr. et al. |
| 7,075,919 | B1 | 7/2006 | Wendt et al. |
| 7,165,154 | B2 * | 1/2007 | Coombs et al. ............... 711/162 |
| 7,207,048 | B2 | 4/2007 | McQuillan et al. |
| 7,702,867 | B2 * | 4/2010 | Coombs et al. ............... 711/162 |
| 7,831,514 | B2 * | 11/2010 | Fujimoto ........................ 705/59 |
| 7,917,628 | B2 * | 3/2011 | Hesselink et al. ............ 709/227 |
| 7,934,251 | B2 * | 4/2011 | Hesselink et al. .............. 726/11 |
| 7,987,490 | B2 | 7/2011 | Ansari et al. |
| 2002/0023131 | A1 | 2/2002 | Wu et al. |
| 2002/0065894 | A1 | 5/2002 | Dalal et al. |
| 2002/0176404 | A1 | 11/2002 | Girard |
| 2002/0184358 | A1 | 12/2002 | Traversat et al. |
| 2002/0184620 | A1 | 12/2002 | Davies |
| 2003/0126207 | A1 | 7/2003 | Creamer et al. |
| 2003/0140103 | A1 | 7/2003 | Szeto et al. |
| 2003/0169752 | A1 | 9/2003 | Chen et al. |
| 2003/0210770 | A1 | 11/2003 | Krejcarek |
| 2004/0001480 | A1 | 1/2004 | Tanigawa et al. |
| 2004/0255048 | A1 | 12/2004 | Lev Ran et al. |
| 2004/0255326 | A1 | 12/2004 | Hicks, III et al. |
| 2005/0027887 | A1 | 2/2005 | Zimler et al. |
| 2005/0038875 | A1 | 2/2005 | Park |
| 2005/0108091 | A1 | 5/2005 | Sotak et al. |
| 2005/0216949 | A1 | 9/2005 | Candelora |
| 2005/0240680 | A1 | 10/2005 | Costa-Requena et al. |
| 2005/0249196 | A1 | 11/2005 | Ansari et al. |
| 2005/0257039 | A1 | 11/2005 | Marshall |
| 2006/0025132 | A1 | 2/2006 | Karaoguz et al. |
| 2006/0031406 | A1 | 2/2006 | Watson et al. |
| 2006/0040667 | A9 | 2/2006 | Coppinger et al. |
| 2006/0209857 | A1 | 9/2006 | Hicks, III |
| 2006/0259584 | A1 | 11/2006 | Watson et al. |
| 2006/0291506 | A1 | 12/2006 | Cain |
| 2007/0100981 | A1 | 5/2007 | Adamczyk et al. |
| 2008/0165789 | A1 | 7/2008 | Ansari et al. |
| 2008/0189774 | A1 | 8/2008 | Ansari et al. |
| 2009/0037382 | A1 | 2/2009 | Ansari et al. |
| 2009/0067441 | A1 | 3/2009 | Ansari et al. |
| 2009/0070229 | A1 | 3/2009 | Ansari et al. |
| 2009/0168787 | A1 | 7/2009 | Ansari et al. |
| 2010/0071053 | A1 | 3/2010 | Ansari et al. |
| 2010/0202450 | A1 | 8/2010 | Ansari et al. |
| 2010/0205301 | A1 | 8/2010 | Ansari et al. |
| 2010/0217837 | A1 | 8/2010 | Ansari et al. |
| 2010/0231790 | A1 | 9/2010 | Ansari et al. |
| 2010/0235433 | A1 | 9/2010 | Ansari et al. |
| 2010/0241711 | A1 | 9/2010 | Ansari et al. |
| 2010/0241748 | A1 | 9/2010 | Ansari et al. |

FOREIGN PATENT DOCUMENTS

| | | |
|---|---|---|
| WO | WO-2008/082441 | 7/2008 |
| WO | WO-2008/083384 | 7/2008 |
| WO | WO-2008/083385 | 7/2008 |
| WO | WO-2008/083387 | 7/2008 |
| WO | WO-2008/083391 | 7/2008 |
| WO | WO-2008/085201 | 7/2008 |
| WO | WO-2008/085202 | 7/2008 |
| WO | WO-2008/085203 | 7/2008 |
| WO | WO-2008/085204 | 7/2008 |
| WO | WO-2008/085205 | 7/2008 |
| WO | WO-2008/085206 | 7/2008 |
| WO | WO-2008/085207 | 7/2008 |
| WO | WO-2009/036088 | 3/2009 |
| WO | WO-2009/036185 | 3/2009 |
| WO | WO-2009/086134 | 7/2009 |

OTHER PUBLICATIONS

Intel, "Delivering on the Promise of Triple Play Digital Media," Technology Backgrounder, Consumer Electronics, 2004, pp. 1-4.

Yeon-Joo, Oh, et al. "Design of a SIP-based Real-time Visitor Conversation and Door Control Architecture using a Home Gateway." Consumer Electronics, 2006. ICCE '06. 2006 Digest of Technical Papers, International Conference, Las Vegas, NV, USA, IEEE, Jan. 7, 2006, pp. 187-188.

Ganguly, Arjit, et al. "IP over P2P: enabling self-configuring virtual IP networks for grid computing." In Parallel and Distributed Processing Symposium, 2006, IPDPS Apr. 25-29, 2006, retrieved on Jan. 20, 2010. Retrieved from the Internet: <URL:http://aarxiv.org/PS_cache/cs/pdf/0603/0603087v1.pdf.>.

PCT International Searching Authority—European Patent Office, PCT Written Opinion of the International Searching Authority mailed Oct. 30, 2008, International Application No. PCT/US2007/089237, filed Dec. 31, 2007, 15 pages.

PCT International Searching Authority—European Patent Office, PCT International Search Report mailed Aug. 27, 2008, International Application No. PCT/US2007/089237, filed Dec. 31, 2007, 6 pages.

PCT International Searching Authority—European Patent Office, PCT Written Opinion of the International Searching Authority mailed Jul. 17, 2008, International Application No. PCT/US2007/019543, filed Sep. 7, 2007, 5 pages.

PCT International Searching Authority—European Patent Office, PCT International Search Report mailed Jul. 17, 2008, International Application No. PCT/US2007/019543, filed Sep. 7, 2007, 1 page.

PCT International Searching Authority—European Patent Office, PCT Written Opinion of the International Searching Authority mailed Jul. 14, 2008, International Application No. PCT/US2007/019546, filed Sep. 7, 2007, 5 pages.

PCT International Searching Authority—European Patent Office, PCT International Search Report mailed Jul. 14, 2008, International Application No. PCT/US2007/019546, filed Sep. 7, 2007, 1 page.

PCT International Searching Authority—European Patent Office, PCT Written Opinion of the International Searching Authority mailed Apr. 25, 2008, International Application No. PCT/US2007/019531, filed Sep. 7, 2007, 7 pages.

PCT International Searching Authority—European Patent Office, PCT International Search Report mailed Apr. 25, 2008, International Application No. PCT/US2007/019531, filed Sep. 7, 2007, 1 page.

PCT International Searching Authority—European Patent Office, PCT Written Opinion of the International Searching Authority mailed Aug. 21, 2008, International Application No. PCT/US2007/019534, filed Sep. 7, 2007, 5 pages.

PCT International Searching Authority—European Patent Office, PCT International Search Report mailed Aug. 21, 2008, International Application No. PCT/US2007/019534, filed Sep. 7, 2007, 1 page.

PCT International Searching Authority—European Patent Office, PCT Written Opinion of the International Searching Authority mailed Aug. 25, 2008, International Application No. PCT/US2007/019545, filed Sep. 7, 2007, 5 pages.

PCT International Searching Authority—European Patent Office, PCT International Search Report mailed Aug. 25, 2008, International Application No. PCT/US2007/019545, filed Sep. 7, 2007, 1 page.

PCT International Searching Authority—European Patent Office, PCT Written Opinion of the International Searching Authority mailed Jul. 2, 2008, International Application No. PCT/US2007/019544, filed Sep. 7, 2007, 5 pages.

PCT International Searching Authority—European Patent Office, PCT International Search Report mailed Jul. 2, 2008, International Application No. PCT/US2007/019544, filed Sep. 7, 2007, 1 page.

PCT International Searching Authority—European Patent Office, PCT Written Opinion of the International Searching Authority mailed Mar. 14, 2008, International Application No. PCT/US2007/019533, filed Sep. 7, 2007, 7 pages.

PCT International Searching Authority—European Patent Office, PCT International Search Report mailed Mar. 14, 2008, International Application No. PCT/US2007/019533, filed Sep. 7, 2007, 1 page.

* cited by examiner

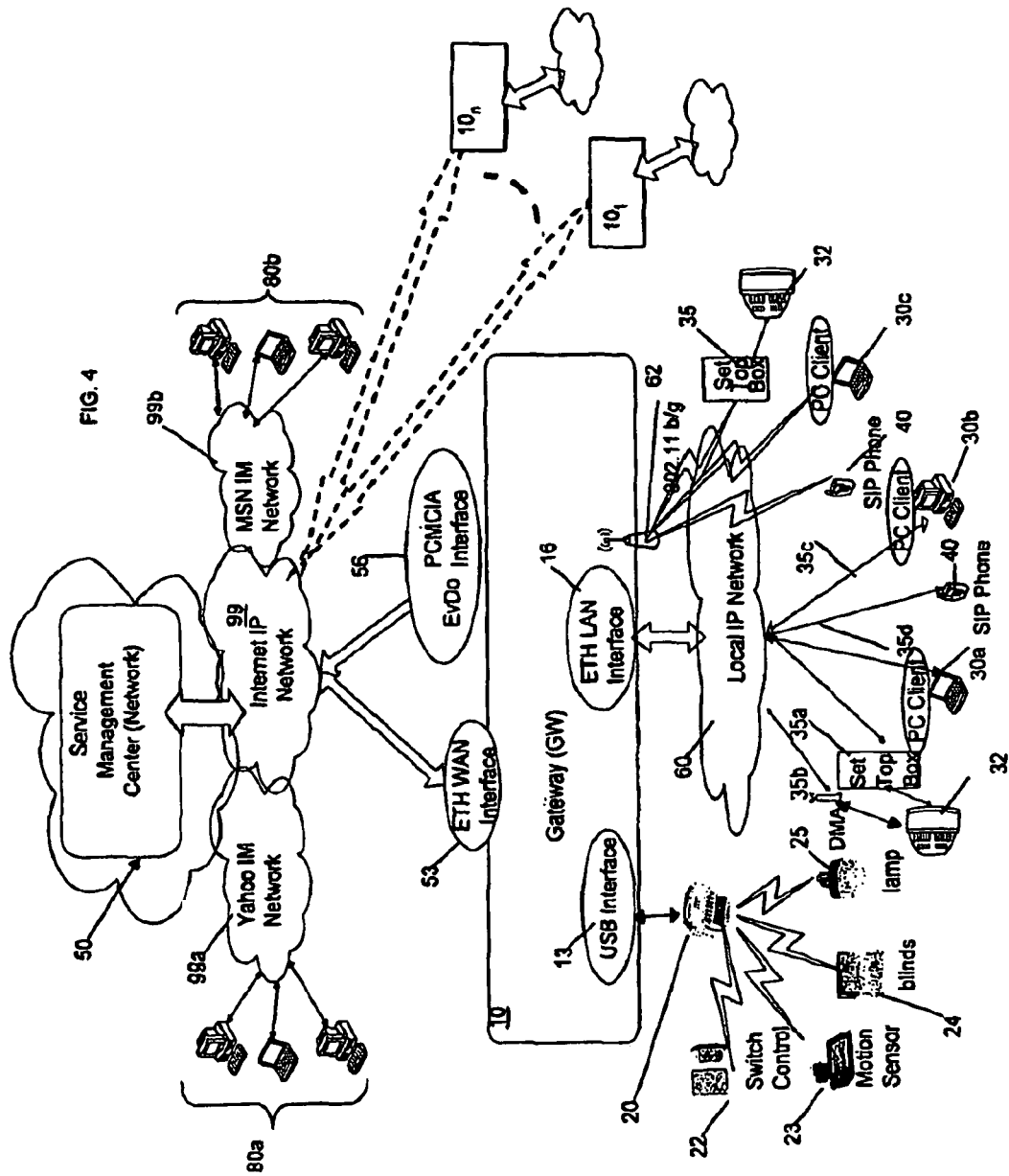

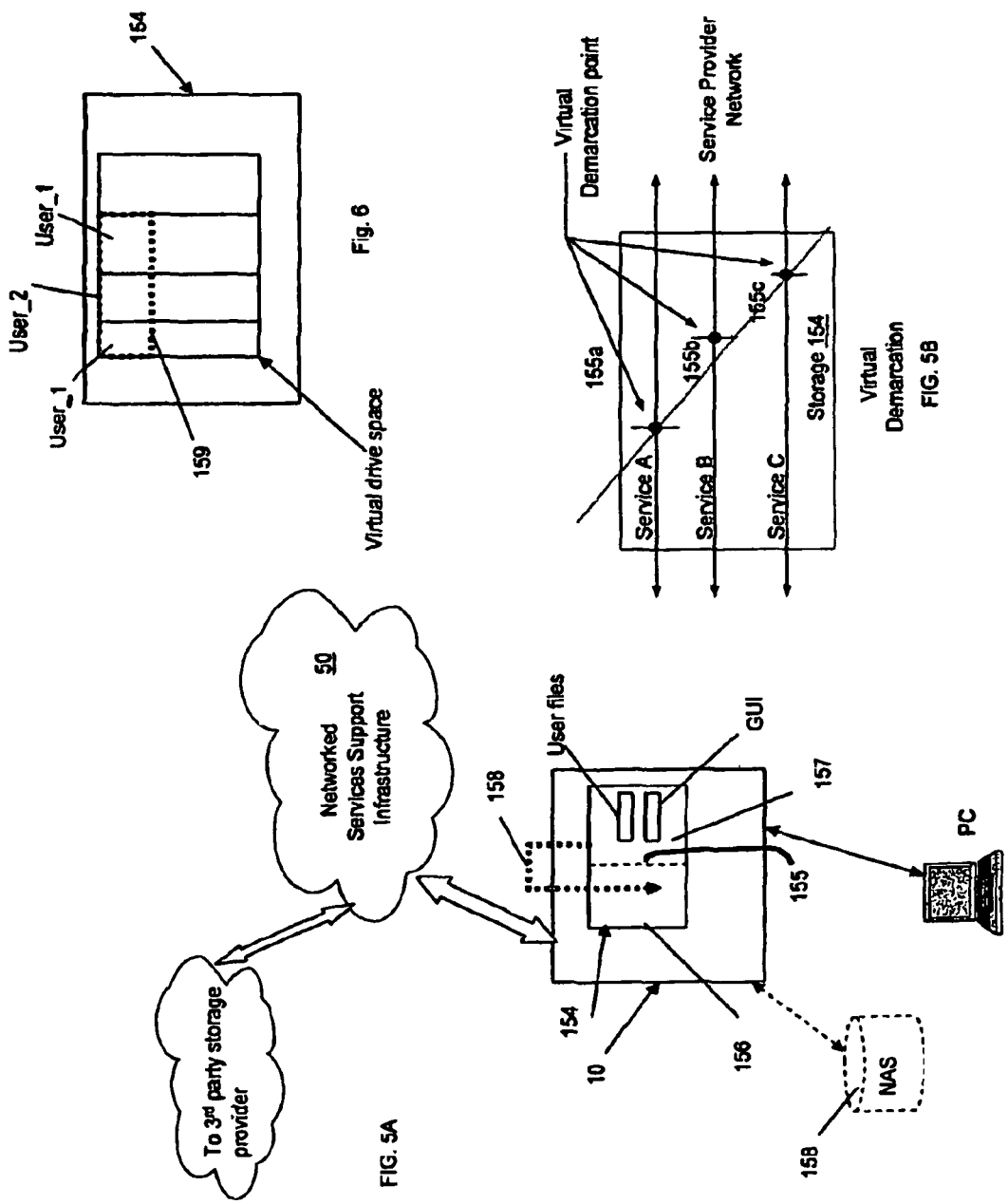

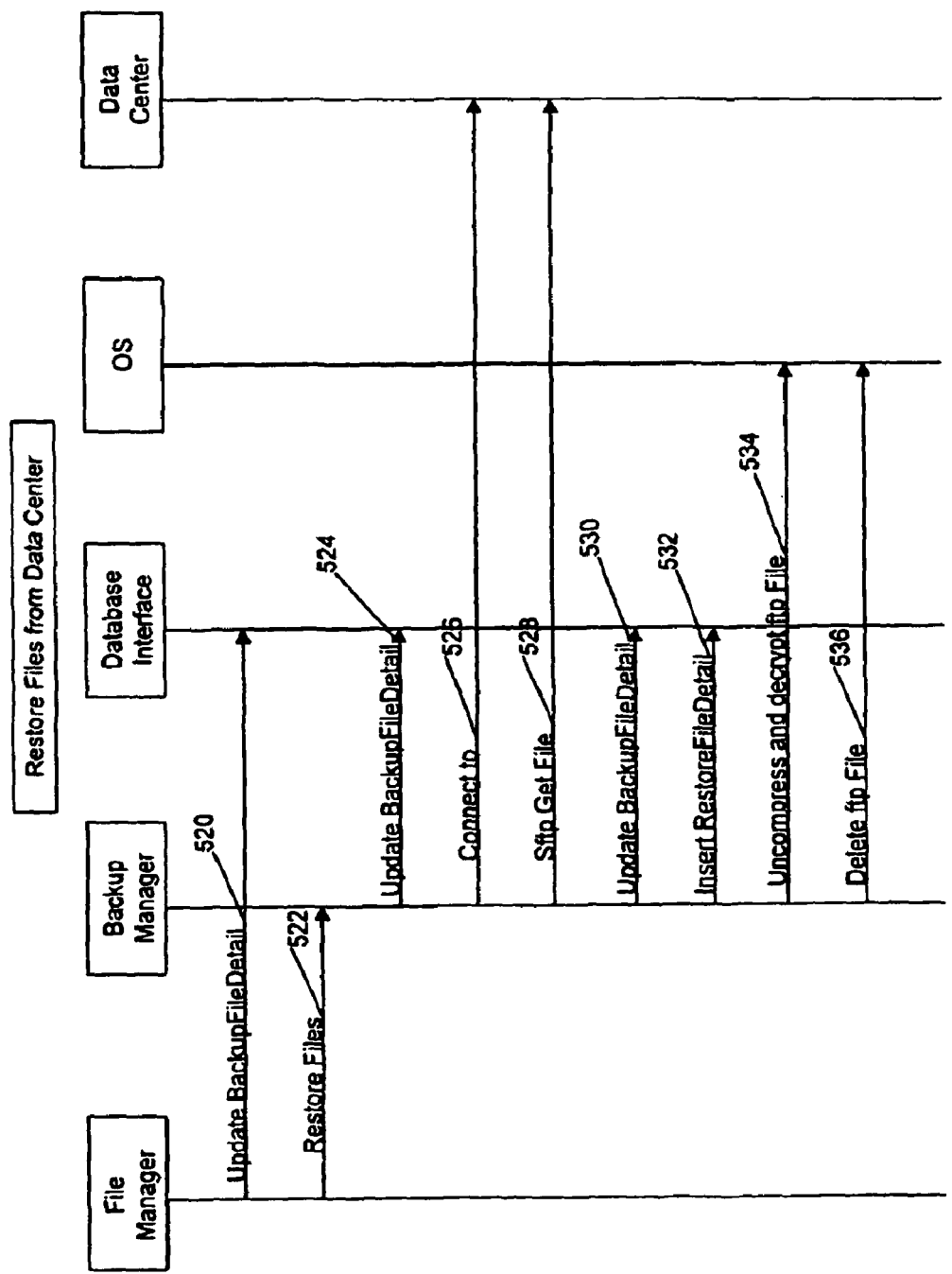

MANAGED FILE BACKUP AND RESTORE AT REMOTE STORAGE LOCATIONS THROUGH MULTI-SERVICES GATEWAY AT USER PREMISES

CROSS REFERENCE

This application is a United States national phase application of international application Number PCT/US2007/019483 filed Sep. 7, 2007, which claims the benefit of U.S. provisional application No. 60/882,865 filed Dec. 29, 2006 and U.S. provisional application No. 60/882,862 filed Dec. 29, 2006, the disclosures of which is incorporated herein by reference.

TECHNICAL FIELD

The present subject matter relates to gateway devices and systems, and/or programming for such devices and systems, that provide file backup and restore services for associated endpoint devices.

BACKGROUND ART

The digital home is now becoming more complex with the myriad of new and emerging digital devices intended to address many user and consumer needs such as communication, entertainment, privacy and security, etc. However, given the complexity of the emerging digital home and digital environments generally, users who are technologically challenged may find it a daunting and intimidating task to manage their home networks and interconnected digital devices. Moreover, new paradigms are emerging oriented to delivering media content to and the consuming of media content at the home. Many of these paradigms rely on communication of application specific data to and/or from the Internet, as opposed to conventional telephone or broadcast video type applications. The protection of received Internet-sourced media content in addition to user-generated media content is additionally an important aspect that may be inadequately addressed by the technologically challenged user. Furthermore, with respect to Internet based data, most of the content delivery solutions are provided to the digital home networks through availability of the "two-foot" interface (i.e. the PC). It is relatively cumbersome to bring this content to the "ten-foot" interface (e.g. the television).

Thus, a need exists for a technique or devices to simplify the overall management of services and applications available to the digital home or even the small enterprise. Such a technique or devices would reduce the complexity of the maintenance, upgrading, and operation of even the more basic needs addressed by emerging digital endpoint devices and networks. Approaches that suggest greater functionality in home-based appliances fail to reduce or address the complexity of managing and provisioning those appliances. For example, while the home gateway server appliance described in U.S. Pat. No. 6,930,598 enables networked electronic devices to communicate with each other without the direct interaction with external networks, and provides a mechanism whereby a member of the household may be informed of certain network related events without having to use their home computer or other client devices, it does not provide a convenient or simplified way of managing the services and applications executed by, or associated with, that device.

Thus, an unmet need exists for a device associated with a user premises that has robust functionality but does not require sophisticated or inordinate attention from the user to manage, provision and utilize them.

In practice, a customer typically subscribes to basic transport services from a network "Service Provider" (e.g. ISP—Internet Service Provider, cable provider, fixed wireless providers, ILEC—Incumbent Local Exchange Carrier, or CLEC—Competitive Local Exchange Carrier). For example, a customer may have broadband Internet access, via cable modem, digital subscriber line service or the like. Digital video service may be provided separately. The network service provider manages these basic services, at the logical network layer, typically at layers 1, 2 or 3 of the OSI model. While network services and associated devices may operate minimally at those levels, they operate at those levels only to support operations at OSI layers 1, 2 or 3. Many applications, however, involve higher level service logic for applications that view the network transport as a transparent pipe. The current internet applications delivery and management architecture, and many devices or management systems based on it, require a server with robust processing and storage capability to be located at the network operations center, not in the home. For voice over Internet protocol (VoIP) type telephone service, for example, the VoIP service provider operates a session initiation protocol (SIP) server or the like, and each user has only client functionality. The network transport layers are transparent to the IP packets containing the voice and related signaling. The SIP server, however, controls the call set-up, tear-down, billing and the like for the voice call services. With such an architecture, the major capabilities and functionalities connected with providing application services from the server throughout the network reside on the server and supporting elements, all of which are located in the network operations center.

It might be helpful to walk through examples of the configuration for application services delivery to a client of an application within a user premises under the typical, current network configuration. FIG. 10 depicts one possible configuration for a client application to access a particular service that is being hosted or served outside of the user premises based on the typical, and currently employed, network application service configuration. We identify two regimes in the overall architecture, the Service Provider Network regime (WAN side), and the User Premises Network regime (LAN side). The association between the Service Provider Network and the User Premises Network is broken down into three layers; Network Interconnect Layer (NI), Network Function Layer (NF), and the Application Services Layer (AS). These layers do not represent physical communication pathways, but are a logical representation of pathways and elements employed in a network-based communication.

The separation between the managed Service Provider Network (WAN side) and the User Premises Network (LAN side) is depicted as the Network Service Provider Demarcation. The Network Service Provider Demarcation at the Network Interconnect Layer represents the logical and physical separation between the user premises and the broad-band network. In the present representation of the three functional layers, the Network Service Provider Demarcation is extended into the Services and Application Layer to emphasize the functional barrier at that layer between the Service Provider Network and the User Premises Network, in currently configured networks.

The NI Layer depicts how the connectivity between a User Premises Network and the Public/Service Provider Network is established. On the Service Provider Network side, the Wide Area Network services are terminated onto a WAN termination device with the appropriate interface (e.g. a Broadband internet service such as ADSL would terminate on to a managed ADSL Terminal Adapter). The WAN termination layer adapts the WAN interface into a compatible LAN interface (e.g. Ethernet or WiFi). On the User Premises Network side the LAN Termination interfaces are used to connect to the Local Area Network via a variety of interfaces, such as Ethernet, WiFi, MOCA, etc.

The LAN Termination interfaces and the WAN Termination interface could reside on two separate physical devices or they could reside on one physical device. In either case, on the User Premises Network side, packets or data must flow through the NF Layer between the WAN Termination Interface and the LAN Termination Interface. One or both of these interfaces may reside on a "gateway" device. Gateway and like router devices are currently available for various premises that allow several computers to communicate with one another and to share a broadband Internet connection. These devices function as routers by matching local network addresses and the hostnames of the local computers with the actual networking hardware detected. As gateways, these devices translate local network addresses to those used by the Internet for outgoing communications, and do the opposite translation for incoming packets.

The User Premises NF Layer allows for switching of packets between LAN devices and routing or bridging of packets between the LAN and WAN interfaces. It could physically reside on the same device(s) with the LAN Termination or it could exist at an independent device that could interconnect to the LAN Termination interface via a variety of physical interfaces (e.g. Ethernet, MOCA, etc.). The Service Provider NF Layer provides the Wide Area Network access between the WAN Termination device and the AS Layer where all the applications servers are being hosted. The Internet could be used for this connectivity as could a private packet/cell network (e.g. Cellular packet network, or a private ATM or packet backbone).

The AS Layer represents the functional layer that provides access to applications services by application clients. On the User Premises side, the AS Layer provides a Firewall to protect the application client from application level attacks from the open Internet. On the Service Provider side, the AS Layer encompasses application services such as Parental Control, Backup, and Call Processing. These application services exist on a managed Application Service Delivery Platform (ASD) on a secure network server that can be hosted at a facility that has private and or public data connection paths. The ASD may include three functional modules, namely the Application Service Enforcement (ASE) module, the Application Service Logic (ASL) module, and the Application Service Management (ASM) module.

The ASE module is responsible for enforcing the relevant Application Client privileges to the application services. It gets the policies and permissions of each application client from the ASM module (such as provisioning data and subscription data) and enforces those policies against the requested actions by the client application.

The ASL module executes the application services that the Application Clients request. Such services could be Call Processing, Parental Control, Peered Networking, Backup, etc. The ASL module must interact with the ASM module for monitoring purposes and status information such as Call Data Recording and Billing. It must also interact with the ASE module to provide access to the client applications that have passed the policy enforcement procedures.

The ASM module, as described above, provides the necessary data to the ASE and ASL modules for them to carry out their respective functions. It also oversees the overall integration and communication among all the modules and the services that are managed by the ASM. The ASM also manages the overall security and integrity of the ASD.

All ASD modules are in constant communication with each other, preferably through secure connections. The inter-module communication may be managed by the ASM, or may be independent of a central management function. Note that the ASE, ASL and ASM modules are only examples of functions that may be logically bundled; other bundles, and other means of bundling these functions, are possible.

FIG. 11 depicts a logical flow of how a specific Application Client residing at a user premises could interact with an Application Service that is being managed in the typical network configuration. Traditionally, as depicted in this example, an Application Client (e.g. Telephony) that needs to connect to an Application Service (e.g. call processing) must first connect to the Local Are Network termination interface (1). Depending on the specific deployment, a switching function, routing function or bridging function is used to establish the connection path between the application client (2) and the Firewall service (3). The Firewall Service works in conjunction with the router function (4) to permit access to the Wide Area Network interface (5) and maintain a level of security to the Application Client. The firewall service in this example is not aware of either the type of application client or the specific application service that is being targeted. There is no feedback mechanism between the Application Service Delivery Platform and the Firewall function. Once connectivity to the WAN termination interface is established, routing mechanisms are used to establish a connection through the Service Provider Network Function Layer (6) to the Application Service Layer (7). At the Application Service Layer, the client application goes through application validation procedures and privilege and permission checks by the ASE prior to allowing the application client to connect to the desired application service.

In the logical hierarchy, such as shown in FIGS. 10 and 11, a home gateway device may implement the NI layer functions and the user premises side NF layer functions. The firewall functionality may reside in the gateway or in one or more other elements on the premises network. For example, many PCs internally implement firewalls, e.g. in close association with the client programming of the endpoint device. As can be seen by the illustrations in FIG. 11, however, even with a home gateway deployment for a premises network, the application services functionality still requires the support and service logic to reside on a server in the network. That is, for service provisioning, service management and upgrades, remote diagnostics, for a digital endpoint device such as a PC or SIP phone, the home premises still must rely on the application service logic executed by the service providers in their server networks, typically according to proprietary platforms. Moreover, many other core services, e.g. file storage, media content access and delivery, are offloaded to other 3rd-party service providers that provide service logic and support applications at their network server devices.

With the paradigm discussed above relative to FIGS. 10 and 11, it is currently the case that many of the application service providers also find it difficult to provide and support new emerging technologies at the home. That is, service providers are challenged to select a platform that can evolve with their applications. With existing service architectures, the launch of new services compounds complexity to the core network, adding to both capital and operating expenditures.

Thus, as new services come to the fold, often with the requirement of new equipment, e.g. integrated access devices (IADs) for VoIP and set-top boxes for streaming video, the management of the customer premises equipment (both hardware and software) complicates customer support requirements. Managing the home network environment can be an inhibitor to the adoption of new services, both from the user perspective and from the perspective of management by the service providers.

One of the services that is needed is that of file backup (and restore) services for a user premises. In many households, there exists a large amount of valuable data scattered across many computers. There is always the possibility that the computers may crash and data cannot be recovered. Typically, any file backup from endpoint devices, such as personal computers (PCs), is performed with a local storage device, such as a backup tape drive, or more recently, through an external disk drive. Such systems and methodologies position the local storage device relatively near the endpoint device, such as in the same residence. Relying on a local storage device for file backup and restore has disadvantages, such as potential loss of the original files and the backup files in the event of a catastrophic event, such as a fire in the premises.

Backing up files is very cumbersome for a home user, using external drives and backing up data on CDs or DVDs. When one needs to restore the data, one must go through numerous CDs and DVDs to locate the information to be restored. Further, the backup process requires a long period of time, due to the larger and larger amounts of data to be backed up. There is thus a need for providing managed offsite storage from endpoint devices in a secure and indestructible manner.

A need exists for a new paradigm to achieve this file backup system and method, with improved convenience for the user and easier management for the application service provider. In that regard, it would be desirable to provide a multi-services application gateway device and system that manages offsite file backup for one or more endpoint devices associated with the gateway device.

SUMMARY

The technology discussed herein may be embodied in gateway devices, typically for deployment at user premises, and/or to programming for devices that may function as such gateways. Such a gateway device comprises a first interface for enabling bi-directional network layer communications with one or more of the endpoint devices associated with the gateway device, a second interface for enabling bi-directional network layer communications for the one or more endpoint devices via a wide area network, and for enabling at least some bi-directional communications with a service management center and at least one storage area external to the premises via the wide area network. The gateway device also comprises a processor configured to manage backups and restores of the data between the one or more of the endpoint devices and the at least one storage area.

Application service programming is logically positioned on a user premises side of a first logical network demarcation, forming an edge of the wide area network at the user premises. The programming also defines a logical service provider-user demarcation between the user premises and the application service provider. The application service programming resides on the service provider side of this second demarcation and only provides a logical application service interface across that demarcation to deliver an application service to an endpoint device. The logical service provider-user demarcation also provides a demarcation in accessibility to hardware resources of the gateway device, whereby some hardware resources of the gateway device are on the service provider side of the logical service provider-user demarcation and are inaccessible to an endpoint device from the user side of that demarcation.

In a disclosed example, the demarcation in accessibility to hardware resources of the gateway device, provided by the logical service provider-user demarcation, delineates a portion of the storage accessible by a user via an endpoint device from an application service provider portion of the storage, which contains the application service programming and/or data of the application service provider. For example, the user of an associated endpoint device may be able to store and retrieve data files in the user accessible portion of the storage of the gateway device. The application service provider, in turn, can control storage and retrieval of data files in the application service provider space portion via the of the wide area network. However, the user of the associated endpoint device is prevented from accessing one or more of the data files in the application service provider portion. In one service application, the application service provider can allow storage and retrieval of data files in the application service provider portion via the wide area network, for other gateway devices. In a specific example, the logical location of the demarcation line separating the portions of the storage is controllable by the application service provider, from the service management center, via the wide area network and the second interface.

The disclosed architecture provides a whole house backup service. The backup and storage can be accomplished offsite in a secure and practically indestructible manner. In certain embodiments, the architecture allows the placement of backup files to the service provider side of the logical server provider side of the logical service provider-user demarcation of the gateway device, and to other gateway devices located on the network through encryption and dispersion of encrypted elements of the backup files and data throughout other gateway devices on the system, or to a centralized data storage system.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

The drawing figures depict one or more implementations in accord with the present teachings, by way of example only, not by way of limitation. In the figures, like reference numerals refer to the same or similar elements.

FIG. 4 is a network diagram, depicting a gateway device, endpoint devices at the user premises, one or more wide area networks and a service management center.

FIGS. 5A and 5B conceptually depict the demarcation in a storage media that provides isolation of downloaded service logic and associated data for implementing services from service provider and/or downloaded content, from a user generated content.

FIG. 6 conceptually depicts a virtual hosting (space-sharing) service provided by the gateway device.

Figure 7:
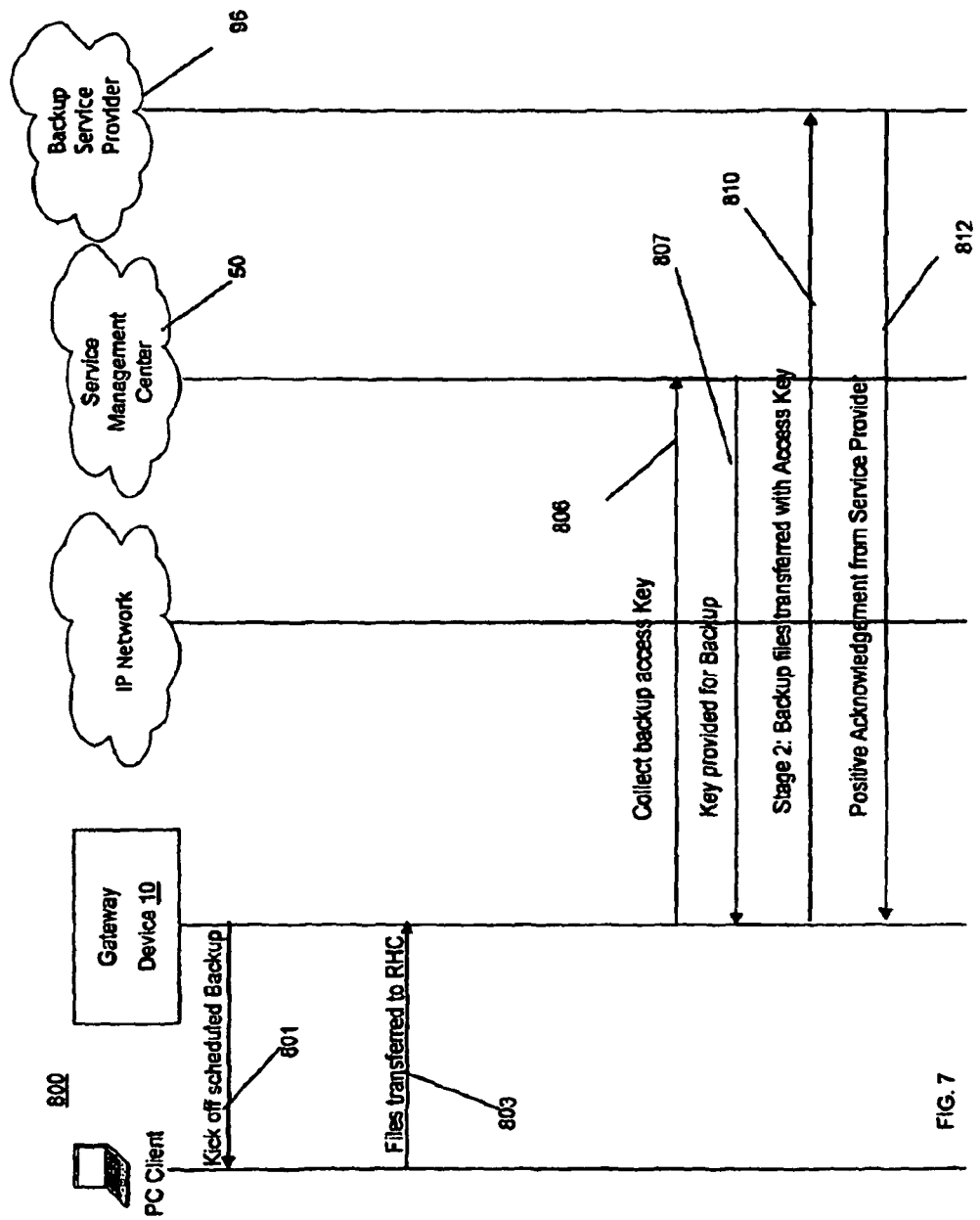
Figure 8:
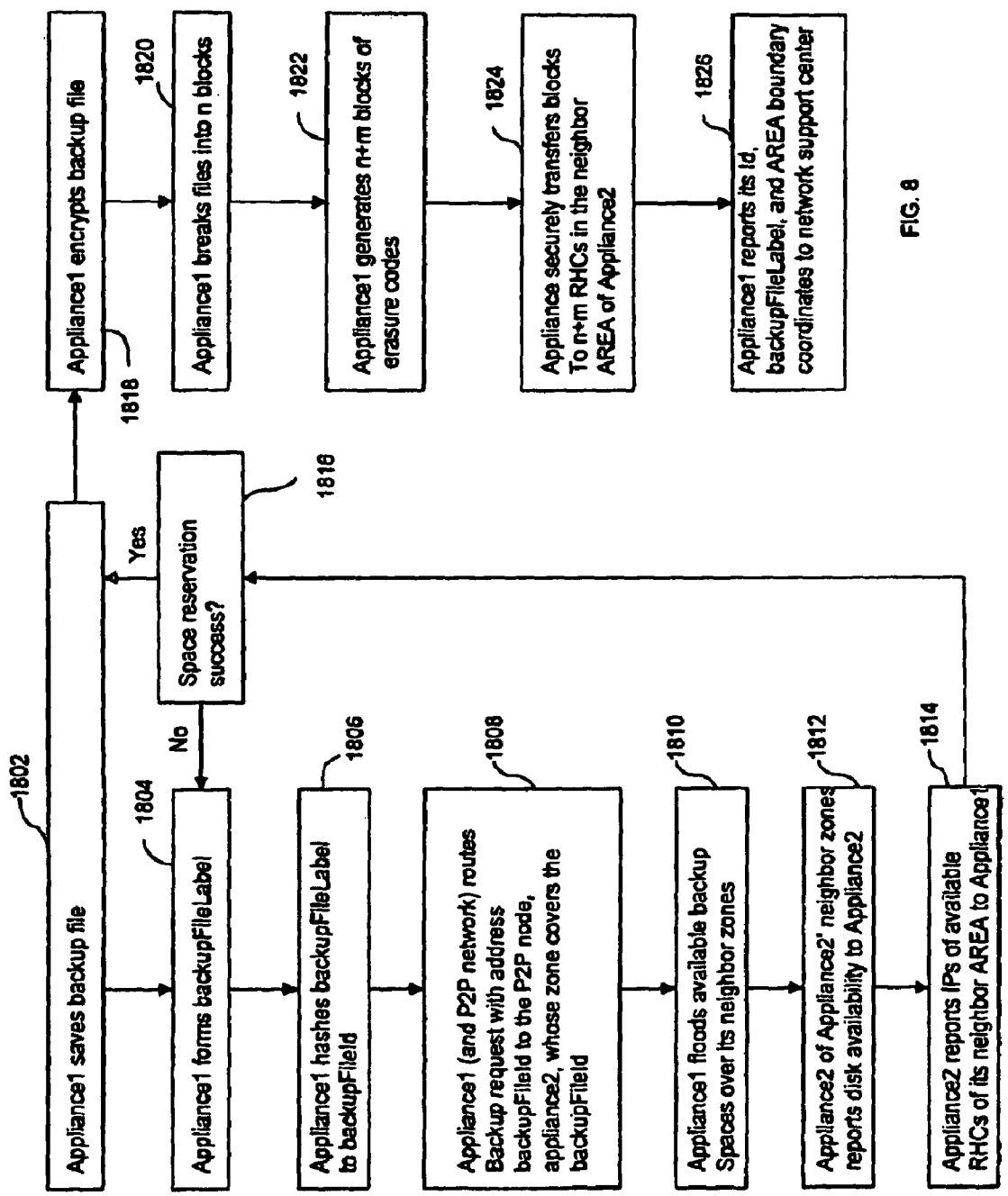
Figure 9:
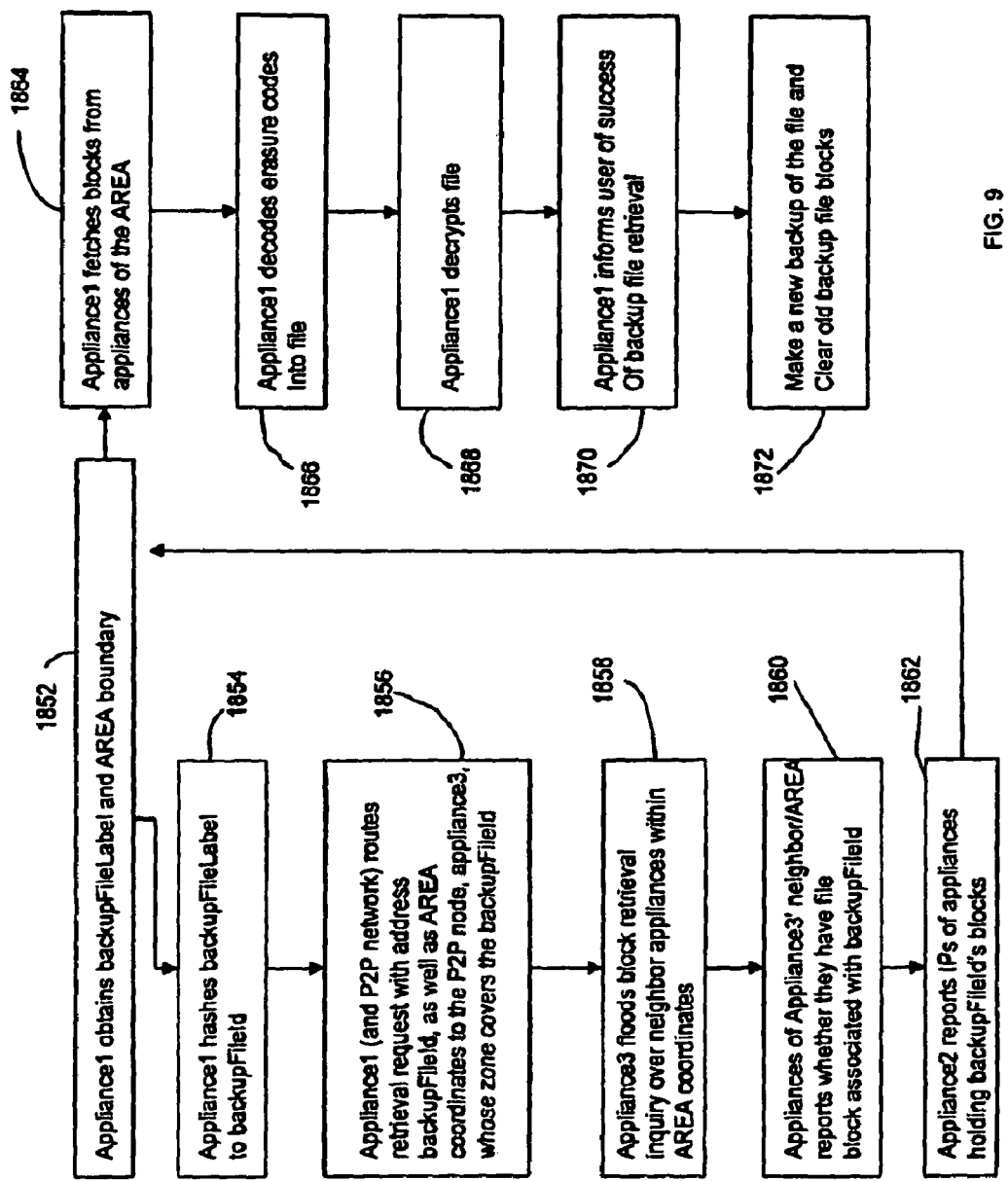

FIG. 7 is a signal flow diagram and FIGS. 8 and 9 are process flow diagrams, which illustrate operations for providing backup services for files to a third party storage provider and peer gateway appliances.

Figure 10:
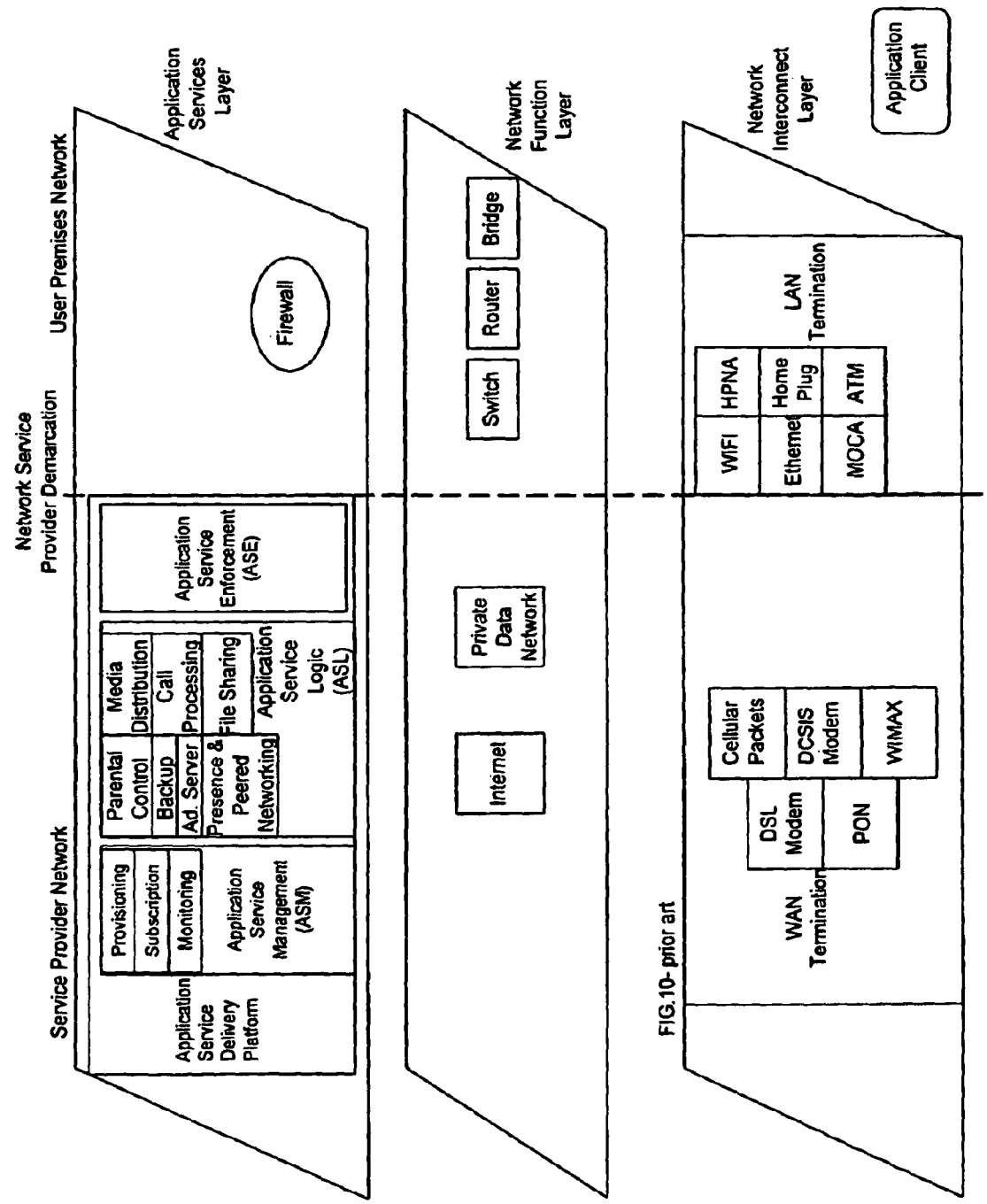

FIG. 10 is a layered logical block diagram of one possible configuration for service delivery to a client of an application within a user premises based on a typical current network architecture.

Figure 11:
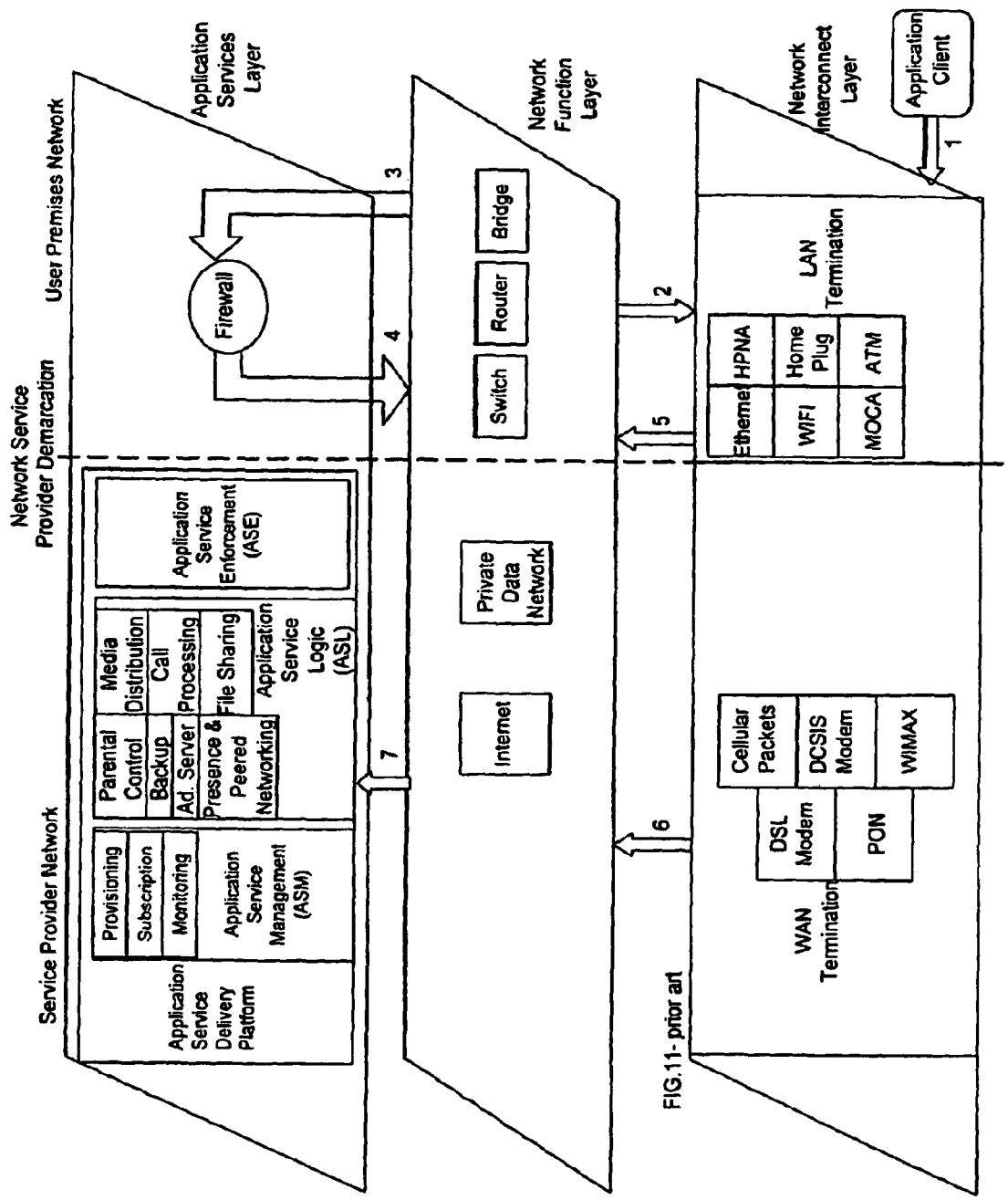

FIG. 11 is similar to FIG. 10, but overlaid with arrows to show a sample flow of logical steps taken by an Application Client to access a specific managed Application Services in the typical current network configuration.

Figure 12:
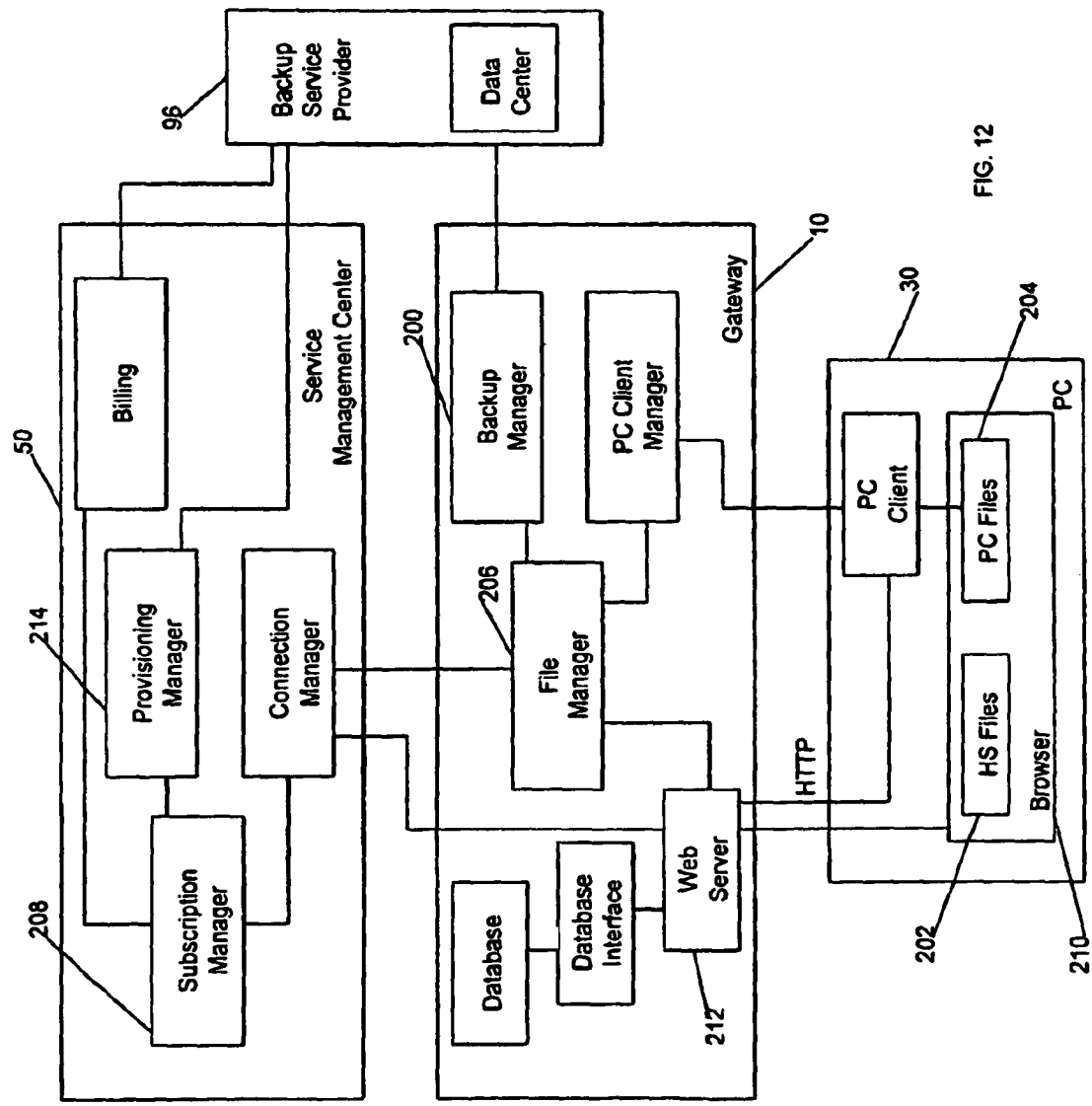

FIG. 12 is a block diagram depicting only certain components of the architecture shown in FIGS. 1-4 in an arrangement to provide file backup service.

Figure 13:
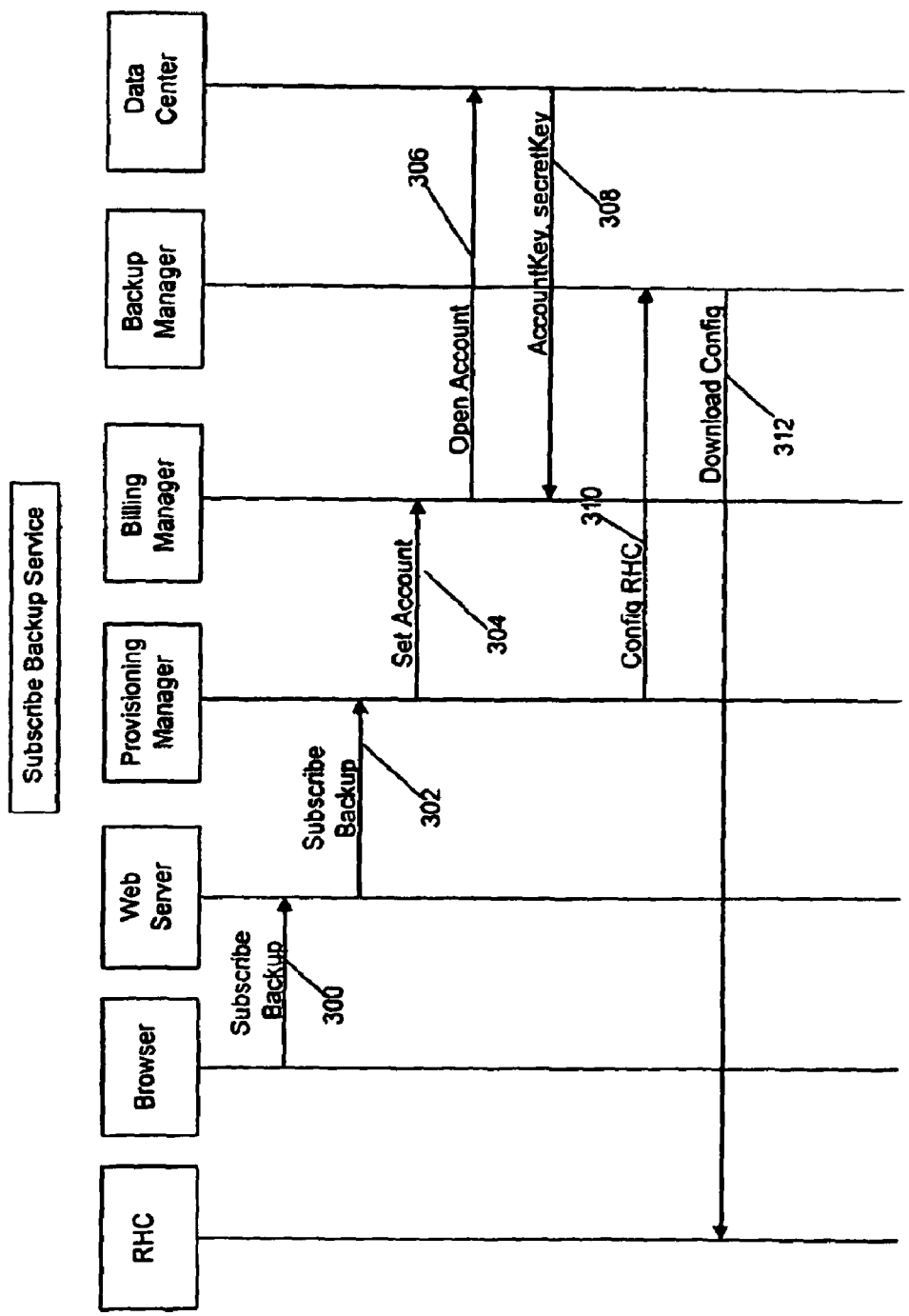

FIG. 13 is a process flow diagram that illustrates operations to subscribe to a backup service with the disclosed architecture.

Figure 14:
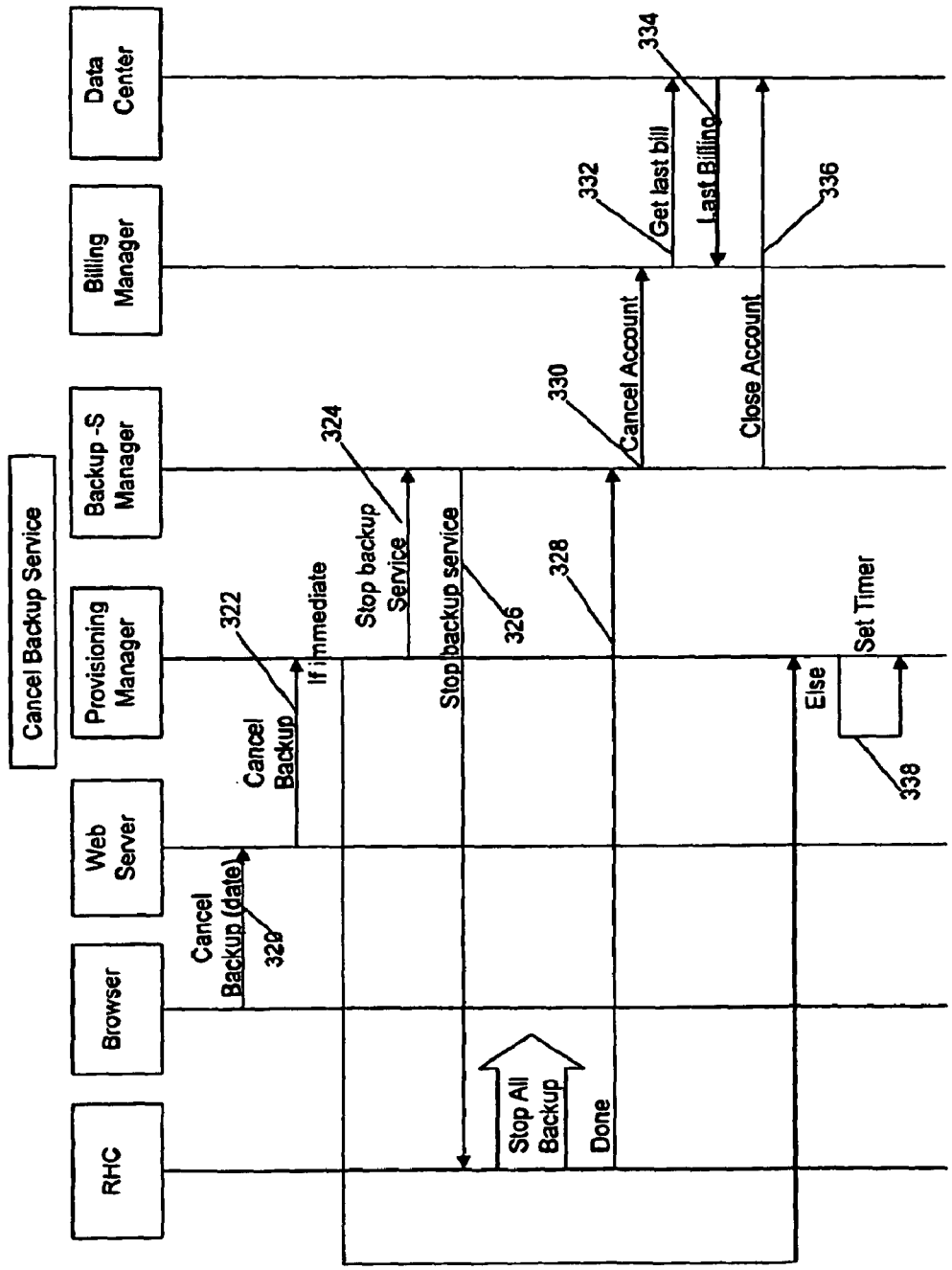

FIG. 14 is a process flow diagram that illustrates operations to cancel a subscription to a backup service with the disclosed architecture.

Figure 15:
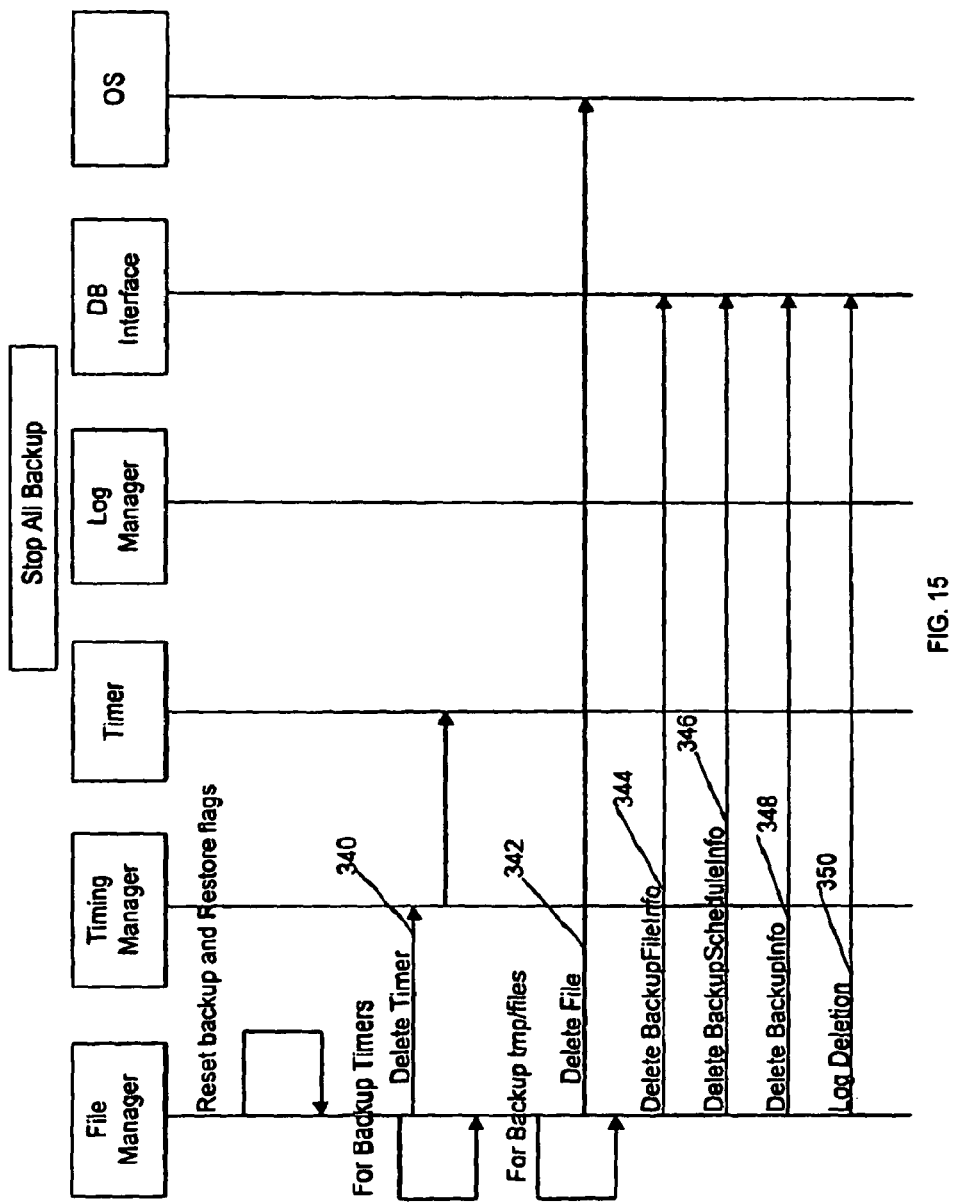

FIG. 15 is a process flow diagram that illustrates operations to stop all backups with the disclosed architecture.

Figure 16:
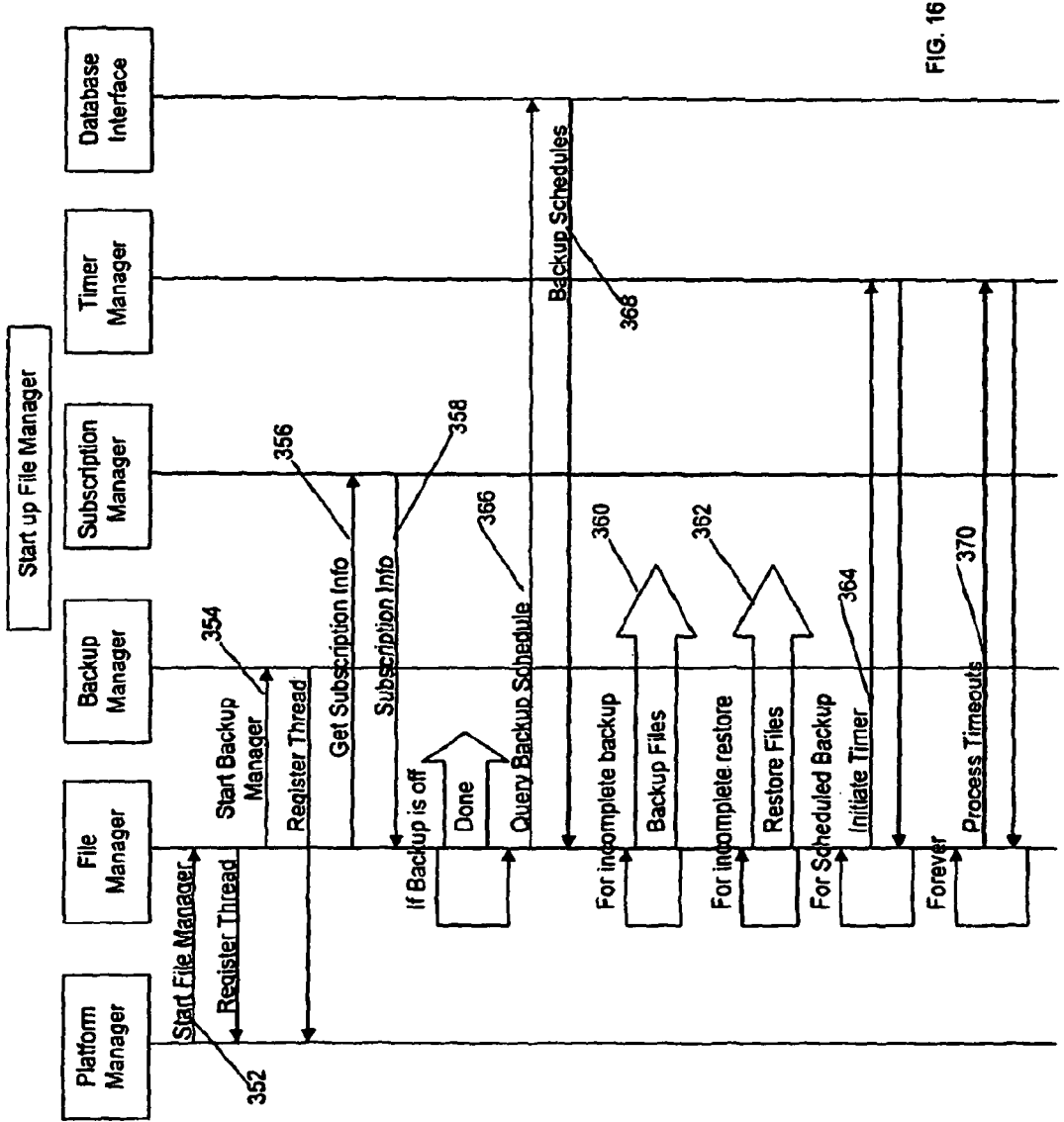

FIG. 16 is a process flow diagram that illustrates operations to start up the file manager depicted in FIG. 12 for the backup operations.

Figure 17:
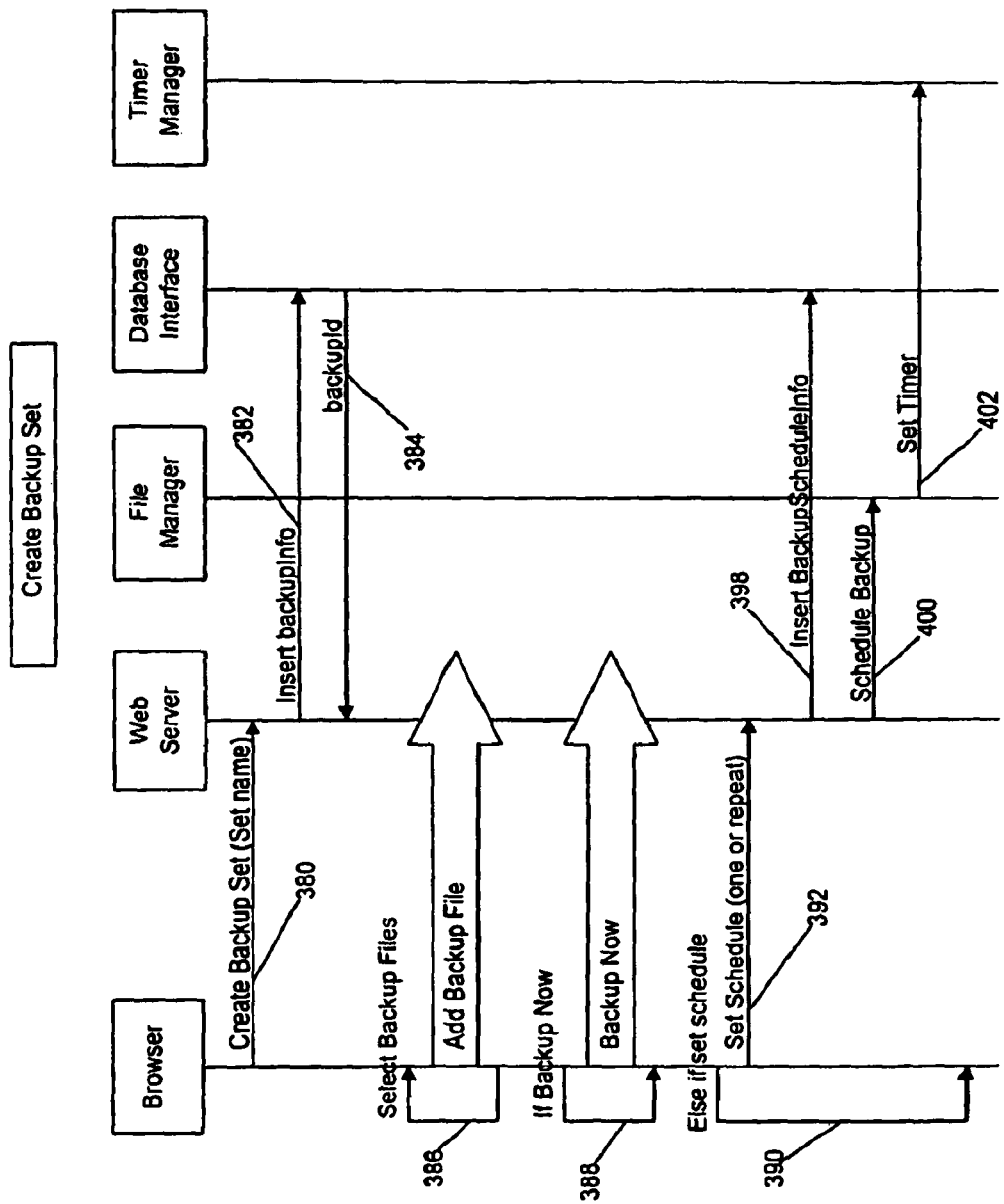

FIG. 17 is a process flow diagram that illustrates operations to create a backup set with the disclosed architecture.

Figure 18:
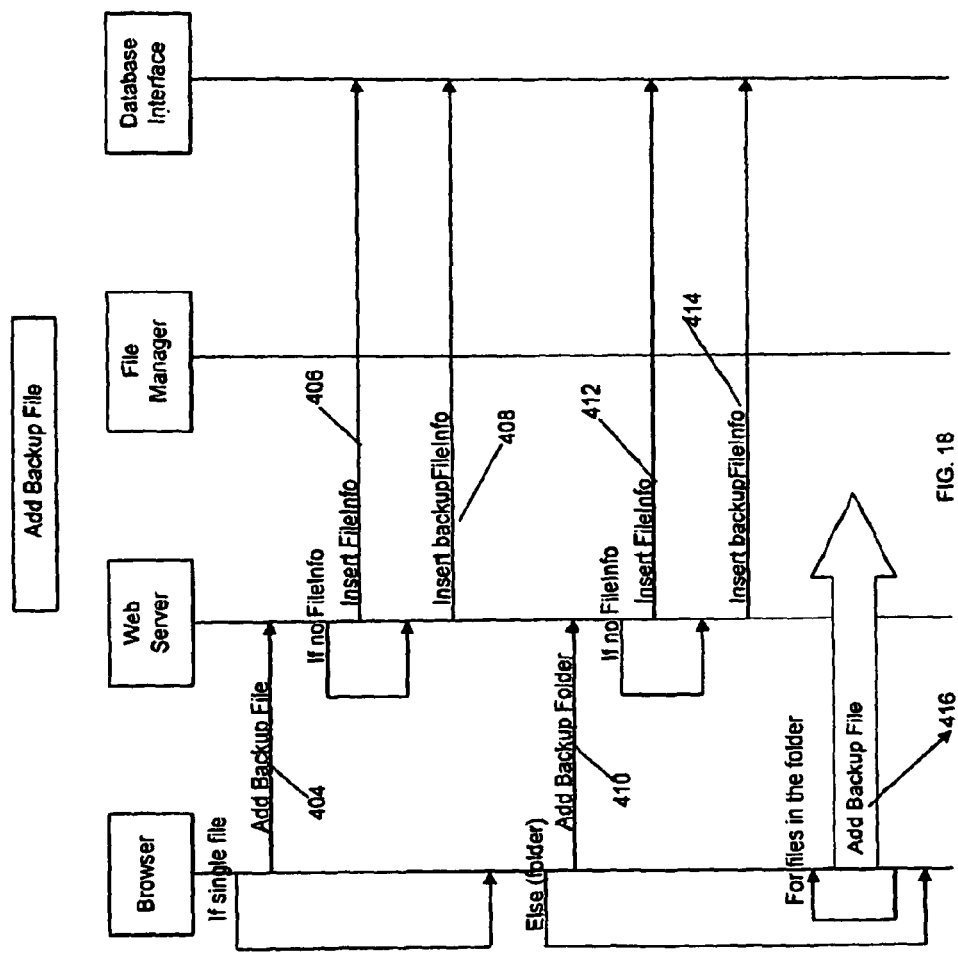

FIG. 18 is a process flow diagram that illustrates operations to add a backup file with the disclosed architecture.

Figure 19:
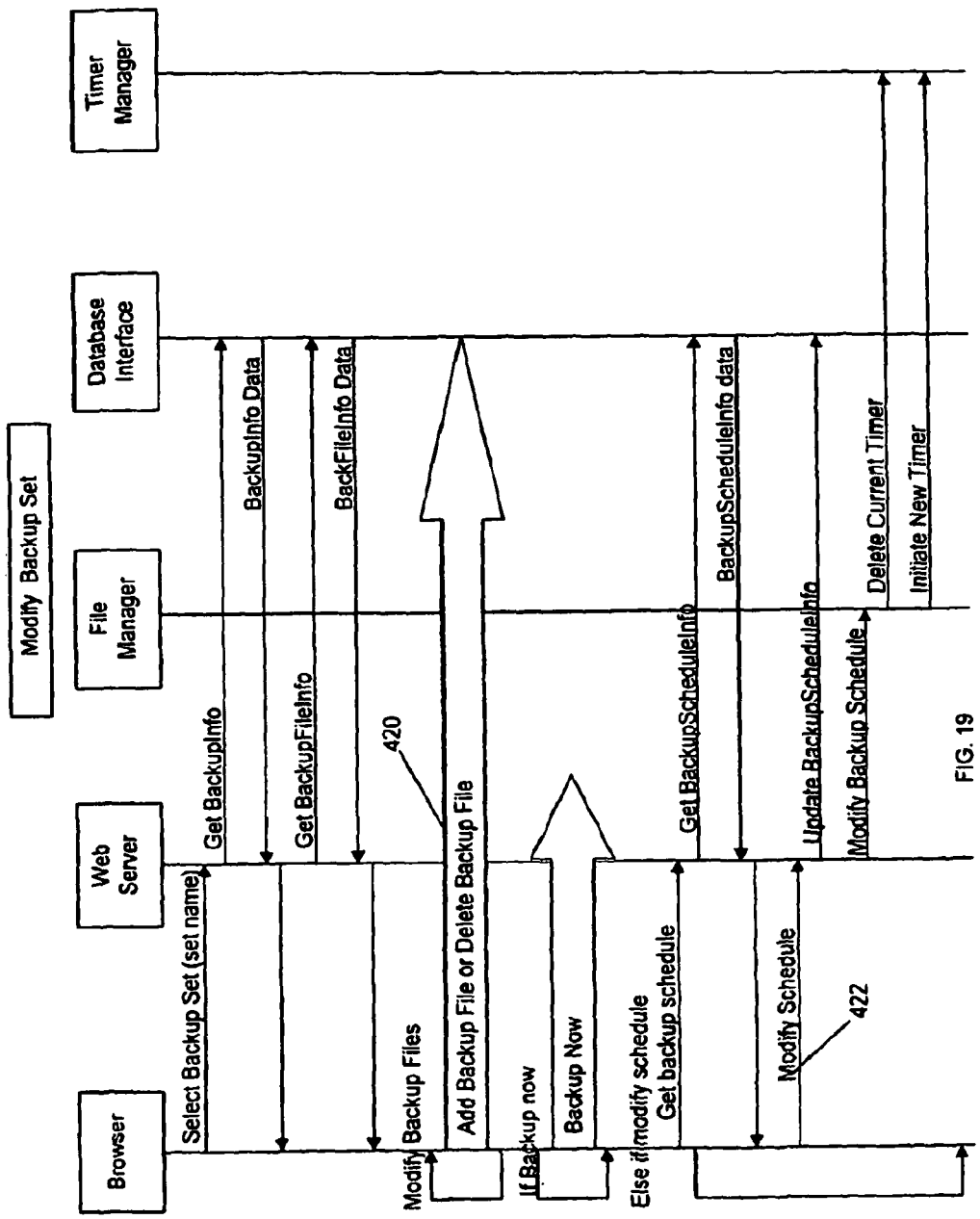

FIG. 19 is a process flow diagram that illustrates operations to modify a backup set with the disclosed architecture.

Figure 20:
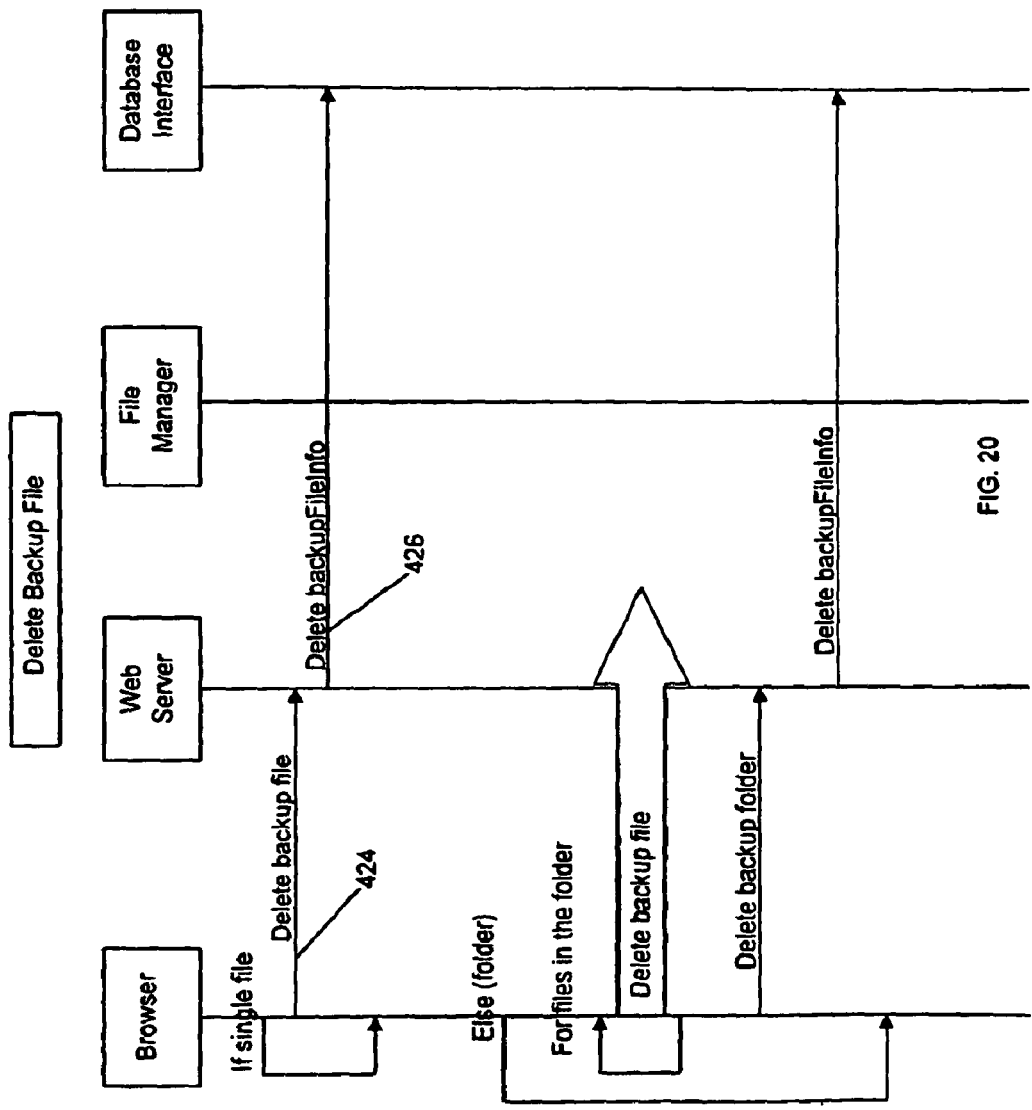

FIG. 20 is a process flow diagram that illustrates operations to delete a backup set with the disclosed architecture.

Figure 21:
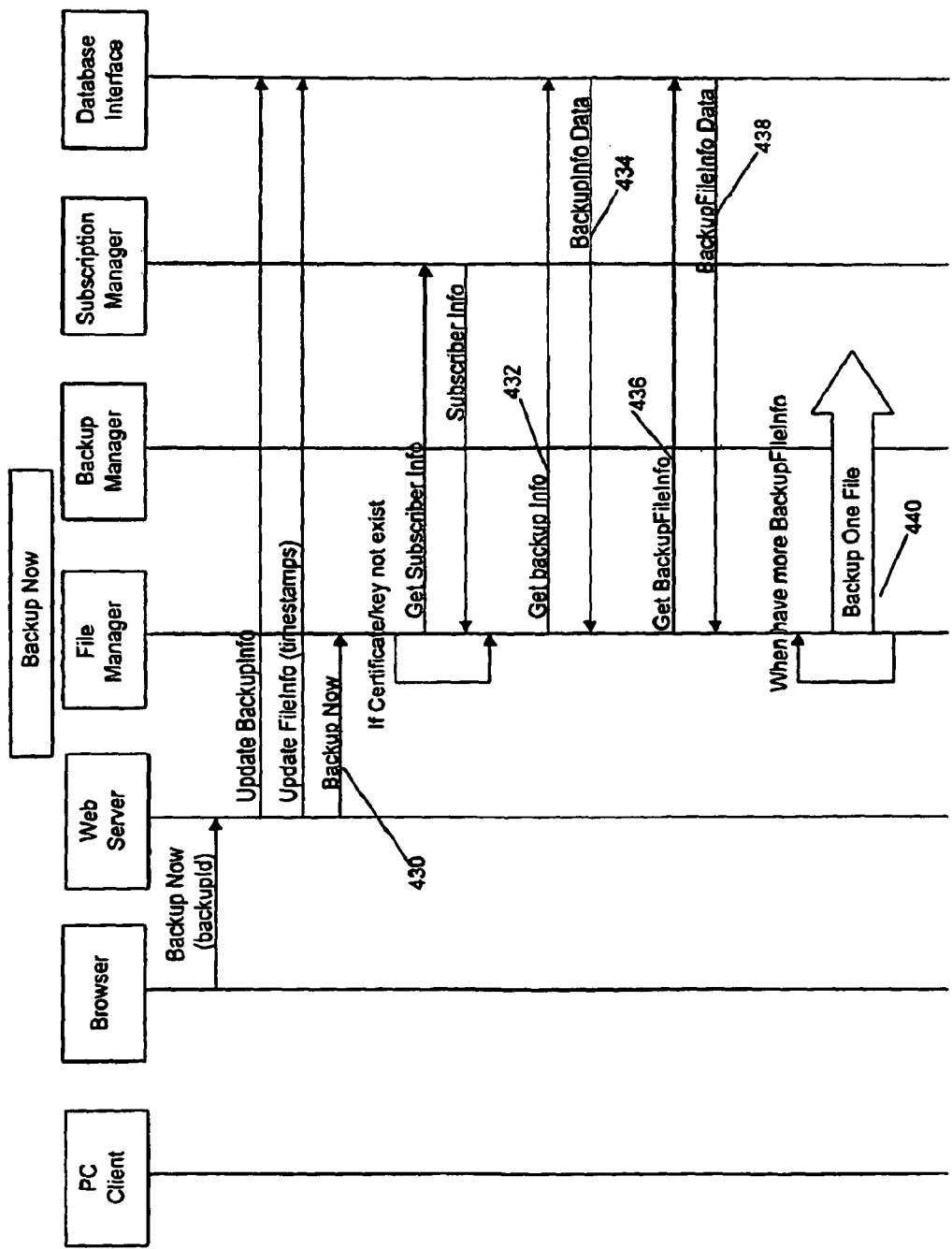

FIG. 21 is a process flow diagram that illustrates operations to perform an immediate backup operation with the disclosed architecture.

Figure 22:
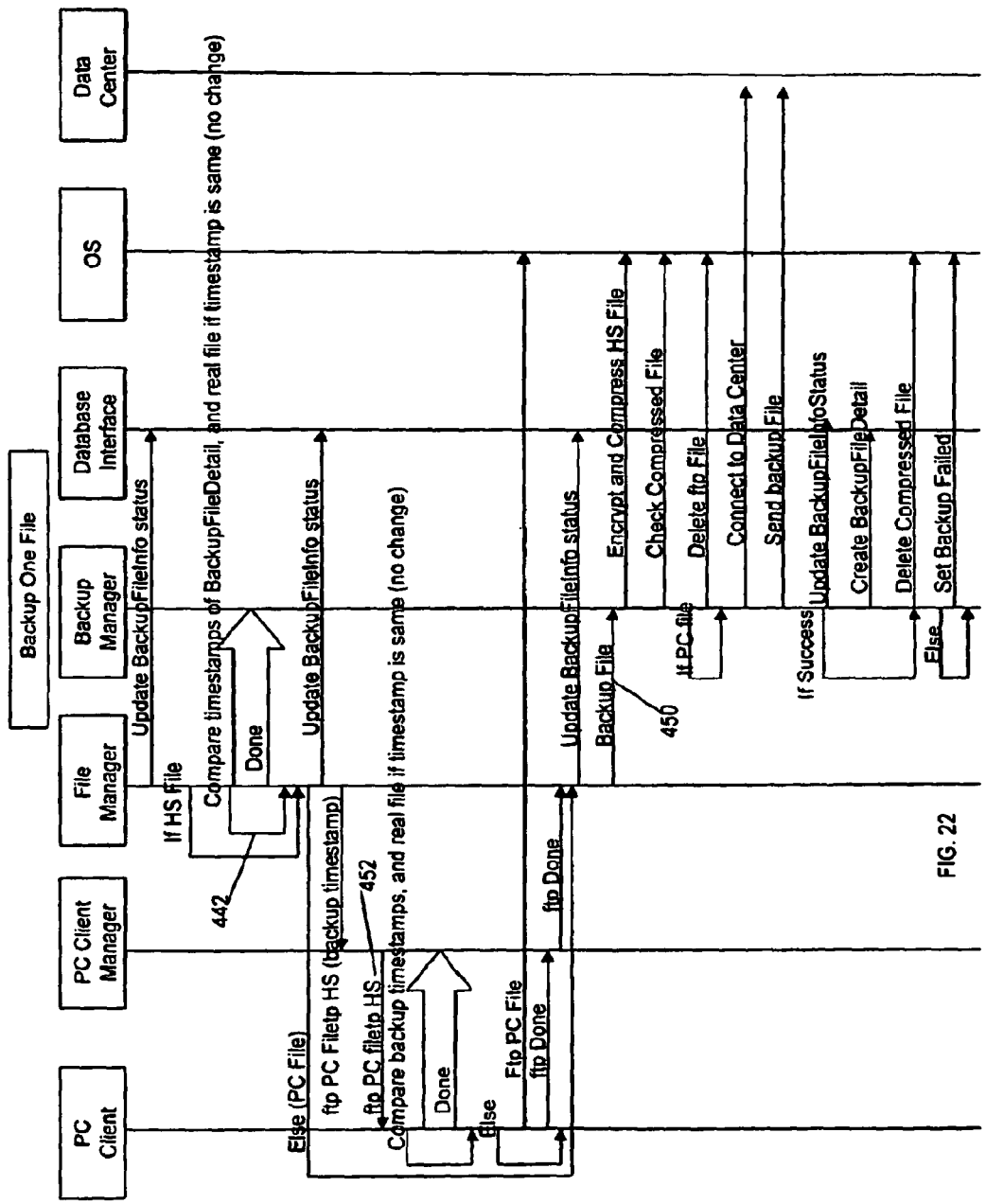

FIG. 22 is a process flow diagram that illustrates operations to backup one file with the disclosed architecture.

Figure 23:
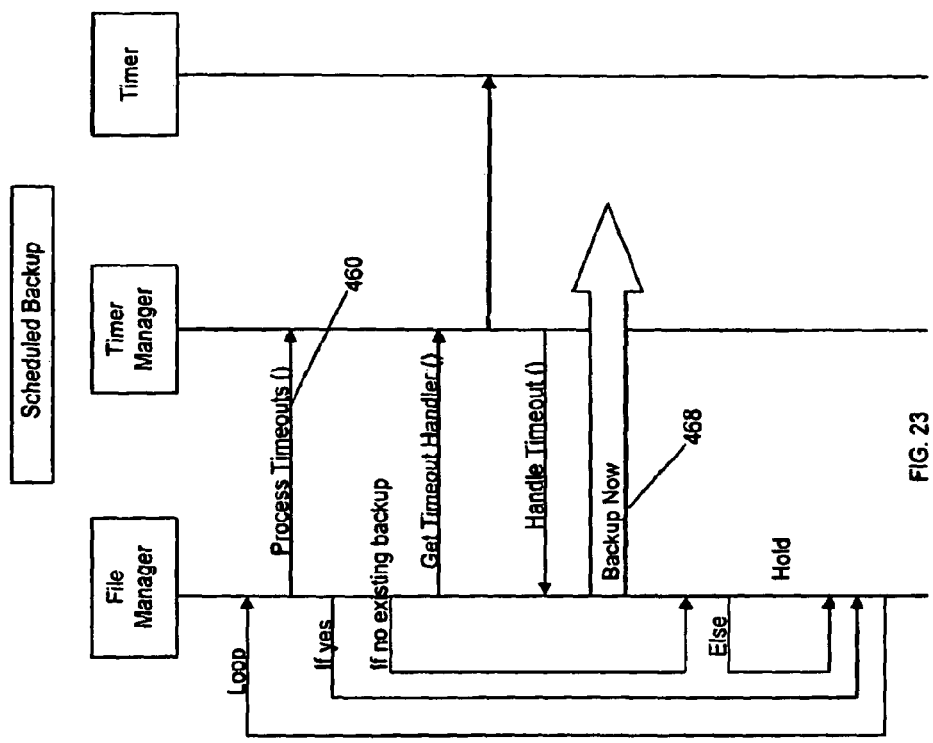

FIG. 23 is a process flow diagram that illustrates operations to schedule a backup service with the disclosed architecture.

FIGS. 24a-d are process flow diagrams that illustrates operations to restore files with the disclosed architecture.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Architectures and methods are described that provide for offsite backup and storage. The architectures, described in detail below, perform a backup function that places backup files at the restricted portion of the gateway device and distributed to other gateway devices on the network for storage or to a central storage location. This is done securely through encryption and dispersion of the files to be backed up, under the control of the gateway device at the user premises and a service management center. The user is thereby able to subscribe to secure offsite storage for backing up data and restoring it as needed. Before describing the specific operations involving the backup of data, an exemplary architecture for backing up the data is described in detail below.

The various technologies disclosed herein move application service logic, formerly resident in a network node, into a gateway device in the customer premises. The gateway device is implemented in such a manner as to offer its user many of the applications services, such as were previously offered from network-side servers, from the user premises. A logical Network Service Provider Demarcation is formed at the edge of the wide area network at the user premises, that is to say between the wide area network and the equipment in the user premises. The application service logic resides on the user premises side of this first demarcation. The gateway device programming also defines a logical service provider-user demarcation between the user premises and the application service provider, referred to in later examples as the Applications Service Provider Demarcation. The application service programming resides on the service provider side of this second demarcation and can be controlled or managed by the application service provider, typically by communications through the wide area network. The user's access to the programming and resources between the two demarcations is limited. The application service programming only provides a logical application service interface across the Applications Service Provider Demarcation, for delivery of one or more application services to an endpoint device. The Applications Service Provider Demarcation also provides a demarcation in accessibility to hardware resources of the gateway device, whereby some hardware resources of the gateway device are on the service provider side of the logical service provider-user demarcation and are inaccessible to an endpoint device from the user side of that demarcation.

In a typical scenario, a network service provider takes responsibility for managing resources on the network side of the Network Service Provider Demarcation, leaving the user to manage everything on the premises side of that first demarcation. However, in the gateway devices discussed below, an application service provider takes responsibility and controls/manages the software and hardware resources between the two demarcations. This approach provides the application service provider with management control over resources in the premises that deliver that providers' higher layer services, and the application service provider can relieve the end user of many of the burdens of managing customer premises resources.

Examples of application services include one or more of media delivery, content management, access control and use tracking, file sharing, and protection and back-up services of both Internet/Web-generated digital media content and user generated digital media content. The disclosed gateway device thus is configured and programmed to simplify various aspects of managing the emerging home/business digital networks including the myriad of interconnected digital endpoint devices associated with the gateway device. The endpoint devices need not reside within, or be located at, the premises to maintain their association with the gateway device. For many of the exemplary application services, the application service programming between the demarcations in the gateway device implement server functionality for interactive communication with client functionality of the endpoint devices. Application service functionality of the gateway device, as provided by this client-server interaction, is enabled/disabled and configured by the application service provider, via communications between the gateway device and a service management center via the wide area network.

In this way, the gateway device and service management center move substantial functions performed by the typical network server into the user premises by incorporating those functions between the two demarcations at the gateway device, but in a way that allows for the server functionality to be externally managed by the service management center from the network side, which may be operated by a third-party service provider. In this exemplary architecture, both the server functionality and the application services offered via the gateway device may be managed by the service management center. Moreover, the server function residing in the gateway device is not only located in the premises but it now resides logically on the premises side of the Network Service Provider Demarcation and on the service provider side of the Applications Service Provider Demarcation. In the detailed examples, the gateway device and system architecture place a set of application services on a tightly coupled (e.g. always-on or always-available basis), secure hardware platform that is externally managed.

Figure 1:
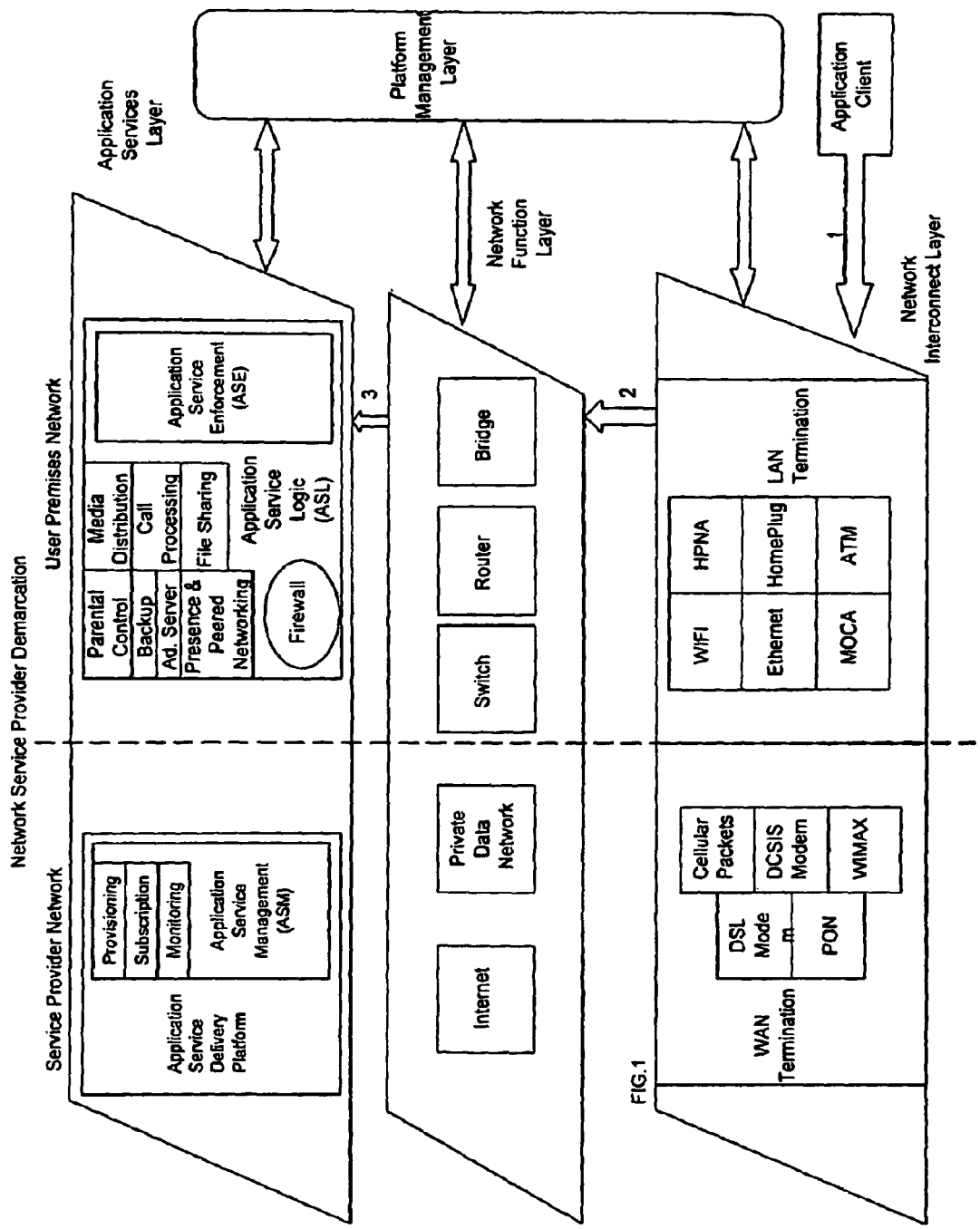
FIG. 1 is a layered logical block diagram with arrows representing steps of a sample logical flow, for an application client to access a specific managed application service, in a gateway device-service management center type network configuration, and shows a first or Network Service Provider Demarcation at the network edge.

Reference now is made in detail to the examples illustrated in the accompanying drawings and discussed below. FIG. 1 is a high-level diagram of the architecture of a gateway-service management center network, as well as the logical flow of how a specific Application Client residing at a User Premises could interact with an Application Service in a gateway device that is being managed in the gateway-service management center network configuration. Heretofore, as described above, many application services that form part of the Application Service Delivery Platform were logically positioned at the AS Layer but on the network side of the Network Service Provider Demarcation (see FIGS. 10 and 11). FIG. 1 shows that, in the exemplary architecture, many of these application service functionalities that were previously offered from network-side servers have now been moved across the Network Service Provider Demarcation and now logically reside at the AS Layer in the User Premises Network, i.e., on the hardware components located in the user premises, such as, by example, a gateway device. In particular, the programming that implements application services is logically positioned on the user premises side of the Network Service Provider Demarcation. The application service on the user premises side that enforces authorization, authentication, configuration, or use of the respective service via an endpoint device is logically depicted in FIG. 1 as the ASE module in the AS Layer of the User Premises Network. The ASE module may also communicate via the wide area network with the ASM logic residing in the service management center.

FIG. 1 thus depicts an approach in which the ASL and the ASE functions have moved to the User Premises side. In the example of FIG. 1, the application client would be implemented on an endpoint device, whereas other elements/functions to the right of the Network Service Provider Demarcation are implemented in a gateway device. As discussed more below, the ASL and the ASE functions are implemented as high-level server type logic within the gateway device at a user premises. Hence, elements shown in FIG. 1 that may reside in the user premises gateway device include the user premises-side network function or NF (switch, router or bridge) and the LAN termination for communication with the endpoint devices implementing the application client functions. Thus, with reference to FIG. 1, the first interface, as described above, for enabling bi-directional network layer communications on the user's side of the premises with one or more of the associated endpoint devices resides at the NI Layer and provides the LAN Termination referenced therein. FIG. 1 also depicts the WAN termination providing connectivity to the wide area network (network-side NF—Internet or private wide area data network). The gateway device's second interface, as described above, for enabling bi-directional network layer communications for the associated endpoint devices via a wide area network resides at the NI Layer and provides the WAN Termination referenced therein. The gateway device's second interface also enables bi-directional communications between it and the service management center via the WAN.

With reference to FIG. 1, the core of the logical capacities of the service management center resides on the Service Provider Network, and is depicted as the Application Service Management (ASM) portion of the Application Service Delivery Platform in the AS Layer. The ASM function is implemented in the service management center, which is external to the user premises, and, perforce, on the network side of the Network Service Provider Demarcation. The ASL and ASE functions maintain logical connectivity or interaction with the Application Service Management (ASM) function in the service management center, typically via communication through a wide area network. This logical connectivity is established through an always-on (or on an as needed, periodic basis), secure communication channel between the User Premises AS Layer (ASL and ASE) and the Service Provider AS Layer (ASM) at the service management center. The service management center and the communications of the center with one or more of the gateway devices provides an infrastructure support and/or management of the application services offered to endpoint devices and their users by the logic implemented in the gateway device(s). Effectively, the ASD, considered in its entirety, extends all the way to the User Premises and traverses the Network and Network Service Provider Demarcation. The secure communications channel is established through the NF Layer and the NI layer.

The examples discussed herein also introduce a logical platform management layer to the user premises-side, which allows for inter-layer allocation of local resources. This function guarantees access between the Application Service Logic function on the user premises network and the applications service management function in the service management center by assuring that the local user premises hardware and software modules are functioning at a required state (CPU and memory usage, bandwidth usage, QoS settings, etc.) in order for the ASL to have the necessary resources to establish its required communications path to the ASM.

The platform management layer is also responsible for implementing that part of the managed application services to be performed by the gateway device. In that regard, the platform manager secures and manages the overall hardware platform, given that in this scenario, the NF layer and the AS layer reside on one hardware platform. This secure hardware platform provides a robust and secure operating environment for the AS Layer. So, to establish a secure and robust hardware operating environment, the platform manager must interface with all the layers above it and allow for bi-directional management information flow among all of the functions. For example, if the Application Client is a telephony application and the desired application is call processing, the application must first connect to the LAN termination interface (1). Then a connection must be established to the AS Layer through the NF layer (2). At this point the platform manager determines if there are sufficient resources available for this to take place on the routing and switching modules and if there is not sufficient resources on either the LAN Termination interface or the NF layer functions, it would take the necessary corrective measure to free up the required resources so that the application can execute properly (e.g. prioritize packets, throttle bandwidth, attempt to reduce noise on an RF interface, or free up time slices on a TDMA interface such as MoCA). Once that is done, the connection is established to the AS Layer (3), where the ASE and ASL, having been updated by the ASM in the network, respond instantaneously to the Application Client, completing the service request.

Application services represent functionalities, implemented in the higher layer(s) of the protocol or logical stack above the network layer(s) that may extend up to the top application layer (layer 7 of the OSI model). An application service, for example, provides application server communication with a client functionality of one or more endpoint devices, for the respective service, communicated on top of network layer communications through the interfaces. In the examples, the services are provided on a subscription service basis to users at the premises. Hence, the application service logic provides enforcement regarding authorization, authentication, configuration, and/or use of the respective service via the endpoint devices. The application service includes service and feature functions, implemented and controlled by the application service logic. Management of the application service is based on communications with the service management center via the wide area network.

The illustrated architecture of the gateway device-service management center network enables other features and capabilities that have not previously been available to the user. For instance, peer-to-peer application communication between or among gateways is possible without the need to go through, or utilize resources at, an external service management center. Communications through the service management center are also possible. In addition, given the considerable functionality present in the gateway device, and its ability to manage the various endpoint devices associated with it (as explained below), the user interface with the gateway can be presented and utilized on the home TV. Additionally, information from other endpoint devices, such as the PC, network sources (such as an RSS (Really Simple Syndication) service), may now be overlaid on the TV screen so that, for example, PC messages, or weather information, can be viewed on the TV screen, and the functionality of the PC (or other home-networked endpoint devices) can be accessed from the TV screen.

As shown by the discussion of FIG. 1, application service programming is logically positioned on a user premises side of a logical network demarcation forming an edge of the wide area network at the user premises, that is to say on the user premises side of the Network Service Provider Demarcation. The gateway device programming however, also defines a logical service provider-user demarcation between the user premises and the application service provider, as will be described in more detail with regard to FIG. 2.

Figure 2:
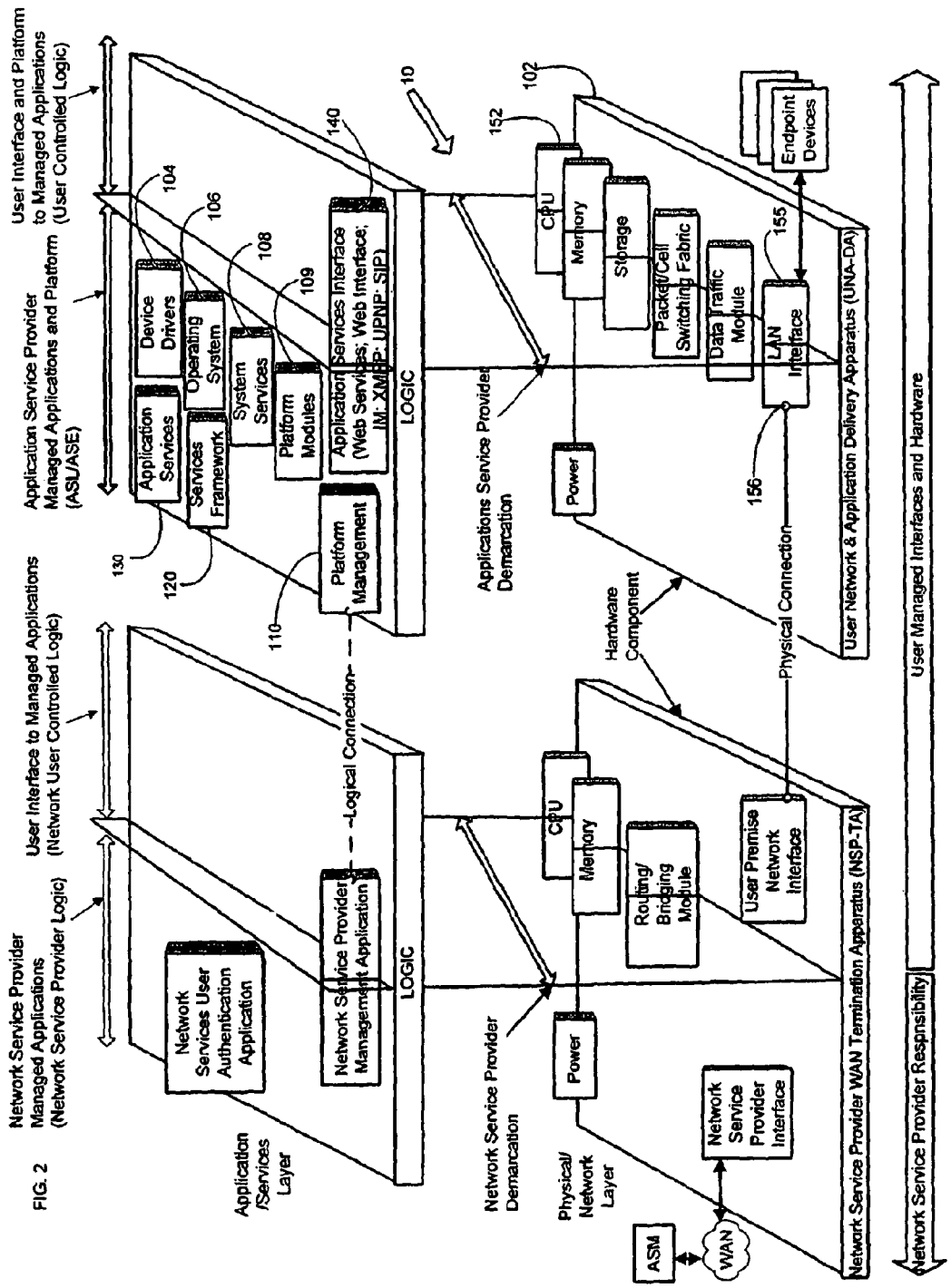
FIG. 2 is a high-level depiction of the logical architecture of the software and hardware of a multi-services applications gateway device, together with a network service provider termination apparatus for broadband connection to a wide area network, and shows the first demarcation as well as a second demarcation between the Application Service Provider and the User.

FIG. 2 depicts logical and physical elements as may be deployed at a user premises. At the Physical/Network layer shown therein, the drawing shows an example of user premises hardware components required for delivering data services (i.e. Internet connectivity) along with a separate, non-integrated managed hardware used in delivering a set of managed application services (e.g. IM, VOD, IP telephony). The Network Service Provider Wide Area Network Termination Apparatus (NSP-TA) allows for a typical termination of a Wide Area Network Services connection, such as DSL, Cable, Fiber, etc, by a network services provider. The NSP-TA provides the WAN Termination in the NI Layer (FIG. 1). The NSP-TA may be an existing user-premises device, provided by the carrier supplying network services to the premises. FIG. 2 also depicts the Network Service Provider Demarcation at the hardware level.

If configured as a standalone device, the NSP-TA device is required to have its own CPU, Memory, physical interfaces and logic control. In order for Network Service Providers to deliver managed services, they typically require a management element controlled by the CPU on the NSP-TA. To depict these logical elements residing on the hardware components, FIG. 2 includes a representation of the user premises Application Services Layer above the hardware layer. This layer corresponds to the AS Layer of FIG. 1, but without reference to any logical elements residing at the network services provider. The management element, represented by the Network Service Provider Managed Application, allows the network service provider to determine the status of the network hardware device and interfaces as well as maintain a certain degree of security enforcement at the customer premises.

As noted, the network service functionality is at the NI and NF Layers and generally does not extend to the AS Layer(s) beyond basic authentication, authorization and state management. As with the hardware components, the logical elements also have a Network Service Provider Demarcation as shown in FIG. 2. On the WAN side, depicted as the Network Service Provider Managed Applications side, of the Network Service Provider Demarcation, resides the applications that are managed, and under the exclusive control, of the network service provider (the Network Service Provider Logic). The User Interface to Managed Applications is present on the LAN side of the Network Service Provider Demarcation within the Application Services Layer. Within this interface resides programming and logic available to users other than the network service provider referred to as the Network User Controlled Logic. The Network User Controlled Logic, which is depicted at the Application Services Layer in FIG. 2, provides a user interface to the Network Service Provider Logic and, to the extent permitted by the Network Service Provider Logic, interaction with or communication between the user and network service provider through the Network User Controlled Logic and the Network Service Provider Logic, and to the NSP-TA hardware components. The Network User Controlled Logic allows for the User of the hardware to make certain, minimal programming changes relevant to their preferences (e.g., user name and password changes, local IP addresses changes, local interface selection). All user devices typically can only communicate with the NSP-TA through one or more of the User Premises Network Interfaces. The user can modify the Network User Controlled Logic through the User Premises Network Interface. The Network Service Provider Demarcation is typically within the NSP-TA, logically dividing the Network Service Provider Interface and the User Premises Network Interface modules. The network service provider does not have any in-depth visibility or significant responsibility beyond the Network Service Provider Demarcation.

In the example, the User Network and Application Delivery Apparatus (UNA-DA), shown on the right hand side of FIG. 2, is a separate managed gateway device 10 that a managed-service provider (which may be different than the network service provider) would control in delivering a set of application services to the user premises. This device is required to have its own dedicated CPU, memory, logic control, as well as its own dedicated set of interfaces. The UNA-DA includes one or more Network Interfaces providing connectivity to the NSP-TA as well as to user premises endpoint devices. The interfaces provide the LAN Termination functionality at the NI Layer (FIG. 1). One skilled in the art will readily recognize, however, that the physical connection that connects the UNA-DA to the NSP-TA also provides connectivity for the UNA-DA to the public (WAN side) network, and is the means by which the UNA-DA accesses the public network. The end point devices connected to the LAN Interface are on the private (LAN) side of that interface. The UNA-DA also includes a switch, router or bridge for the NF Layer.

Programming elements of the UNA-DA in the gateway device 10 are depicted at the Application Services Layer of the UNA-DA. Certain logical elements, depicted as the Application Service Provider Managed Applications and Platform in FIG. 2, on which resides, inter alia, the programming corresponding to the ASL and ASE of FIG. 1, are managed by the managed application service provider's network control center, e.g. by the ASM through a wide area network (WAN) by means of a control channel to the Application Service Provider Managed Applications and Platform. The Application Service Provider Managed Applications and Platform includes a platform management logic module that, with other programming in the Platform and the ASM, allows the managed application service provider to control the hardware elements of the UNA-DA in addition to any other relevant application services logic or hardware that may reside on the user premises. For example, this programming enables a managed application service provider to control and manage the hardware elements on the UNA-DA to ensure proper use and allocation of the UTA-DA's processing, memory, storage, and bandwidth, to monitor local hardware security and generate needed alarms or protection sequences, and to prioritize applications based on a set of established policies. The user would have control over specific parameters of application services obtained through the UNA-DA, through the User Interface and Platform to Managed Applications (User Controlled Logic) shown in FIG. 2. These parameters allow the user to control the local behavior of the interfaces and to configure the specific applications to accommodate the user network as configured by the user and to implement the user preferences for those applications.

Hence, FIG. 2 illustrates the logical architecture of the software and hardware of the UNA-DA in the form of a multi-services applications gateway device 10, together with a network service provider termination apparatus for broadband connection to a wide area network in this case implemented by the NSP-TA. The gateway device 10 is an application delivery apparatus, for delivering application services to endpoint devices using network layer communications through the network termination apparatus and the wide area network. The drawing also illustrates relevant demarcations between functionalities of the gateway device and termination, which delineate control/management access. The arrangement of the ASL and ASE logic between the two demarcations and the attendant logical demarcations in management access to the hardware resources at the premises result in significant management control by the application service provider and relieve the user of significant burdens in arranging and configuring the systems/services at the premises. Hence, we will consider the demarcations and the resulting relationships to the provider and the user at the various layers, in more detail.

As outlined above, the logical Network Service Provider Demarcation is formed at the edge of the wide area network (WAN) at the user premises, that is to say between the WAN and the equipment in the user premises. The arrows at the bottom of FIG. 2 show that the area covered to the LEFT of the Network Service Provider Demarcation (as depicted by the lower arrow on the left of vertical plane) is the Network Service Providers responsibility. From the perspective of a network service provider, anything to the RIGHT of that first demarcation (as depicted by the lower arrow on the right of the vertical plane) normally would be the customer's responsibility. As shown, this separation at the first demarcation includes delineation among the hardware elements for the NSP-TA.

As shown in FIG. 2, the application services layer also defines an Application Service Provider Demarcation, which extends through the hardware modules on the "Hardware Components" plane as well as the programming in the logical application services plane. In this way, the drawing depicts those modules that are under the responsibility of Application Service Provider (as depicted by the top middle bi-directional arrow). On the logic plane, the user can interact with the managed services through the Application Services Interface function 140, and the Application Service Provider can interact with the Network Service Provider's managed Applications through the Network Service Provider Managed Application function. This is an optional function but it helps show how the UNA-DA can interface with Network devices from a network services provider, and provide a unified application interface to both hardware elements (NSA-TA, UNA-DA). This management relationship is represented by a dotted line on the logic layer between the Platform Management Logic module 110 and the network service provider management application in the NSP-TA. In effect, the application service provider can "manage" the NSP-TA for the user, even though it is not the application service provider's hardware. In the case where the application service provider is a network service provider as well (the NSP-TA is the application service provider's own hardware), then it would work in practically the same way.

FIG. 2 also shows how the programming effectively partitions the hardware at the Application Service Provider Demarcation, which gives the application service provider the ability to provide a managed Peer-2-Peer private service that will enable that provider to use the UNA-DA for performing distributed computing, search, indexing, file backup, sharing, etc., all managed and controlled by the provider's service management center.

The arrows at the top of FIG. 2 thus show the delineations in management responsibility created by the two logical demarcations. As at the bottom, the area covered to the LEFT of the Network Service Provider Demarcation (as depicted by the upper arrow on the left of first vertical plane) is the Network Service Provider's responsibility. Anything to the RIGHT of that second demarcation plane (as depicted by the upper arrow on the right of the second vertical plane) would be the customer's responsibility. However, the logic and hardware in the NSP-TA between the two vertical planes (as depicted by the upper arrow on the left of second vertical plane) is the Application Service Provider's responsibility. As noted above, a logical interface may be provided to the NSP-TA may enable the Application Service Provider's to assume the user's responsibility in managing the premises side of the NSP-TA as depicted by the upper arrow on the right of the first vertical plane.

To identify the separation of, and distinguish between, the programming and hardware components subject to control by the application service provider and those subject to control by the user premises, FIG. 2 identifies a dividing line across the logical elements of the UNA-DA, and a corresponding dividing line across hardware components, referred to as the Applications Service Provider Demarcation. The Applications Service Provider Demarcation is flexible in that it may extend logically through the Application Services Interface (and, in a hardware context, through the Network Interface) to other devices that are under the logical control of the Application Services Provider Managed Applications and Platform, given that "services" are not restricted to a specific hardware boundary.

There is no hard requirement for cross management between the UNDA-DA and the NSP-TA. Under this first scenario the user is responsible for making the configuration changes in the specific user controlled logic modules in order to get the two devices to communicate with each other. Optionally the two sub-systems can be combined together, either physically in one hardware device, or logically as two separate hardware devices, but having one managed interface.

As noted, the two hardware regimes described above (NSP-TA and the UNA-DA) may be combined into one managed hardware platform and, thereby, replace the need for the user to have access to the User Premises Network Interface with the logic residing in the Platform Management logic module of the Application Service Provider Managed Applications and Platform (compare to above-discussed FIG. 10). This would in effect replace the "user" access with a managed "machine" access, for aspects of the NSP-TA, as well as aspects of the application services offered through the UNA-DA. Thus, the combination creates an integral gateway device providing both network service and application services, under centralized management. Although integrated, network interconnect functions of the NSP-TA may still be managed by the network service provider, as in the example of FIG. 2. Those skilled in the art will readily see additional combinations and configurations for the hardware comprising the NSP-TA and the UNA-DA. For example, in a further embodiment, all the hardware dedicated to the Network Service Provider Interface may reside and be integral with the hardware comprising the UNA-DA. Thus, the hardware for the WAN interface may reside on the UNA-DA.

Figure 3A:
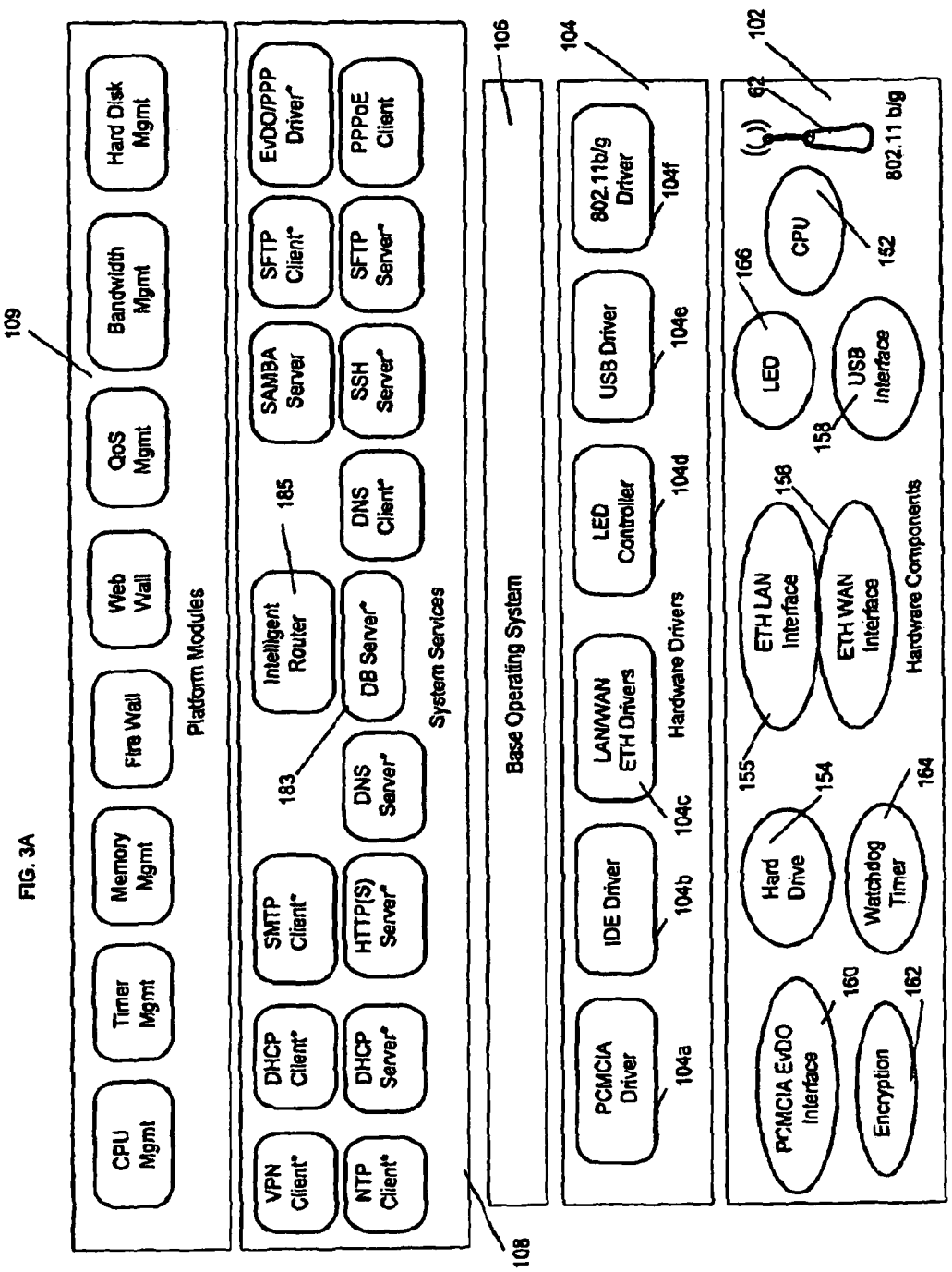
FIGS. 3A to 3C depict the software and hardware architectures of the multi-services applications gateway device.
Figure 3B:
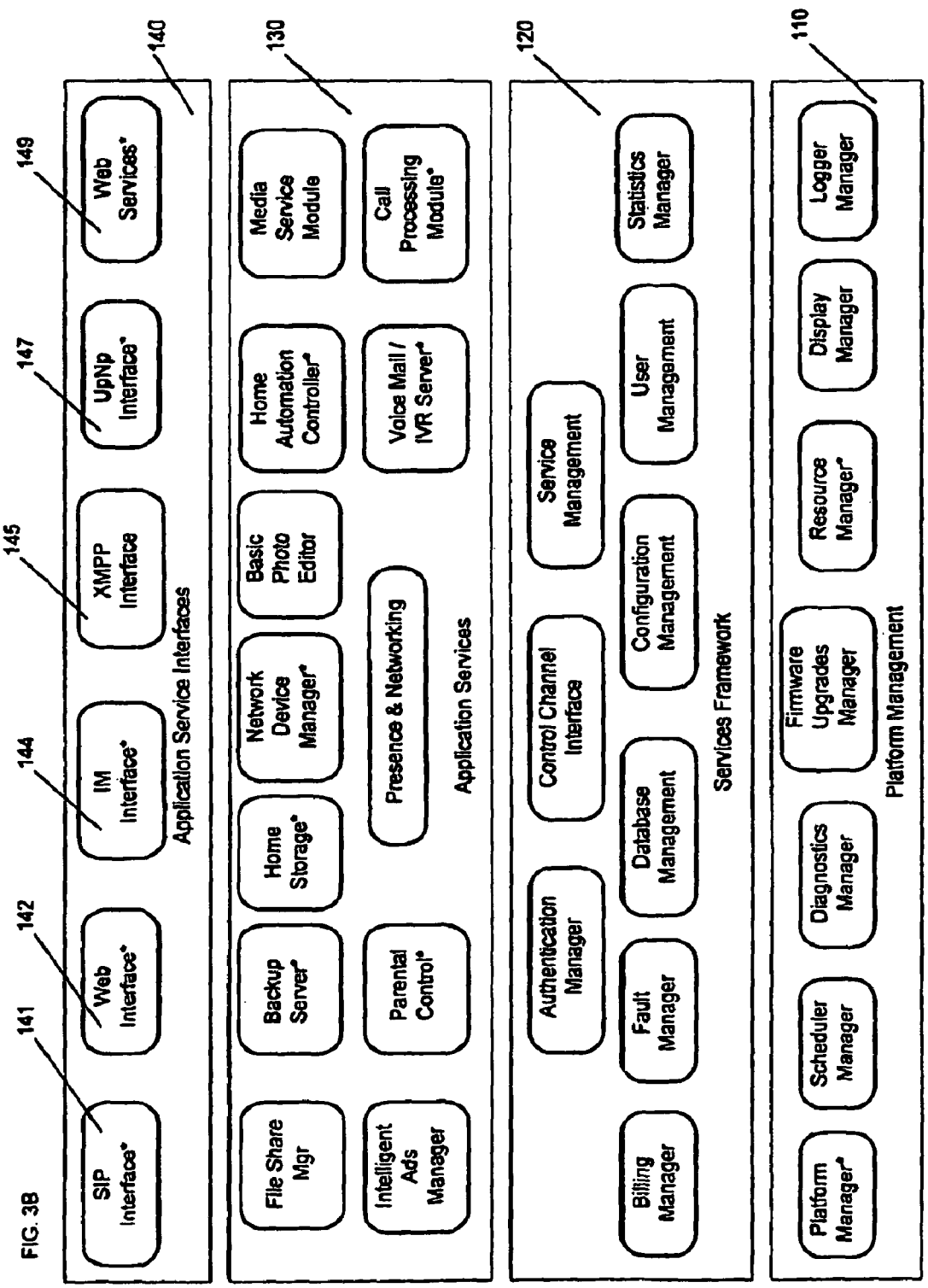

The composition of the premises gateway device 10, earlier described with reference to FIG. 2, is now described in greater detail with reference to that drawing together with FIGS. 3A-3C. FIG. 2 illustrates the relationship of the demarcations to hardware and software of the gateway device 10 and an associated NSP-TA device providing the wide area network termination at the user premises. As shown in FIGS. 3A and 3B, the gateway device 10 utilizes a layered architecture, which enables the encapsulation of similar functionality and the minimization of dependencies between functions in different layers. FIG. 3A shows the lower portion of the layered architecture, and FIG. 3B shows the upper portion of the layered architecture. The completed set of layers can be conceptualized as if FIG. 3B was combined with FIG. 3A, with the layers of FIG. 3B above those of FIG. 3A. FIGS. 2, 3A and 3B also depict exemplary functionality (hardware and logical) resident in each of the layers.

The layers include a hardware layer 102, and device driver software 104 for allowing the processor to operate other hardware elements of the gateway device 10. FIG. 3C is a functional block diagram illustrating interconnection of exemplary elements of the hardware layer 102.

The logical elements of the NI Layer residing on the gateway device 10 are found in the Hardware Drivers 104, which govern the operation of the Hardware Components 102. The processor runs an operating system shown at layer 106, which plays a role in each of the NI, NF, AS and Platform Management Layers (FIG. 1). The layered architecture 100 also includes software for systems services 108 and for the platform management layer shown at 110 in this drawing. Logical elements represented by the NF Layer depicted in FIG. 1 are comprised of elements from the system services 108. In a similar fashion, the Platform Management Layer depicted in FIG. 1 is implemented in the exemplary architecture of FIGS. 2, 3A and 3B by the platform modules 109 and the platform management layer 110.

Particular logical elements comprising the ASL and ASE functionalities of the AS Layer represented in FIG. 1, and that reside on the gateway device 10 (predominately in the Application Service Provider Managed Applications and Platform of the UNA-DA shown in FIG. 2) are depicted in FIG. 3B, and comprise logical elements from each of services framework 120 and application services 130. The layered architecture facilitates reuse or sharing of logic across the layers to provide a managed service framework 120. The service management functionality provided by the framework 120 enables deployment of new services as pluggable modules comprising computer readable instructions, data structures, program modules, objects, and other configuration data, in a plug and play fashion. The layered service architecture additionally provides the gateway device 10 with intra-process communication and inter-process communication amongst the many services and modules in the service framework layer 120 that enables the provisioning, management and execution of many applications and services 130, depicted e.g. services A, B . . . N at the gateway device 10. Additionally provided are the application service interfaces 140 that enable communications from user endpoint devices with service environments. In that regard, the interfaces 140 enable the application service logic 130 to act as an appropriate server with respect to client device application or service functionality of the endpoint devices. The application service interfaces 140 also enable corresponding interfaces for the application services with aspects of service environments implemented outside the user premises. In that regard, the interfaces 140 enable the application service logic 130 to act as an appropriate client, for extending the application or service related communications to a server accessed via the wide area network 99, such as a server of the service management center 50. For example, the gateway device may appear as a SIP server to a SIP client in an end point device, e.g. for a VoIP telephone service; but the gateway device will appear as a SIP client with respect to some related functions provided by a server (such as a SIP directory server) provided by the service management center 50.

FIG. 2 thus depicts a high level service framework upon which are built services, e.g. downloaded via the service management center network 50 and a wide area network as packages that are developed and offered by a service entity for customers. These services may be offered as a part of a default service package provisioned and configured at the gateway device 10, or provisioned and configured subject to user subscription and may be added at any time as plug-in service modules in cooperation with the service management center, as discussed later. It is understood however, that while the gateway device 10 includes much of the intelligence or service logic for providing various services, it is also possible that for some services, some or all of service logic may reside in the service management center network and/or with a third party provider.

As shown, the base support layer 102 comprises hardware components including a processor device 152, e.g. a system on chip central processing unit ("CPU") that includes processing elements, digital signal processor resources and memory. The CPU 152 is also coupled to a random access memory or "RAM" (see FIG. 3C) and additionally, non-volatile hard drive/disk magnetic and/or optical disk memory storage 154. Generally, the above-identified computer readable media provide non-volatile storage of computer readable instructions, data structures, program modules, objects, service configuration data and other data for use by the gateway device. The non-volatile hard drive/disk magnetic and/or optical disk memory storage 154 may be partitioned into a network side which is the repository for storing all of the service logic and data associated with executing services subscribed to by the user, and, is invisible to the user, and, a user side for storing user generated content and applications in which the user has visibility. Although not shown, the CPU 152 may be coupled to a microcontroller for controlling a display device.

Additional hardware components include one or more Ethernet LAN and WAN interface cards 155, 156 (e.g. 802.11, T1, T3, 56 kb, X.25, DSL or xDSL) which may include broadband connections (e.g. ISDN, Frame Relay, ATM, Gigabit Ethernet, Ethernet over SONET, etc.), wireless connections, or some combination of any or all of the above. The card 155 referred to as the LAN interface card provides data communication connectivity within the user premises, essentially, for communication via a user premises network 60 with any endpoint devices operating within the premises. The card 156 referred to as the WAN interface card provides data communication connectivity for the gateway device 10 and endpoint devices communicating through the device 10, with the wide area IP network 99. For additional or alternative customer premises communications, the hardware components 102 may also include one or more USB interfaces 158; and for additional or alternative communications with the wide area network, the hardware components may also include the PCMCIA EvDO interface card 160.

A data encryption/decryption unit 162 is additionally provided as part of the architecture for providing data security features. A watchdog timer element or like timer reset element 164 is provided as is one or more LED devices 166 for indicating status and other usable information to users of the gateway device 10.

The gateway device provides an in-premises footprint enabling the service connectivity and local management to client(s). The implementation of functions and the related control such as a router (with quality of service (QoS)), firewall, VoIP gateway, voice services and voice mail may be embodied and performed within the CPU 152.

The discussion of the gateway hardware layer above and the illustration thereof in the drawings provides a high-level functional disclosure of an example of the hardware that may be used in the gateway device. Those skilled in the art will recognize that the gateway device may utilize other hardware platforms or configurations.

Continuing, as shown in FIG. 3A, the device driver layer 104 comprises a multitude of driver interfaces including but not limited to: a PCMCIA driver 104*a*, for enabling low level communication between the gateway CPU 152 and the PCMCIA network interface card wireless interface, an IDE driver 104*b* for enabling low level communication between the gateway CPU 152 and the local mass memory storage element, and LAN/WAN drivers 104*c* for enabling low level communication between the gateway CPU 152 and the respective network interface cards 155 and 156. The exemplary driver layer also includes an LED driver/controller 104*d* for driving LED(s) 166, a USB driver 104*e* allowing CPU 152 to communicate via USB interface 158, and an 802.11 b/g (or n) wireless network driver 104*f* for allowing the CPU 152 to communicate via the access point 62. The drivers provide the logical connectivity between the low level hardware devices 102 and the operating system 106 which controls the execution of computer programs and provides scheduling, input-output control, file and data management, memory management, and communication control and related services for the gateway device. With respect to the operating system 106, the gateway computing may support any embedded operating system, any real-time operating system, any open source operating system, any proprietary operating system, or even any operating systems for mobile computing devices as long as the operational needs of the client discussed herein below can be met. Exemplary operating systems that may be employed include Windows®, Macintosh®, Linux or UNIX or even an embedded Linux operating system. For instance, the gateway device 10 may be advantageously provided with an embedded operating system 106 that provides operating system functions such as multiple threads, first-in first-out or round robin scheduling, semaphores, mutexes, condition variables, message queues, etc.

Built upon the system operating system 106 is a system services support layer 108 providing both client-like and server-like functions that enable a wide range of functionality for the types of services capable of being managed by the gateway device 10. For instance, there is provided a Dynamic Host Configuration Protocol (DHCP) client and server software modules. The DHCP client particularly requests via a UDP/IP (User Datagram Protocol/Internet Protocol (e.g. Ipv4, Ipv6, etc.) configured connection information such as the IP address that the gateway device 10 has been dynamically assigned by a DHCP service (not shown), and/or any the subnet mask information, the gateway device should be using. The DHCP server dynamically assigns or allocates network IP addresses to subordinate client endpoints on a leased, e.g. timed basis. A Virtual Private Network (VPN) client may communicate via a proxy server in the service control network 50, according to a VPN protocol or some other tunneling or encapsulation protocol. An SMPT client handles incoming/outgoing email over TCP, in accordance with the Simple Mail Transfer protocol. A Network Time Protocol (NTP) (RFC 1305) generates and correlates timestamps for network events and generally provides time synchronization and distribution for the Internet. A Domain Name Server (DNS) client and server combination are used by the IP stack to resolve fully-qualified host or symbolic names, i.e. mapping host names to IP addresses.

An HTTP(S) server handles secure Hypertext Transfer Protocol (HTTP) (Secure Sockets Layer) communications and provides a set of rules for exchanges between a browser client and a server over TCP. It provides for the transfer of information such as hypertext and hypermedia, and for the recognition of file types. HTTP provides stateless transactions between the client and server.

A Secure File Transfer Protocol (SFTP) client and server combination govern the ability for file transfer over TCP. A SAMBA server is an Open source program providing Common Internet Files Services (CIFS) including, but not limited to file and print services, authentication and authorization, name resolution, and service announcement (browsing). An EvDO/PPP driver includes a Point-to-Point Protocol (PPP) daemon configuration for wireless broadband services. A PPPoE (Point-to-Point Protocol over Ethernet) client combines the Point-to-Point Protocol (PPP), commonly used in dialup connections, with the Ethernet protocol; and it supports and provides authentication and management of multiple broadband subscribers in a local area network without any special support required from either the telephone company or an Internet service provider (ISP). The gateway device 10 is thus adapted for connecting multiple computer users on an Ethernet local area network to a remote site through the gateway and can be used to enable all users of an office or home to share a common Digital Subscriber Line (DSL), cable modem, or wireless connection to the Internet. A Secure Shell or SSH server implemented with HTTP protocol provides network protocol functionality adapted for establishing a secure channel between a local and a remote computer and encrypts traffic between secure devices by using public-key cryptography to authenticate the remote computer and (optionally) to allow the remote computer to authenticate the user.

Additionally provided as part of the system services layer 108 is intelligent routing capability provided by an intelligent router device 185 that provides Quality of Service (QoS, guaranteed bandwidth) intelligent routing services, for example, by enforcing routing protocol rules and supporting unlimited multiple input sources and unlimited multiple destinations and, particularly, for routing communications to networked digital endpoint devices subordinate to the gateway. A central database server 183 handles all of the database aspects of the system. For example, the database server 183 maintains and updates registries and status of connected digital endpoint devices, maintains and updates service configuration data, services specific data (e.g. indexes of backed-up files, other service specific indexes, metadata related to media services, etc.) and firmware configurations for the devices. The database server 183 may also store billing and transaction detail records and performance diagnostics. The database server logic 183 also satisfies all other database storage needs as will be described in greater detail herein.

Referring back to FIGS. 2 and 3A, built on top of the system services layer 108 is the platform module layer 109. The platform module layer 109 provides a software framework for operating system and communications level platform functionality such as CPU management; Timer management; memory management functions; a firewall; a web wall for providing seamless WWW access over visual displays via access technologies enumerated herein, e.g. HTTP, SMS (Short Messaging Service) and WAP (Wireless Access Protocol); QoS management features, bandwidth management features, and, hard disk drive management features. The layered architecture further provides a platform management layer 110 as shown in FIG. 3B, which together with the platform modules 109 implement the platform management layer/logic discussed earlier (with regard to FIG. 1). In the layered architecture, the platform management layer 110 (and elements shown above it in FIG. 3B) is built upon the platform modules 109.

The features/functions in the layer 110 include a platform manager module which will implement unique rules based notification services. On operational failure, for example, when one of the components or services fails, the platform manager would detect this failure and take appropriate action such as implement a sequence of rules to provide notification to a user. A scheduler module manages scheduled device maintenance, managing scheduled services, e.g. back-up services, etc. The layer 110 also includes a diagnostics module and a firmware upgrades management module for managing firmware upgrades. A resource management module manages system resources and digital contention amongst the various resources, e.g. CPU/Bandwidth utilization, etc. A display management module and a logger management module store and track gateway log-in activity of users and applications, e.g. voice call logs, at the user premises. The platform management layer 110 in concert with resource and service management components enforces the separation of network side managed service control and user side delegations depending upon service subscriptions and configurations. For example, the platform and resource management encompass rules and guidelines provided according to subscribed services that act to enforce, manage and control input/output operations, and use of hard drives space etc. A demarcation point, logically depicted as the Application Service Provider Demarcation in FIG. 2, is thus defined that provides a hard line between what is "owned by" the customer and what is "owned by" the application service provider.

The logical platform management layer 110 allows for inter-layer allocation of local resources. This function guarantees access between the application service/management logic implemented at the higher layers in the gateway device 10 and the applications service management function in the service management center 50, by assuring that the local user premises hardware and software modules are functioning at a required state (CPU and memory usage, bandwidth usage, QoS settings, etc.). The platform manager is also responsible for implementing that part of the managed application services to be performed by the gateway device. In that regard, the platform manager secures and manages the overall hardware platform, given that in this scenario, the network function layer and the application service layer reside on one hardware platform. This secure hardware platform provides a robust and secure operating environment for the application services layer. So, to establish a secure and robust hardware operating environment, the platform management layer must interface with all the layers above it and allow for bi-directional management information flow among all of the functions.

Referring back to FIGS. 2 and 3B, built on top of the platform management layer 110 is the Services Framework 120, which provides a library of application support service processes that facilitate data collection and data distribution to and from the multimedia endpoint devices. The application support service processes include, but are not limited to: an authentication manager for use in authenticating devices connected to the gateway device; a billing manager for collecting and formatting service records and service usage by endpoint devices, e.g. calls, back-up services etc.; a fault manager for detecting and managing determined system and/or service faults that are monitored and used for performance monitoring and diagnostics; a database manager; a control channel interface via which the gateway initiates secure communications with the operations support infrastructure; a configuration manager for tracking and maintaining device configuration; a user manager, a service manager for managing service configuration and firmware versions for subscribed services provided at the gateway device; and a statistics manager for collecting and formatting features associated with the gateway device. Statistics may relate to use of one or more services and associated time-stamped events that are tracked.

Built on top of the Services Framework layer 120 is the Application Services layer 130 providing library of user application services and application support threads including, but not limited to: file sharing functionality; backup services functionality; home storage functionality; network device management functionality; photo editing functionality; home automation functionality; media services functionality; call processing functionality; voice mail and interactive voice response functionality; presence and networking functionality; parental control functionality; and intelligent ads management functionality. The multi-services applications gateway 10 further provides application service interfaces 140 that are used to enable a variety of user applications and communications modalities.

For instance, the SIP Interface 141 is an interface to the generic transactional model defined by the Session Initiation Protocol (SIP) that provides a standard for initiating, modifying or terminating interactive user sessions that involve one or more multimedia elements that can include voice, video, instant messaging, online games, etc., by providing access to dialog functionality from the transaction interface. For instance a SIP signaling interface enables connection to a SIP network that is served by a SIP directory server via a Session Border Controller element in the service management center.

The Web Interface 142 enables HTTP interactions (requests and responses) between two applications. The Web services interface 149 provides the access interface and manages authentication as multi-services gateway devices access the service management center via web services. The IM Interface 144 is a client that enables the multi-services gateway device 10 to connect to one or more specific IM network(s). As further shown in FIG. 3B, the UpNp (Universal Plug and Play) interface enables connectivity to other stand-alone devices and PCs from many different vendors.

The XMPP interface 145 is provided to implement the protocol for streaming (XML) elements via the gateway device 10, in order to exchange messages and presence information in close to real time, e.g. between two gateway devices. The core features of XMPP provide the building blocks for many types of near-real-time applications, which may be layered as application services on top of the base TCP/IP transport protocol layers by sending application-specific data qualified by particular XML namespaces. In the example, the XMPP interface 145 provides the basic functionality expected of an instant messaging (IM) and presence application that enable users to perform the following functions including, but not limited to: 1) Exchange messages with other users; 2) Exchange presence information with other devices; 3) Manage subscriptions to and from other users; 4) Manage items in a contact list (in XMPP this is called a "roster"); and 5) Block communications to or from specific other users by assigning and enforcing privileges to communicate and send or share content amongst users (buddies) and other devices.

Figure 3C:
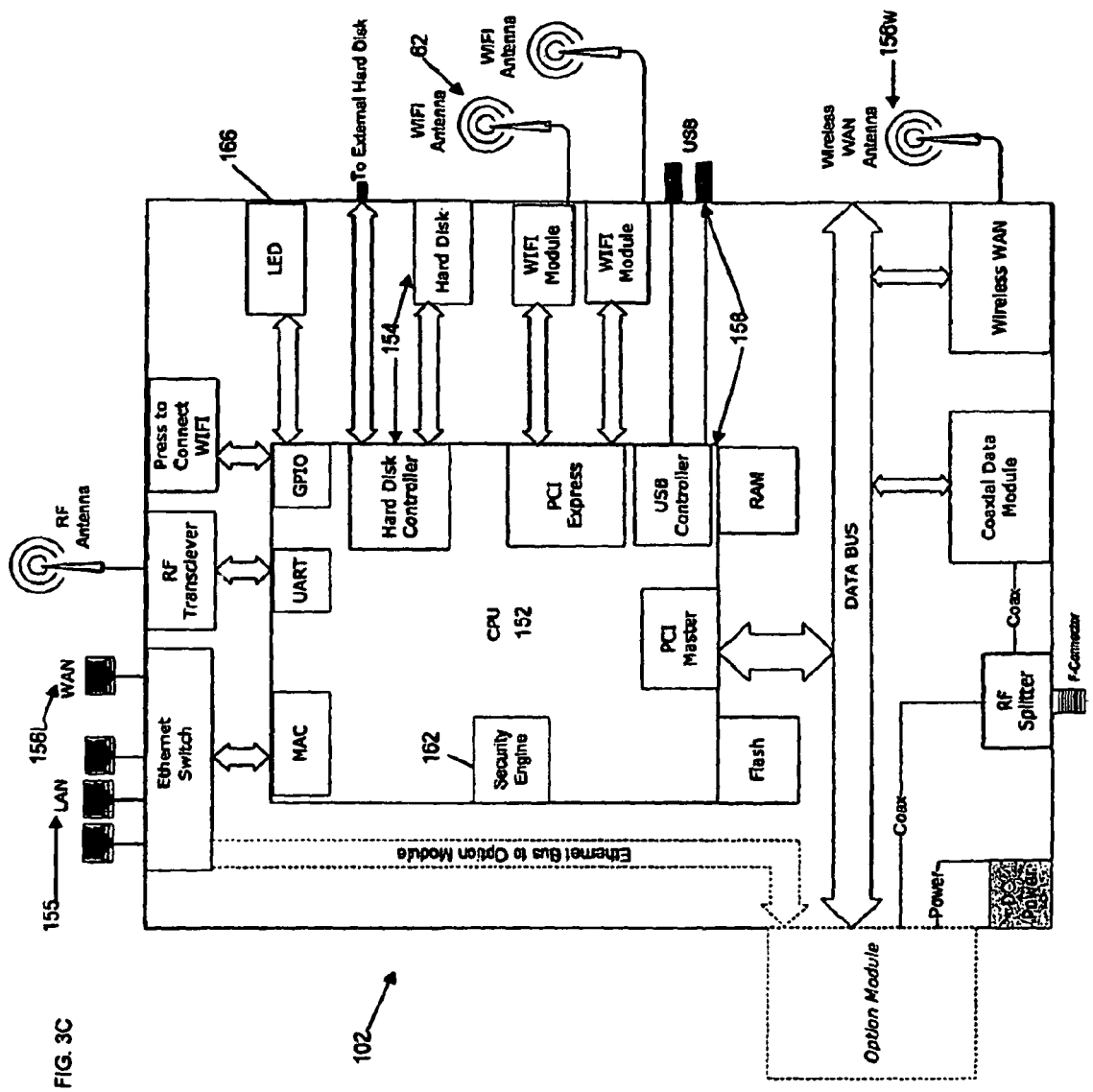

As noted, FIG. 3C provides a functional block diagram of exemplary elements of the hardware layer 102. For example, a system on a chip provides the CPU 152 and associated system components. The CPU 152 is also coupled to a random access memory ("RAM") and flash memory. The system on a chip also includes a hard drive controller for controlling a hard disk drive, and together the controller and drive form the hard disk example of the storage 154. An Ethernet switch and associated LAN port(s) provide the Ethernet LAN interface 155; and the Ethernet switch and associated WAN port provide a landline implementation of the WAN interface 156L, for connection to a broadband modem or the like implementing the NSP-TA. The WAN interface may also be wireless, as implemented at 156w for example by a wireless WAN module and associated antenna. An example of such an interface would be the EvDO interface discussed earlier. If the gateway device uses the wireless WAN interface 156w, there would be no separate NSP-TA.

In the example of FIG. 3C, a USB controller in the system on a chip and one or more associated USB ports provide the USB interface 158. The USB interface 158 may provide an alternate in-premises data communication link instead of or in addition to the wired or wireless Ethernet LAN communication. The system on a chip includes a security engine, which performs the functions of the data encryption/decryption unit 162.

The hardware layer 102 may also include an option module. The UNA-DA hardware components at layer 102 have multiple interfaces for connection to such an option module. These interfaces, by way of example, could be a data bus (e.g. PCI, etc), network interface (e.g. Ethernet (RJ45), MoCA/HPNA (Coax)) and Power feeds. The option module allows additional functionality to be added to the base UNA-DA functionality of the gateway device. For example, this additional functionality could be everything from support for a variety of extra Wide Area Network Interfaces (e.g. xDSL, DOCSIS, Fiber (PON), Cellular Packet, WIMAX, etc.), Media Processing (e.g. Cable TV termination, Digital Video Recording, Satellite TV Termination, etc); to Voice Processing (FXS, FXO, Speech Detection, Voice to Text, etc). The option module may have its own standalone CPU, Memory, I/O, Storage, or provide additional functionality by its use of the CPU, Memory, I/O, and storage facilities off of the main hardware board. The option module may or may not be managed directly by the Platform Management of the UNA-DA.

Those skilled in the art will recognize that functions of the service management center, which reside in the Application Service Management node on the Service Provider Network, as depicted in FIG. 1, may be implemented in a variety of different ways, on one or more computer hardware platforms connected to 10 gateway devices via a wide area network. FIG. 4 depicts an example wherein the implementation is on Internet or other wide area IP network 99. The example uses a distributed processing approach, in which the elements/platforms implementing the service management center are interconnected for communication and for wide area communication, and in this way, those elements form a network 50 for implementing the service management center.

As shown in FIG. 4, the service management center network, through the logical capabilities earlier depicted in FIG. 4 as the ASM module of the ASD Platform at the AS Layer, manages application services for a number of gateway devices 10, $10_1 \ldots 10_n$, located at various users' premises. These application services, shown as ASL and ASE in FIG. 1, implement their functionality within the Application Services Layer (FIG. 1), through programming that resides, at least in part, within the Application Service Provider Managed Applications and Platform of the UNA-DA (FIG. 2). As shown in FIG. 4, secure connectivity to the service management center network 50 is provided, in one embodiment, via a WAN Termination interface, such as Ethernet WAN 53 over a broadband connection via the public Internet 99, or, for example, via a wireless EvDO (Evolution Data Optimized) Internet data interface embodied as a PCMCIA (personal computer memory) wireless card 56. When the WAN Termination interface 53 is used, for example, it may provide connectivity to a broadband modem serving as the NSP-TA of FIG. 2, either as a separate unit or on a board included within the gateway device 10. If the wireless WAN interface is used, there may be no physical NSP-TA device, and the logic of the gateway device would implement functions of the NSP-TA as well.

As will be described in greater detail herein below, the service management center 50 generally provides a communications and processing infrastructure for supporting the variety of application services and related communications residing at the gateway devices 10, $10_1 \ldots 10_n$. In an exemplary embodiment, this infrastructure may be configured to provide a secure environment and may be IP-based. Preferably, this support architecture is designed for high availability, redundancy, and cost-effective scaling.

The secure platform for building and providing multiple application services for digital endpoints associated with a gateway device requires connectivity between the gateway device 10 and each of a user's devices (referred interchangeably herein as "endpoint devices" or "digital endpoint devices"). This connectivity may be provided by implementation of one or more USB ports (interfaces) 13, a wired Local Area Network connection such as provided by an Ethernet local area network (LAN) interface 16, or, a wireless network interface via a WiFi LAN access point 62 provided, for example, in accordance with the I.E.E.E. 802.11 b/g/n wireless or wireless network communications standard. These physical interfaces provide the required network interconnectivity for the endpoint devices to connect to the multiple application services. Although not shown in FIG. 4, this connectivity between digital endpoint devices and the gateway device may be accomplished by other means, including, by way of example, through of a virtual private area network connection accessed through a WAN interface.

That is, the gateway device 10 interfaces with digital endpoint devices including, but not limited to: a home automation networking device 20 (e.g. X10, Z-Wave or ZigBee) for wired or wireless home network automation and control of networked home devices such as a switch controller 22, sensor devices 23, automatically controlled window blinds 24, a controlled lighting or lamp unit 25 etc, individual or wired or wireless network of personal computing (PC) and laptop/mobile devices 30a, ..., 30c that serve as file sources, control points and hosts for various other client endpoints, one or more television display devices 32 including associated set top boxes (STB) 35a or digital media adapters (DMA) 35b, one or more VoIP phone devices (e.g. SIP phones) 40, or other devices (not shown) that convert IP interfaces to PSTN FXO and FXS interfaces.

As noted earlier, the gateway device 10 may provide an interface 35b to the Digital Media Adapter (DMA) for television (TV) 32, which enables bidirectional wireline or wireless communication. This interface supports several functions for multiple services including, but not limited to: media (e.g., video and music) by enabling the transfer of media (e.g., video and music) to the TV; voice services, by providing for Called Line ID and for voice mail control; and provide Home Automation Services including status and control of networked home automation devices. The DMA element 35b converts audio and video (optionally) to a format suitable for a TV. In addition, the Digital Media Adapter 35b may be capable of receiving context-sensitive commands from a remote control device (not shown) and forwarding those commands to the gateway device 10. This enables the use of menus on the TV 32 for controlling application services and various features functions thereof, as offered by the gateway device 10. For example, the Media Adapter/TV combination is able to provide the following features including, but not limited to: display of media; media control functions, when enabled (FF, REW, STOP, PAUSE, etc); display of Calling Line Identification (CLID); control of voicemail; picture viewing; control of home automation; and user functions for the gateway device 10.

A Set Top Box 35a as shown in FIG. 4 also may handle media format conversion (for example NTSC to ATSC television RF signals), digital decryption and other DRM (digital rights management) functions; and Video On Demand Purchases, etc. The Set Top Box/TV combination may thus enable, by way of example: Media format conversion (for example NTSC to ATSC); decryption; other DRM functions (such as expiry of leases), prohibition of copying to digital outputs, function restriction, etc.; Video On Demand Purchases; and media control functions (e.g., FF, REW, STOP, PAUSE, etc.).

Whether provided by the DMA interface 35b and the TV 32 or by the set-top-box 35a and the TV 32, the communications to and from the TV provide a user interface for interaction with the gateway device 10. The programming of the gateway device supports, among other things, a graphical user interface (GUI) via the TV, sometimes referred to as the "ten-foot" interface.

With respect to PCs interfacing with the gateway device 10, PCs may serve as, among other things, file sources, control points and hosts for various software clients. Thus, the PC programming may work in conjunction with the ASL and ASE programming of the gateway device. Together, the PC programming and the ASL and ASE programming provide a more comprehensive and robust user experience: The gateway device 10 may further provide a bidirectional wireline or wireless interface 35c to a PC device 30b for supporting the transfer of media (e.g., video and music) to the computer for storage and viewing; for supporting voice services, e.g., by providing for calls from SIP soft clients; for file sharing, file back-up and home storage and home automation control functions. The access point 62 offers wireless data communications with a PC 30c. The gateway device interface through any PC may provide for the bidirectional moving of files, and status and control for the endpoint devices, including for example, status and control of networked home automation devices. In addition, using the PC interface, users may, for example, share files on the gateway devices, back-up or transfer files to the gateway devices or other storage; access personal page for notifications, RSS, shared photos, voicemail, etc. In addition to the IM and SIP capabilities of the gateway device, as described more below, PCs may also serve as a host for IM and SIP soft phone clients and other client devices. The client-server interaction of the PC with the application service logic of the gateway device 10 offers an alternative GUI for at least some of the services. The PC based GUI is sometimes referred to as the "two-foot" interface.

Although not shown in FIG. 4, other digital endpoint devices for which connectivity may be established with the gateway device 10 include, but are not limited to: personal music or media players, hi-fi audio equipment with media streaming capability, game stations, Internet radio devices, WiFi phones, WiFi or other wirelessly enabled digital cameras, facsimile machines, electronic picture frames, health monitors (sensor and monitoring devices), etc.

As described in greater detail herein, the gateway device 10 includes both a hardware and software infrastructure that enables a bridging of the WAN and LAN networks, e.g. a proxy function, such that control of any digital endpoint device at the premises from the same or remote location is possible via the gateway device 10 using, optionally, a secure peer and presence type messaging infrastructure or other communications protocols, e.g. HTTPS. For example, via any IM—capable device or client 80a, 80b respectively connected with an Instant Messaging (IM) or XMPP (Extensible Messaging and Presence Protocol) network messaging infrastructure, e.g. IM networks 99a; 99b such as provided by Yahoo, Microsoft (MSN), Skype, America Online, ICQ, and the like, shown for purposes of illustration in FIG. 4, a user may access any type of functionality at a subordinate digital endpoint device at the premises via the gateway device 10 and service management center 50 by simple use of peer and presence messaging protocols. In one exemplary embodiment, a peer and presence communications protocol may be used such as Jabber and/or XMPP. Particularly, Jabber is a set of streaming XML protocols and technologies that enable any two entities on the Internet to exchange messages, presence, and other structured information in close to real time. The Internet Engineering Task Force (IETF) has formalized the core XML streaming protocols as an approved instant messaging and presence technology under the name of XMPP (Extensible Messaging and Presence Protocol), the XMPP specifications of which are incorporated by reference herein as IETF RFC 3920 and RFC 3921. Thus, the gateway device is provided with functionality for enabling a user to remotely tap into and initiate functionality of a digital endpoint device or application at the premises via the IM-based messaging framework. In addition, the gateway device 10 and network connectivity to the novel service management center 50, provides, in a preferred embodiment, a secure peer and presence messaging framework, enabling real-time communications among peers via other gateway devices $10_1 \ldots 10_n$. For instance, the device 10 provides the ability to construct communication paths between peers with formal communications exchanges available between, for example, one gateway device 10, at a first premises and a second gateway device $10_n$ located at the remote premises. Thus, such an infrastructure provides for content addressing, enabling peers through remote gateway devices $10_1 \ldots 10_n$, to supply and request content such as files, media content or other resources of interest to a community of interest.

As noted above, the novel system architecture allocates the logical functionality of the ASD Platform (FIG. 1) between the gateway device 10 and the service management center 50 within an environment that enables communication and feedback at the AS Layer (FIG. 1) between the gateway device 10 and service management center 50. Thus, the gateway device 10, when operable with the service management center 50, makes possible the management of services for the digital home and facilitates the easy addition of new services or modification of existing services. Such services may include, for example, facility management (home automation), media content downloading and Digital Rights Management (DRM), device updates, data backups, file sharing, media downloading and transmission, etc., without the intermediary of a plurality of external service providers who may typically provide these individual services for every digital endpoint device in the home or premises. The programming for these services resides in the Application Service Provider Managed Applications and Platform of the UNA-DA (FIG. 2). That is, as earlier shown, the gateway device 10 is integrated with hardware and software modules and respective interfaces that handle all aspects of home automation and digital endpoint service and management for the home in a manner without having to rely on external service providers and, in a manner that is essentially seamless to the user. This, advantageously is provided by the service management center 50 which is able to access regions of the gateway device 10 that are not accessible to the user, e.g. for controlling the transport and storing of digital content and downloading and enabling service applications and upgrades and providing largely invisible support for many tasks performed by users.

For example, with the robust capabilities of the Application Service Provider Managed Applications and Platform (FIG. 2), the gateway device 10 is capable of handling all aspects of the digital home communications, e.g. IP, voice, VoIP, phone connectivity. In this example, the service logic located and stored at the gateway device 10 may provide soft-switch functionality for implementing call-processing features at the premises (rather than the network) for voice communications, and enabling management of other service features to be described. With the provision of central office type call services and other service features provided at the gateway devices $10_1 \ldots 10_n$, a distributed soft-switch architecture is built. The ASM logical functionality of the service management center 50, in cooperation with the ASE logical functionality of the gateway device, may, among other things, provide, manage and regulate, for example, service subscription/registration, authentication/verification, key management, and billing aspects of service provision, etc. With all of the service logic and intelligence residing at the gateway device, a service provider can offer customers a broad spectrum of services including, but not limited to: media services, voice services, e.g. VoIP, automated file backup services, file sharing, digital photo management and sharing, gaming, parental controls, home networking, and other features and functions within the home or premises (e.g. home monitoring and control). Users can access their content and many of the solution's features remotely. Moreover, software updates for the in-home devices that require updating are handled in an automated fashion by the system infrastructure. The service management center infrastructure additionally provides a web interface for third-party service providers to round out the service solutions provided at the gateway device for the premises. For example, a third-party service provider other than the managed service provider associated with the service management center may be allowed access through the infrastructure to particular endpoint devices to provide additional services such trouble shooting, repair and update services.

For the in-home services, the multi-services gateway device 10 connects the various service delivery elements together for enabling the user to experience a connected digital home, where information from one source (for example, voicemail) can be viewed and acted on at another endpoint (for example, the TV 32). The multi-services gateway device 10 thus hosts the various in-home device interfaces, and facilitates the moving of information from one point to another. Some of the in-home endpoint device processing duties performed by the gateway device 10 include, but are not limited to: 1) detecting new devices and provide IP addresses dynamically or statically; 2) functioning as a (Network Address Translator) NAT, Router and Firewall; 3) providing a centralized disk storage in the home; 4) obtaining configuration files from the service management center and configuring all in-home devices; 5) acting as a Registrar for SIP-based devices; 6) receiving calls from and delivering calls to voice devices; providing voicemail services; 7) decrypting and securely streaming media having digital rights management (DRM) encoding; 8) distributing media to an appropriate in-home device; 9) compressing and encrypting files for network back-up; 10) backing-up files to the network directly from gateway device; 11) handling home automation schedules and changes in status; 12) providing in-home personal web-based portals for each user; 13) providing Parental Control Services (e.g. URL filtering, etc.); 14) creating and transmitting billing records of in-home devices including, recording and uploading multi-service billing event records; 15) distributing a PC client to PCs in the home, used in support of the various services such as monitoring events or diagnostic agents; 16) storing and presenting games that users and buddies can play; 17) delivering context-sensitive advertising to the endpoint device; and, 18) delivering notifications to the endpoint device; and, 19) enabling remote access through the web, IM client, etc. Other duties the gateway device 10 may perform include: service maintenance features such as setting and reporting of alarms and statistics for aggregation; perform accessibility testing; notify a registration server (and Location server) of the ports it is "listening" on; utilize IM or like peer and presence communications protocol information for call processing and file sharing services; receive provisioning information via the registration server; utilize a SIP directory server to make/receive calls via the SBC network element to/from the PSTN and other gateway device; and download DRM and non-DRM based content and facilitating the DRM key exchanges with media endpoints.

While the gateway devices 10 as described above are each equipped with various logic and intelligence for service features that enable the gateway devices to provide various integrated digital services to the premises, as described herein with respect to FIG. 3, the network-based elements of the service management center 50 supports and manages multi-services gateway devices, for instance, so as to control the accessibility to functionalities and service features provisioned in the gateway devices and the ability to communicate with other gateway devices and various digital endpoint devices connected thereto. These elements that support and manage the gateway devices 10 comprise the ASM module described above with reference to FIG. 1. These ASM elements may, for example, provide the necessary data to the ASE and ASL modules so that they may carry out their respective functions, oversee the overall integration and communication among all the modules and the services that are managed by the ASM, manages the overall security and integrity of the ASD, and maintains alarm, statistical, subscription and provisioning data, and data necessary for the integration of services from third-party service providers, e.g., media content aggregators.

Examples of various ASM functionalities performed at the service management center 50, from the Service Provider Network regime, include but are not limited to: service initialization of the gateway devices, providing security for the gateway devices and the network support infrastructure, enabling real time secure access and control to and from the gateway devices, distributing updates and new service options to the gateway devices, providing service access to and from the gateway devices and remote access to the gateway devices, but not limited to such. In support of these services, the service management center 50 provides the following additional services and features: authentication; multi-service registration; subscription control; service authorization; alarm management; remote diagnostic support; billing collection and management; web services access; remote access to gateway devices (e.g. via SIP or Internet/web based communications); reachability to access challenged gateway devices; software updates; service data distribution; location service for all services; SIP VoIP service; media services; backup services; sharing services; provisioning; gateway interfaces to other service providers (Northbound and peering); load balancing; privacy; security; and network protection.

The logical network architecture for the service management center network 50 delivering these capabilities is illustrated and described in greater detail in U.S. Provisional Application No. 60/882,865 Filed Dec. 29, 2006 entitled "A MULTI-SERVICES APPLICATION GATEWAY AND SYSTEM EMPLOYING THE SAME," and of U.S. Provisional Application No. 60/882,862 Filed Dec. 29, 2006 entitled "SYSTEM AND METHOD FOR PROVIDING NETWORK SUPPORT SERVICES AND PREMISE GATEWAY SUPPORT INFRASTRUCTURE;" and the disclosures of the service management center network and its operations from those applications are entirely incorporated herein by reference.

With the gateway architecture implementing the Application Service Provider Demarcation (e.g. FIG. 2 and FIGS. 3A-3C), the demarcation in accessibility to hardware resources of the gateway device 10 delineates a portion of the storage accessible by a user via an endpoint device from an application service provider portion of the storage containing the application service programming and/or data of the application service provider. For example, the user of an associated endpoint device may be able to store and retrieve data files in the user accessible portion of the storage of the gateway device 10. The application service provider, in turn, can control storage and retrieval of data files in the application service provider portion via the of the wide area network as well as installation and configuration of various software/firmware logic modules. However, as outlined above, the user access to the logic and resources between the two demarcations is limited. The application service programming only provides a logical application service interface across the Applications Service Provider Demarcation, for delivery of one or more application services to an endpoint device. The user can obtain and use the application service and its features but can not access the underlying application service logic or its configuration data. For example, the user of the associated endpoint device is prevented from accessing one or more of the data files in the application service provider portion of the storage media. For some service applications, the application service provider can allow storage and retrieval of data files in the application service provider portion via the wide area network, for other gateway devices. Also, the logical location of the demarcation line separating the portions of the storage is controllable by the application service provider, from the service management center 50, via the wide area network 99 and the second interface. To illustrate these points, it may be helpful to consider some examples.

FIG. 5A conceptually depicts the logical demarcation in a storage media, between a portion thereof accessible by the user and a portion thereof that is accessible and controlled by the application service provider. In the example, the delineation provides isolation of downloaded service logic and associated data for implementing services from service provider and/or downloaded content from a user generated content.

As shown in FIG. 5A, the gateway device 10 includes functionality for logically combining the storage available from its own internal and attached hard drive(s) 154, with any Network Attached Storage (NAS) device 158 available via the wide area network to create a single virtual file system that consumers can use like a single drive. The gateway device 10 will automatically detect, mount and manage the connections to the NAS devices and add them to its own file system. Users of the gateway device 10 are thus presented with a single consolidated storage device that they can access just like another drive on their PC. Users will not be exposed to the underlying protocols and management features required to provide such a feature. Users no longer have to use each of the storage devices separately.

However, as further shown in FIG. 5A, a virtual demarcation 155 is enforced at the centralized disc storage device 154 of the gateway device 10, e.g., which may comprise one or more physical hard drives. The demarcation 155 is essentially the extension of the Application Service Provider Demarcation (FIG. 2) that extends through the gateway storage 154. With respect to the storage 154, the virtual demarcation 155 physically and logically isolates the storage partition or portion 156 where service logic and associated data for implementing services from the application service provider and/or downloaded media content controlled by that service provider are stored, from another partition or portion 157 where user generated data, e.g., user files, is stored. Thus, the portion 156 of storage 154 belongs to the application service provider and is accessible by the service management center 50. The application service provider can use the portion 156 for receiving logic and intelligence for the device 10, and backed-up user files, all of which is managed by the service control center 50 and enforced locally at the ASE logic in the gateway device 10. However, the other portion 157 of storage 154 is storage that is user accessible and includes a user accessible graphic user interface (GUI) which may be accessed by a digital endpoint device, e.g., a PC, programmed to enable visibility if granted to the user. Thus, the user is enabled to skew the demarcation point depending upon the amount of control granted or authorized to the user according to subscribed features and service configurations. However, the demarcation location is controlled by the application service provider. This separation within the gateway device 10 is an enabler for delivery of the service logic that resides on the device on the network side of the virtual demarcation. That is, the service provider offers all of its services upstream of this demarcation point; and the customer can choose which service is selected that is within the control of the service provider's network.

While the service center 50 is responsible for placement of service modules and data beyond the demarcation 155, the gateway device 10 is equipped with certain functional elements such as encryption techniques, local directory obfuscation techniques and local enforcement to prevent user visibility beyond the demarcation 155 that belongs to the service provider unless the user is enabled with such visibility. The intelligence and service logic that is on the gateway device 10 is managed by the service center 50 and provides the logic to limit user access.

FIG. 5B illustrates the virtual demarcation 155 within storage 154 of the gateway device 10 located on the customer premises, and this drawings provides examples of how the location of the demarcation 155 is moveable. The logic allows the customer to skew the location of the demarcation, albeit, within limits enforced by the logic managed by the application service provider. The provider also can adjust the location of the demarcation within the storage 154 on gateway device 10. The demarcation within this device can occur on a physical storage medium, e.g., a hard disk drive 154 that has been sectored for different users, or in a virtual memory location, e.g. locations 155a, 155b or 155c, based on the service levels being offered, e.g. service A, service B or service C, respectively. This approach allows the customer more flexibility in manipulating the service rendered and services offered by the provider. By allowing the demarcation closer to the customer this allows more control of features from the customer and allows the service provider closer control of the customer infrastructure without owning it all. Thus, with this device in place, the new demarcation moves based on the service.

For an example of demarcation control, if some data is required to be stored, e.g., a downloaded movie, the customer can store it locally, securely locally, or securely remotely. While it is the customer's responsibility to do storage locally and securely locally, with the virtual demarcation, the service of providing locally secure data is now part of an offering of the service provider. While the data is still on site, the data is under control of the service provider and follows service agreements for that storage of data.

As another example of demarcation control, movies may be downloaded and stored at the service provider's side beyond the demarcation 155, as requested by a user via a user interface through a device connected to the device. This user interface, enabled via the user side of the Application Service Provider Demarcation of the gateway device 10, is accessed through a PC, a TV, cell phone. After authentication, the user could select and prioritize movies to purchase for example, in compliance with the media content service provider. The choice of interfaces and amount of visibility by endpoint devices accessing this user interface may be optimally designed from a contention standpoint from the perspective of controls, security, network service control manageability, and cost. A selected movie is downloaded to the service center's portion 156 of the storage 154 as shown in FIG. 5A. Unless and until the user has purchased the movie for playback via an authentication process, that user will be prevented from accessing the content. Otherwise, the user may initiate streaming of the content directly to a digital endpoint device, e.g., a television, or will be granted permissions to download and play the movie according to the subscription with the media content provider as managed by the gateway device. If the user has purchased the movie, the movie may be transferred physically to the user storage portion 157 of the storage 154. Otherwise, the content may be temporarily copied, for local storage by the user at the user accessible portion of the demarcation point for playback at the user endpoint device.

Another example of demarcation control is the manipulation of features for a given service. Currently a subscription order is processed, and these features are manipulated within the service provider's network and sent down to the customer for provisional changes to equipment at the service center's side of the demarcation point. The location of the demarcation can be adjusted to meet storage space needs on either or both sides, as needed for various services offered to this user or even services provided to other users. Via a GUI established for the endpoint device when connected with the gateway device 10, when authenticated, files may be unlocked so the customer may locally manipulate services before and after the Application Service Provider Demarcation, thereby virtually shifting the point or location of the demarcation. Thus, a virtual demarcation allows the application service provider flexibility in offering different services and features. Examples of relevant services include, but are not limited to services such as: parental control, advertisement monitoring and replacement, home user habit monitoring, home channel monitoring, and back-up services.

In one service example, the gateway device 10 and service management center 50 provide a file management feature generally including functionality that enables a user to back-up files or content to a virtual memory storage area provided in the gateway device 10, and then subsequently forward the backed-up files to an external wholesale service provider providing the backup service. Thus, gateway storage device 10 provides the protected storage for user files and user content at its side of the demarcation point in a two-stage storage process: 1) storing the content across the virtual demarcation point (partition); and then, encrypting the content; and, 2) dispersing the stored content to other gateway devices, or at another storage location provided by the service center or by a partnered third party back-up storage service provider. This could be performed automatically; on a scheduled basis, or on demand as requested by a user. The gateway device 10 knows where the data portions will be stored, based on the service configuration and subscription. Backup may be on a central host operated by the application service provider; or in an implementation discussed more below, the backup files and/or portions thereof may actually reside in the service provider's portion of storage in other gateway devices. The locations of devices that may back up content pieces are known at the network level, e.g., hardware IDs of each of the other gateway devices are known based on the unique identity of the device, and the mappings of the IP addresses of the devices that change dynamically are known at location servers provided by the service management center 50, so the location of backed-up content for a user is always known.

In a further aspect of the file-sharing service, the gateway device 10 and service management center 50 may provide a hosted service-virtual space on the centralized disk storage at the gateway device for users. Dedicated areas of user storage may be designated as sharable—including application level sharing for any application that has data. As shown in FIG. 6, this virtual storage area 159 may be combined from its internal hard disc storage with any network attached storage device located at the network to create a singe virtual file system that consumers can use like a single drive.

FIG. 7 depicts basic steps of an overall process 800 for back-up file services using a third party storage provider according to certain aspects. As shown, in a first step 801, the device has been programmed to initiate an automatic back-up process at the PC endpoint. Then, at step 803, the files to be stored from a user device, e.g., a PC, are first compressed, encrypted and transferred to the gateway device 10. Referring back to FIG. 5A, this service may be configured to automatically implement a transfer 158 of user data or files from an attached user controlled portion 157 of storage 154 to be backed-up. Optionally, the gateway device 10 may compress and encrypt the data. After any such processing, the transferred data or files are stored at the application service provider side 156 of the virtual demarcation 155 (the encrypted partition) where the service management center 50 has visibility. Then, the device File Manager module of the gateway device 10 starts the Backup Manager module, which performs the File Backup to a Data Center which may be implemented as part of the service management center 50. A Backup Manager functionality in the service management center 50 checks to see if the user is subscribed, and if so, proceeds to create an index of backup data and obtain an access key from the backup service provider 96, as indicated at step 806. Once authorized, the back-up service key is provided to the user's gateway device 10 at step 807. Then, in stage 2 of the back-up process, as indicated at step 810, the backed-up files are transferred with the service key to the third party storage provider 96 via the wide area network. Then, once successfully stored at the third party back-up storage service provider 96, a positive acknowledgement is communicated from the service provider to the gateway device 10 as indicated at step 812.

As controlled by the management service center 50, in an alternate embodiment, the encrypted content to be stored is transmitted to at least one other gateway device 10, for storage at a location 156 beyond the respective demarcation 155 for service provider storage in the storage 154 of the other gateway device(s). If multiple other gateway devices 10 are used for this service, the user's data or files can be back-up in a distributed, safe and redundant manner on the provider's storage portion 156 of the other devices 10. That is, each file may be partitioned into a plurality of pieces for further transfer or storage in a redundant and secure manner, e.g., and transferred to the service provider portions 156 behind the virtual demarcations 155. These pieces may then be encrypted and sent out externally for further storage, automatically, e.g., at time of log-in, on a scheduled basis, or, upon user initiation.

Before describing FIG. 8, some definitions are provided with respect to certain terms as they relate to peer to peer systems. A "zone" is considered an addressable space, often associated with a node, which represents the ID of the node for the purposes of a file distribution method. A "neighbor zone" is a peer node to a specific zone, or node, with the specific zone maintaining state about the neighbor zone. A "neighbor area" consists of a number of neighbor zones. The neighbor area may be defined by the coordinates of the overlay network.

FIG. 8 illustrates an exemplary process demonstrating the "peer-to-peer" file backup in which files are backed up on different gateway devices 10. For purposes of explanation with respect to this figure, the different gateway devices 10 will be referred to as Appliance1 and Appliance2 respectively. At 1802, Appliance1 determines backup files and may save the files on the Appliance1. At 1804, Appliance1 creates a backup file label. Such a backup file label may be, for example, a label associated with a backup file. At 1806, Appliance1 hashes the backup file label to generate backup file id. At 1808, Appliance1 routes a backup request with address backup file id to a peer-to peer node, e.g., Appliance2, whose zone covers the backup file id. This routing to another gateway device 10, in this case Appliance2, in certain embodiments, uses the gateway-to-gateway peer-to-peer communication mechanism described above. At 1810, Appliance2 determines available backup space over its neighbor zones. This determination may also be performed by the Appliance2 querying the gateway devices in its neighboring zones using the gateway-to-gateway peer-to-peer communication mechanism described above. At 1812, Appliance2 receives reports of disk availability from other gateway devices in its neighbor zones. At 1814, Appliance1 receives IP addresses of gateway devices with available storage space in the neighbor zones of Appliance2. At 1816, if space reservation is not successful, steps 1804 to 1814 may be repeated to reserve storage for backup in other gateway devices (appliances). At 1818, if space reservation is successful, Appliance1 encrypts the backup file. In certain embodiments, Appliance1 breaks up the backup file into n blocks at 1820. At 1822, Appliance1 generates n+m blocks of erasure codes. In general, an erasure code transforms a message of n blocks into a message with greater than n blocks such that the original message can be recovered from a subset of those blocks. At 1824, Appliance1 transfers, for example using the secure gateway-to-gateway peer-to-peer communication mechanism described above, the blocks to n+m gateway devices (appliances), that is, those determined to have storage space available, for example, those gateway devices in the neighboring zones of Appliance2. In certain embodiments, different blocks may be transferred to different gateway devices. Further, each block may be stored redundantly, for example, on more than one gateway device. At 1826, information associated with this backup, for example, Appliance1's id, backup file label, and area boundary coordinates of Appliance2 and IP addresses of the gateway devices that have storage space available for backup may be reported to the support network.

FIG. 9 illustrates an exemplary processing for restoring files backed up using the method described with reference to FIG. 8 in certain embodiments. Again, for purposes of explanation with respect to this figure, the different gateway devices 10 will be referred to as appliances. At 1852, Appliance1 determines the backup file label associated with a file being restored and area boundary associated with the gateway appliances storing the file. At 1854, Appliance1 hashes backup file label and generates backup file id. At 1856, Appliance1 routes, for example, via peer-to-peer communication as described above with respect to gateway-to-gateway communication, a retrieval request with address backup file id and area coordinates to another gateway node, Appliance3, whose zone covers backup file id. In certain embodiments, Appliance3 need not be the same Appliance2 described in FIG. 8, although it can be in certain embodiments. At 1858, Appliance3 transmits a retrieval inquiry over neighbor gateway devices (appliances) within the area coordinates. At 1860 the gateway devices (appliances) in Appliance3's neighbor or area zone report whether they have one or more file blocks associated with backup file id. At 1862, Appliance3 reports IP addresses of the appliances holding file blocks associated with backup file id. At 1864, Appliance1 fetches the blocks from those gateway devices storing the file blocks, decodes erasure codes into a file at 1866, and decrypts the file at 1868. At 1870, Appliance1 may inform a user that file restore has completed successfully. At 1872, old backup file blocks may be cleared.

Hence, the gateway device 10 interoperates with the network support to provide data backup and restore services. For instance, the gateway device 10 may include a user interface and application or like functionality for allowing users to select files, for example, stored on a user's PC, on the gateway device 10 or other endpoint devices for the backup and restore services. The term "file" as used herein comprehensively refers to files, folders, directories, any data in any format, for example, media, ASCII, etc. The gateway device 10, as discussed above, may encrypt and compress, and transfer the files to a backup storage. In certain embodiments, the backup storage is a storage provided by the remote third party backup service data center 96. In such embodiments, data is backed up to and restored from the backup service data center 96, for instance, via interoperating with the support network, which for example, interfaces to the remote third party backup service data center 96. In certain other embodiments, this backup storage may be at the gateway device 10 itself, for instance, on the non-user accessible region of the gateway device storage that is only accessible by the services support network, as discussed earlier. Yet in other embodiments, files are backed up in a distributed manner on the non-user accessible region of other gateway devices 10, for example, which may reside at other premises. For instance, a file may be divided into multiple parts and each part may be backed up on different gateway devices. Further, one or more parts may be backed up redundantly, that is, on multiple gateway devices 10. Combinations of any of the above-described embodiments may be utilized for backup and restore services. In certain embodiments, a user may provision and subscribe to the type of backup services desired with the provisioning and/or subscription service as described above.

It should be understood that in addition to backing up files originating from endpoint devices, the disclosed systems and methods back up files from the gateway device 10 itself, including non-user files. Such files may include, but are not limited to, configuration files, service files, billing files, as well as files that the gateway device 10 is backing up that came from other gateways. In other words, all of the files of the gateway device 10 can be backed up, to a central storage location or in a distributed manner to other gateway devices 10. This redundancy in backing up files allows for easy replacement or restoration of a gateway device 10 at a premises, which can be catastrophically damaged, by fire for example. As all, or some selected portion of the files of the gateway device 10 are backed up, centrally or in a distributed fashion, it becomes relatively simple to restore the files to the gateway device 10 or to a new gateway device 10, by pulling the backed up files from the central storage location or the distributed storage locations (e.g., other gateway devices 10). Since the backing up of the gateway device 10 files involves files of which the user may not even be aware, the backing up of the gateway device 10 may be made automatic, on a scheduled basis, or on demand from the service management center 50, or on demand from the user.

It is understood that, in connection with the implementation of backup services provided by partnered third party providers, for example, the gateway device is configured to communicate with the backup file service provider 96 via the web interface and thus requires the URL of the service provider 96 for where the gateway device 10 should communicate. Configuration data is provided to the gateway device 10 from the subscription manager as part of the initialization process, that queries the service providers 96 to obtain configuration data that can be sent back to the gateway device, and determine which versions from a configuration perspective to report back to the gateway device. For backup services this may be a version 1 at URL 1 so the gateway device 10 should go to this location or, based on the location of the gateway device 10 may be sent to URL 2. For each service, configuration data is provided to the gateway device 10. This is all based on handshaked communications. When the user invokes the service, the gateway device 10 knows all that it needs to invoke the service.

The file backup service involves file management. To receive file backup service, a user will typically be required to subscribe to such a service. The file backup service can be charged, for example, based on used storage space in the data center, on a monthly basis. The files, which can be originally stored on the user's PC or other endpoint device, or on the gateway device at the user premises, that may be selected to be backed up into the data center (i.e., storage location) is managed by the file manager of the gateway device 10.

FIG. 12 is a block diagram depicting certain components in an arrangement to provide file backup service. Components in this diagram that are relevant to the discussion of file backup will be discussed, while other components that are not relevant will not be described. Also, in this example, it is assumed that the file is linked up at a central storage location, such as at the backup service provider 96. In FIG. 12, a backup file is encrypted and compressed before it is sent to the backup service provider 96. If the backup file originates from gateway device home storage, it will be encrypted and compressed by the backup manager 200. If the backup file originates from a PC 30 or other endpoint device, it will be encrypted and compressed by the PC 30 or other endpoint device.

In order to restore a backed up file from a wholesale backup provider, a reversed procedure will be performed. If a restored file is sent to the gateway device home storage, the backup manager 200 of the gateway device 10 will uncompress and decrypt the file before the file is placed in a designated home storage folder 202. If the restored file is sent to the PC 30 or other endpoint device, the PC client 30 or endpoint client will uncompress and decrypt the file after ftp from the gateway device home storage, then place the file in the designated PC folder 204 (or other endpoint device folder). These files can be accessed by a browser, for example.

The system includes a number of databases, these databases including include system level data, file data, and file backup data. For system level data, in certain embodiments, three tables are managed by the user management module (see FIG. 3B, Services Framework 120) in the gateway device 10. These tables are not illustrated specifically as the tables are conventional in structure, but their exemplary contents will be described below. One table may contain user information (the user information table), and contains the information of a PC user, for example, who is a gateway device user also. The same user can be registered on multiple PCs 30.

Some of the information in the user information table can include a unique id of a user, the login name of the user, and a password.

Another table is the host information table, which contains the information related to a PC 30 or other endpoint devices. This information can include the unique id of a host, the host name, a host MAC address, and online/offline status, for example. The third table may be a host user table, for example, that contains a mapping pair of a host and a user to handle multiple-to-multiple relation between user and host.

The file database has a file information table that contains metadata information of files that are backed up and/or shared. Each folder itself is a file and has a corresponding file information record in the table. For each folder level, file query is based on a folder id. A folder's file id is used as a folder id by the files that belong to this folder.

Certain gateway device home storage predefined folders are provided in the file table by default. When the user selects files for backup or sharing, if their home storage folders 202 or PC folders 204 do not have corresponding instances in the database, the new instances have to be inserted into the file information and file folder tables by a browser via a web server. Exemplary predefined folders may include: documents, games, movies, music, pictures, presentations, etc.

A folder information table provides a complete path of the storage folders of the gateway device and related PC or other endpoint device folders. The folders are used in file backup, restore and sharing.

A tag information file provides a description of a tag that will be attached to a selected file. The tag is used for flexible file searching.

The file backup data database includes a backup information table, which provides a part of the backup setting, identified with a backup name by the user and queried by a backup id internally. The user is able to select between backing up now, setting a one-time schedule for backing up, or setting a repeated backup schedule. When the user sets a schedule, an associated backup schedule information record is created.

A backup file information table contains file ids of selected files for backup. This can contain the file id, the backup id, the folder id and the status, for example.

A backup schedule information table contains backup schedule information of each scheduled backup setting, which is identified with its schedule name by the user and queried by its schedule id internally. The table contains attributes such as schedule id, schedule name, schedule type (e.g., daily, weekly, monthly), schedule day, schedule time and status.

A backup execution information table contains log information of each execution of each backup setting. Some of the attributes in the table include backup exec id, backup id, execution time, status, and error code.

The backup file detail stores backup history details. These include which files are backed up at what time with which file name in the data center at the backup service provider 96. This table is also used by the user to select files for file restore. Some of the attributes in the table include file id, backup exec id, folder id, file size, home storage file create time, home storage file modify time, PC file create time, PC file modify time, backup time, network file name, status, and error code. When the user selects a file or folder for backup, the backup file information shall have folder id set to zero; while all files under a folder shall have their backup file information with folder id set equal to the file id of the folder.

A restore file detail table contains a history log of restores. When a file restore is executed, a new restore file detail is created to record its execution information. Some of the attributes in the table include file id, restore time, file size, backup exec id, status and error code. When the user is doing restore, the browser only displays files with folder id equal to zero, which is what the user selected when performing the backup. If the user wants to expand a folder in the list, the browser shall be able to obtain its files by using the folder id.

When a user with an endpoint device associated with a gateway device 10 adds backup service, a backup account for that gateway device 10 will be set up and secure access for the gateway device 10 to the backup service provider 96 is created. The file manager 206 and the backup manager 200 (FIG. 12) need not be notified at this time, as no active backup set is yet defined. A backup set is also known as a backup job, or an instance of a backup, and these terms may be used interchangeably. The backup manager 200 can obtain certificate and key information later, when a backup job is started.

Upon a user cancelling backup service, a subscription manager 208 at the service management center must notify the file manager 206 to stop all existing and scheduled backup activities before closing the user's backup account.

FIG. 13 schematically depicts an exemplary subscription process. Referring also to FIG. 12, the user employs a browser 210 through a web server 212 to send a message to subscribe to the backup service at 300. A subscribe to the backup service message is sent from the web server to a provisioning manager 214 at the service center at step 302. The provisioning manager 214 requests the billing manager 216 to set up an account for backup service, step 304. The billing manager 216 then opens the account with the backup service provider 96 in step 306. Once the account is opened, the backup service provider 96 issues an account key and/or a secret key, which is received by the service management center 50, in step 308. The provisioning manager 214 sends a configuration message to the backup manager 200 of the service management center 50 (step 310), which then downloads the configuration to the gateway device 10 at step 312.

FIG. 14 depicts an exemplary process to cancel a backup service. The user can specify a date to actually stop the service. The subscription manager 208 will stop the backup service immediately or on a specified by setting a timer. The browser 210 sends a cancel backup service subscription message via the web server 212 to the provisioning manager 214 of the service management center 50, in steps 320 and 322. If the service is to terminate immediately, the provisioning manager 214 sends a stop backup service message to the backup manager 200, which sends a message to the gateway device 10 to stop the backup service (steps 324 and 326). All backup is then stopped at the gateway device 10, and a done signal is sent to the backup manager 200 (step 328). A cancel account signal is provided by the backup manager 200 to the billing manager 216 after the backup manager 200 receives the done signal from the gateway device 10 (step 330). The billing manager 200 requests and receives a last bill from the backup service provider 96 (steps 332 and 334). The backup manager 200 sends a message to the backup service provider 96 closing the account (step 336). If the backup service is not to terminate immediately, but at a later time, a timer is set (step 338), at which time the provisioning manager 214 sends the stop backup service message to the backup manager 200, with the rest of the procedure following as above described.

FIG. 15 schematically depicts an exemplary process to stop all backup service. When the cancellation of backup service becomes effective, the subscription manager 208 notifies the file manager 206. Upon this notification, the file manager 206 stops all running of the backup and restore, and stops all scheduled backup jobs. In addition, the file manager 206 cleans up backup data in the database of the gateway device 10 and a temporary folder used for backup and restore. As seen in FIG. 15, the file manager 206 resets backup and restore flags. For backup timers, the timer is deleted (step 340). Temporary files to be backed up are depleted in step 342. Backup file information is deleted in step 342. Backup schedule information is deleted in step 346. Backup information is deleted in step 348. The log is deleted in step 350.

FIG. 16 depicts an exemplary process for starting the file manager 206, which is started (step by the platform manager (see platform manager 110 in FIG. 3b) during initialization of the gateway device 10. The file manager 206 starts the backup manager 200 (step 354), which manages file backup to the backup service provider 96. The backup manager 200 checks with the subscription manager 208 in step 356 to determine if this gateway device 10 has subscribed for backup service or not. If the gateway device 10 has subscribed, the backup manager 200 obtains the backup certificate and/or key information (step 358). When the file manager 206 starts, it performs a number of initialization activities, including finding incomplete backup jobs that started before the file manager 206 restarted, and continues these incomplete backup jobs until complete (step 360). The file manager 206 also finds incomplete restore jobs and continues them until complete (step 362). Further, the file manager 206 initializes timers for all scheduled backup settings (step 364). The file manager 206 queries the database for a backup schedule (step 366) and receives the backup schedule (step 368) The file manager 206 also processes timeouts (step 370).

FIG. 17 depicts an exemplary process to create a backup set. To backup files, the user creates a backup set (or "backup job") using the browser 210 through the web server 212 (step 380). This causes a backup information instance to be inserted into the database of the gateway device 10 by the browser 210 (step 382). The database provides a backup id to the web server 212 (step 384) The user then selects files for the created backup set (step 386). The files included in the backup set will be backed up when the backup set is executed. Three backup modes include: backup now (step 388), one-time schedule, and repeated schedule (steps 390, 392 and 400). In the scheduled modes, the backup schedule information is inserted in the database interface (step 398) and a set timer signal is sent by the file manager 206 to the timer manager (step 402).

FIG. 18 depicts an exemplary process to add a backup file. If a single file is to be added, the browser 210 sends an add backup file message to the web server 212 (step 404). If there is no file information, the web server 212 inserts file information into the data base in step 406. Backup file information is inserted into the database in step 408. Similar steps are performed for folders with multiple files, in steps 410-416.

FIG. 19 depicts the modifying of a backup set and FIG. 20 depicts the process of deleting a backup file. The user can modify a backup set by adding and deleting backup files to and from the backup set (step 420), and by changing the backup schedule (step 422) and/or the backup mode. The adding of the backup file is as depicted in FIG. 18, while deleting a backup file is performed as depicted in FIG. 20. The browser 210 inserts or deletes corresponding backup file information and updates backup schedule information as needed.

FIG. 20 depicts an exemplary process to delete a backup file. The browser 210 deletes backup file information and updates backup schedule information (steps 424 and 426). This process is performed for a single file or for multiple files and folders.

A first mode of backup is the backup now mode, an exemplary process being depicted in FIG. 21. After setting a new backup set or selecting an existing backup set (such as in FIG. 19), the user is able to select "backup now" to immediately activate a backup action. This triggers the browser 210 to update the relevant file information status to backup and sends a backup now message (step 430) to the file manager 206. The file manager 206 retrieves file information from the database based on their status, in steps 432-438. When the file manager 206 has more backup file information, a backup one file procedure is performed (step 440), an exemplary process being show in FIG. 22.

To make the backup function more efficient, the file manager only backs up those files that have been changed since the last backup was performed. FIG. 22 depicts the backup of one file. The file manager 206 compares the real file time stamp with its corresponding file information time stamp (step 442). If the file information time stamp is older than the real file, that means this file has been changed and needs to be backed up. If the backup file is a home storage (HS) file, the file manager 206 directly requests the backup manager 200 to back the file up to the backup service provider 96 (step 450). If the backup file is a PC file, the file manager 206 sends an "ftp from PC to HS" request to the PC client 30 (step 452). After the file is copied to the home storage, the file manager 206 will request the backup manager 200 to back up the file to the backup service provider 96.

As depicted in FIG. 23, a scheduled backup is triggered by a timer, at the gateway device 10, for example, or at the endpoint device. If there is an ongoing execution of the same backup set as the scheduled backup set, the scheduled backup set is delayed until the current execution of the backup set is finished (Hold). The file manager 206 provides a process timeout signal to the timer manager (step 460). If there is no existing scheduled backup of the current backup set, then a timeout handler is requested by the file manager 206 to the timer manager and the timer (steps 462 and 464). The timer manager sends a handle timeout signal to the file manager (step 466) which initiates the backup now process of FIG. 21 in step 468.

Figure 24A:
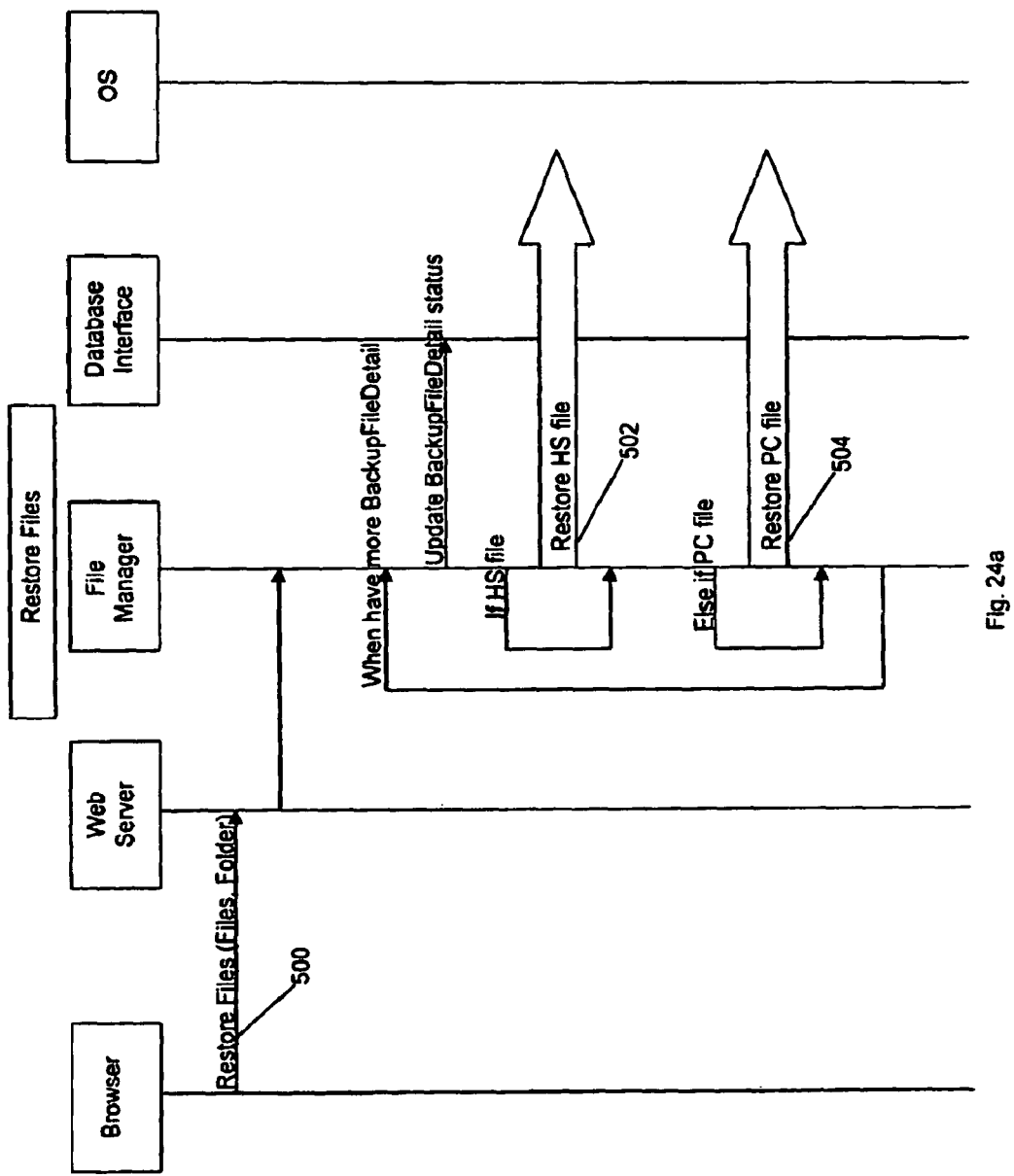

FIGS. 24a-d show exemplary procedures for restoring backed up files from a backup service provider to a user's gateway device 10 or to an endpoint device, such as a PC 30. Referring now to FIG. 24a, to perform a file restore, the user selects a backed up file from a backupfiledetail list, and provides the request to restore the file in step 500 with the browser 210 via the web server 212 to the file manager 206. The user specifies a restore location. As examples, the restore location can be the original location of the file, or a different location or folder. There are two different types of restores, either a home storage file restore (step 502, shown in more detail in FIG. 24b) or a PC file restore (step 504, shown in more detail in FIG. 24c). In both of the different types of restore, a restore file from backup service provider 96 step 506 is provided, corresponding to the procedure depicted in FIG. 24d.

Figure 24B:
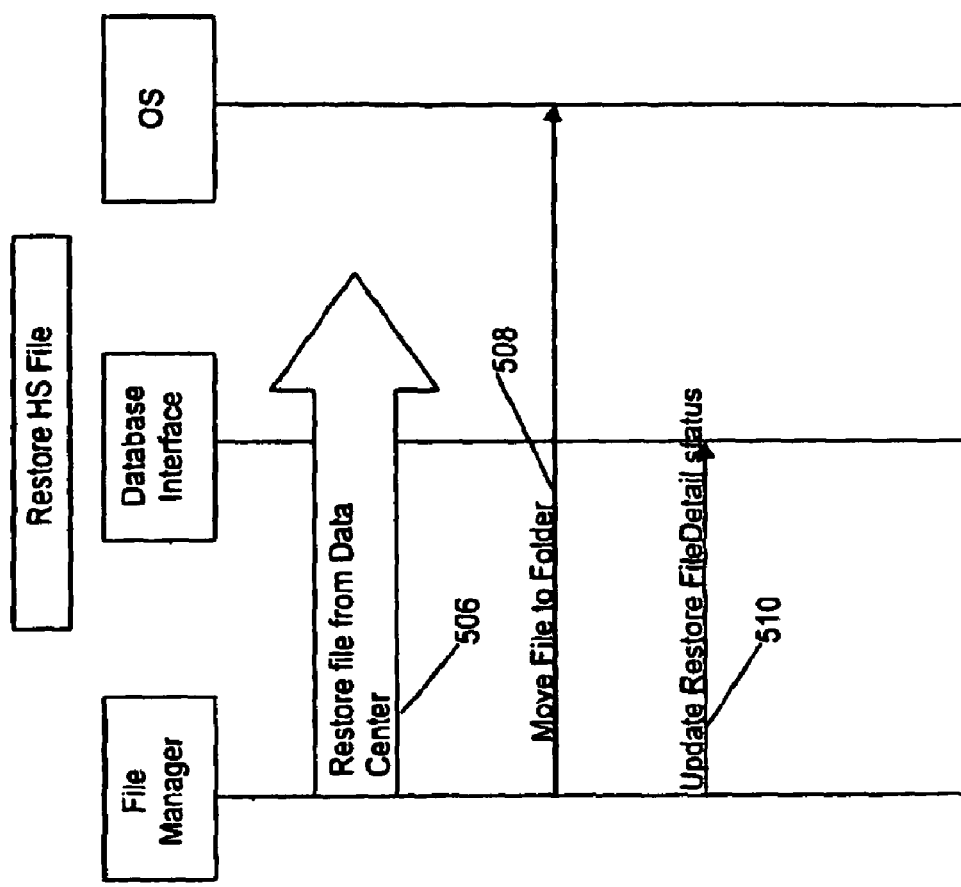

In FIG. 24b, the restore file from backup service provider process (step 506, FIG. 24d) is performed for a home storage file. Since the user wants to restore the file to a folder on the gateway device 10, the file manager 206 will move the file to a folder of the home storage in step 508. The backup file (BF) is retrieved from the data center to the user's gateway device 10. The status of the restore file detail is updated in step 510.

Figure 24C:
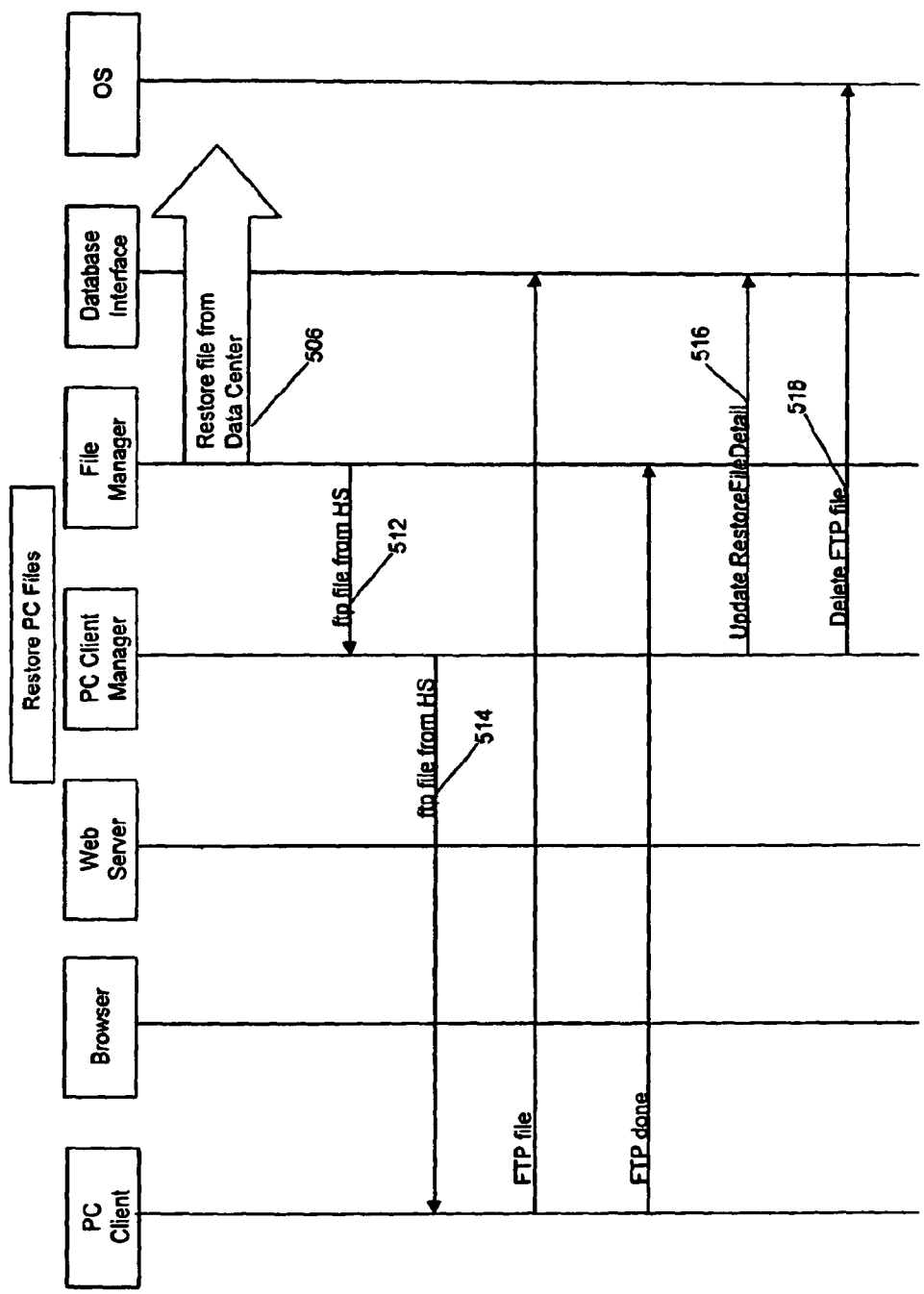

In FIG. 24c, the restore file from backup service provider process (step 506, FIG. 24d) is performed for a PC file. The file manager 206 will request that the PC Client manager ftp (file transfer protocol) the restored file from the HS to a folder of the PC or other endpoint device, which is performed in steps 512, 514. After the ftp to the PC folder is completed, the restored file on the home storage (OS) is deleted in step 518, and the restore file detail is updated by the PC client in the backup service provider (step 516) through the database interface.

FIG. 24d depicts an exemplary process for restoring files from a backup service provider 96. The file manager 206 updates the backup file detail at the backup service provider 96 (step 520) and requests the backup manager 200 to restore files (step 522). The backup manager 206: update the backup file detail (step 524), connects the gateway device 10 to the backup service provider 526, sftps a get file signal (step 528), updates the backup file detail (step 530), and inserts a restore file detail (step 532). The retrieved backup file BF is uncompressed and decrypted to its original form (step 534). The backup file is then deleted in step 536.

The above processes have been described with respect to a backup service provider 96. It should be understood that the processes are applicable to backups to a centralized storage location, or to distributed storage locations, such as other gateway devices external to the premises, as discussed earlier.

The gateway device 10 and its interactions with various endpoint devices and with the service management center 50 backup service provider have been described with reference to diagrams of methods, apparatus (systems) and computer program products. It will be understood that elements and functions illustrated in the diagrams, can be implemented by computer program instructions running on one or more appropriately configured hardware platforms, e.g. to operate as a gateway device 10 or as one or more systems implementing functions of the service management center 50. Hence, operations described above may be carried out by execution of software, firmware, or microcode operating on a computer other programmable device of any type. Additionally, code for implementing such operations may comprise computer instruction in any form (e.g. source code, object code, interpreted code, etc.) stored in or carried by any computer or machine readable medium.

Program aspects of the technology may be thought of a "products," typically in the form of executable code and/or associated data for implementing desired functionality, which is carried on or embodied in a type of machine readable medium. In this way, computer program instructions may be provided to a processor of a general purpose computer, special purpose computer, embedded processor or other programmable data processing apparatus to produce a machine, such that the instructions, which execute via the processor of the computer or other programmable data processing apparatus, so as to implement functions described above.

Terms regarding computer or machine "readable medium" (or media) as used herein therefore relate to any storage medium and any physical or carrier wave transmission medium, which participates in providing instructions or code or data to a processor for execution or processing. Storage media include any or all of the memory of the gateway device or associated modules thereof or any of the hardware platforms as may be used in the service management center, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer into another computer, for example, from the updater 51 a hardware platform for a gateway device 10 or from another source into an element of the service management center 50. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. Hence, the broad class of media that may bear the instructions or data encompass many forms, including but not limited to, non-volatile storage media, volatile storage media as well as carrier wave and physical forms of transmission media.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The invention claimed is:

1. A gateway device for operation at a user premises to provide and manage services of an endpoint device associated with the gateway device, the gateway device comprising:
   a first interface for enabling bi-directional network layer communications with the endpoint device associated with the gateway device, wherein the endpoint device includes data that is to be backed up;
   a second interface for enabling bi-directional communications with a service management center and at least one storage area external to the premises via a wide area network;
   a database containing an endpoint information table and an endpoint user table, wherein the endpoint information table contains information related to the endpoint device which includes a unique id of the endpoint device, a name of the endpoint device, a MAC address of the endpoint device, and a status of whether the endpoint device is available or unavailable, wherein the endpoint user table contains a mapping pair of the endpoint device and a user of the endpoint device such that the endpoint user table allows for multiple users including the user to be mapped to the endpoint device and allows for the user of the endpoint device to be mapped to multiple endpoint devices including the endpoint device;
   an endpoint manager module configured to initiate a backup process at the endpoint device by accessing the endpoint information table and utilizing the unique id of the endpoint device, the name of the endpoint device, the MAC address of the endpoint device, and the status of the endpoint device, wherein upon initiation by the endpoint manager module the endpoint device sends the data to be backed up to the gateway device;
   a service-managed storage area configured to store the data received from the endpoint device; and
   a backup manager configured to communicate via the wide area network with the service management center to determine whether the endpoint device is authorized to have the stored data backed up to the at least one storage area external to the premises, wherein upon confirmation from the service management center that the endpoint device is authorized to backup the stored data to the at least one storage area external to the premises, the backup manager sends the stored data received from the endpoint device to the at least one storage area external to the premises via the wide area network for storage therein, wherein the stored data sent to the at least one storage area is compressed and encrypted.

2. The gateway device of claim 1, wherein the data to be backed up sent from the endpoint device is at least one of encrypted and compressed when received by the gateway device.

3. The gateway device of claim 1, wherein the gateway device is further configured:
  to receive the data to be backed up sent from the endpoint device that is at least one of unencrypted and uncompressed; and
  to encrypt and compress the data from the endpoint device.

4. The gateway device of claim 1, wherein the gateway device is further configured to receive the data to be backed up sent from the endpoint device at a first time and send the stored data received from the endpoint device to the at least one storage area external to the premises via the wide area network for storage therein at a second, later time.

5. The gateway device of claim 1, wherein the backup manager is further configured to communicate with the service management center to receive a storage area access key in response to the endpoint device being authorized to have the stored data backed up to the at least one storage area external to the premises.

6. The gateway device of claim 5, wherein the backup manager is only allowed to send the stored data received from the endpoint device to the at least one storage area with the storage area access key.

7. The gateway device of claim 1, wherein the service-managed storage area is inaccessible by the user of the endpoint device.

8. The gateway device of claim 7, wherein the service-managed storage area is configured to receive and store at least a portion of data to be backed up from other gateway devices via the wide area network.

9. The gateway device of claim 1, wherein the gateway device is further configured to interact with a backup service provider to request a restore of the stored data on the at least one storage area to the endpoint device.

10. The gateway device of claim 9, wherein the gateway device is further configured to receive the stored data from the at least one storage area and to at least one of decrypt and decompress the stored data received from the at least one storage area, and
  send the stored data received from the at least one storage area to the endpoint device in order to restore the data stored on the at least one storage area and the endpoint device.

11. The gateway device of claim 1, wherein prior to sending the stored data to the at least one storage area the backup manager module sends an availability request to the at least one storage area and in response the at least one storage area sends the backup manager an availability of space for storage within the at least one storage area, and
  wherein the backup manager module sends a first amount of the stored data to the at least one storage area based on the availability of space within the at least one storage area.

12. The gateway device of claim 11, wherein the first amount of the stored data sent to the at least one storage area is less than a total amount of the stored data.

13. The gateway device of claim 11, wherein prior to sending the stored data to the at least one storage area the backup manager module sends the availability request to another at least one storage area and in response the another at least one storage area sends the backup manager an availability of space for storage within the another at least one storage area, and
  wherein the backup manager module determines that the stored data represents a total amount of data that is greater than the availability of space within the at least one storage area,
  wherein the first amount of the stored data that the backup manager module sends to the at least one storage area is equal to or less than the availability of space within the at least one storage area,
  wherein the backup manager module sends a second amount of the stored data to the another at least one storage area, wherein the second amount represents a remaining amount of the stored data that was unable to be included in the first amount of the stored data sent to the at least one storage area, and
  wherein a combination of the first and second amounts of the stored data is at least equal to the total amount of stored data.

14. The gateway device of claim 1, wherein the database further includes an endpoint data table that contains metadata information of the data to be backed up sent from the endpoint device including a pointer indentifying a location within the endpoint device for the data to be backed, and
  wherein the data to be backed up sent to the gateway device is associated with the pointer such that upon a restore process request from the endpoint device the gateway device obtains the stored data on the at least one storage area and sends the stored data to the location on the endpoint device identified by the pointer.

15. The gateway device of claim 1, wherein the data to be back up includes files stored in folders on the endpoint device,
  wherein the database further includes an endpoint file table that contains metadata information of files that are backed up, wherein each file is associated with a respective file id,
  wherein the database further includes an endpoint folder table that contains a path for accessing the folders on the endpoint device, wherein each folder is associated with a respective folder id,
  wherein the database further includes a backup endpoint file information table that contains the file ids and respective folder ids of the files selected for the backup process,
  wherein the endpoint manager module and the backup manager are operable control and coordinate the backup process via accessing the endpoint file table, the endpoint folder table, and the backup endpoint file information table.

16. The gateway device of claim 1, wherein the service management center sends the gateway device a service key upon confirmation that the endpoint device is authorized to backup the data to the at least one storage area external to the premises, and
  wherein the backup manager module sends the service key with the stored data to the at least one storage area such that the service key authorizes the at least one storage area to store the received stored data within the at least one storage area.

17. A method of managing backups and restores of data from an endpoint device associated with a gateway device, the gateway device in a user premises and configured to communicate with at least one storage area remote from the user premises, the method comprising:
  providing the gateway device, the gateway device including:
    a first interface for enabling bi-directional network layer communications with the endpoint device associated with the gateway device;

a second interface for enabling at least some bi-directional communications with a service management center and at least one storage area external to the premises via the wide area network;

a database containing an endpoint information table and an endpoint user table, wherein the endpoint information table contains information related to the endpoint device which includes a unique id of the endpoint device, a name of the endpoint device, a MAC address of the endpoint device, and a status of whether the endpoint device is available or unavailable, wherein the endpoint user table contains a mapping pair of the endpoint device and a user of the endpoint device such that the endpoint user table allows for multiple users including the user to be mapped to the endpoint device and allows for the user of the endpoint device to be mapped to multiple endpoint devices including the endpoint device;

an endpoint manager module in communication with the endpoint device and configured to initiate a back-up process at the endpoint device for the data to be backed up from the endpoint device;

a storage configured to store the data received from the endpoint device; and a backup manager in communication with the service management center to determine whether the endpoint device is authorized to have the stored data backed up to the at least one storage area external to the premises, initiating, by the endpoint manager module, the back-up process at the endpoint device by accessing the endpoint information table and utilizing the unique id of the endpoint device, the name of the endpoint device, the MAC address of the endpoint device, and the status of the endpoint device;

receiving data to be backed up from the endpoint device at the gateway device in response to the endpoint manager module initiating the backup process, storing the data received from the endpoint device on the storage of the gateway device;

receiving, by the backup manager, confirmation from the service management center that the endpoint device is authorized to backup the stored data to the at least one storage area external to the premises; and sending, by the backup manger after receiving the confirmation, the stored data received from the endpoint device to the at least one storage area external to the premises via the wide area network for storage therein, wherein the stored data sent to the at least one storage area is compressed and encrypted.

18. The method of claim 17, further comprising providing the backup manager with a storage access key, the gateway device sending the stored data to the at least one storage area with the storage access key in response to the endpoint device being authorized to have the stored data backed up to the at least one storage area external to the premises.

19. The method of claim 18, wherein providing the backup manager with the storage access key includes transmitting the storage access key from the at least one storage area to the service management center, and transmitting the storage access key from the service management center to the backup manager.

20. The method of claim 18, wherein the gateway device receives the data to be backed up from the endpoint device at a first time, and sends the stored data to the at least one storage area at a second, later time.

21. The method of claim 17, further comprising performing, by the endpoint device, at least one of encryption and compression on the data to be backed up prior to transferring the data to be backed up to the gateway device in response to the endpoint manager module initiating the backup process.

22. The method of claim 17, further comprising performing, by the gateway device, at least one of encryption and compression on the stored data prior to sending the stored data to the at least one storage area.

23. The method of claim 17, wherein the backup manager sends the stored data to the at least one storage area at a defined time and frequency.

24. The method of claim 17, wherein the storage of the gateway device is inaccessible to the user of the endpoint device.

25. The method of claim 24, further comprising recording at the gateway device usage of the at least one storage area.

26. The method of claim 25, further comprising sending usage records from the gateway device to the service management center.

27. The method of claim 25, further comprising preparing billing information for the user at the service management center based on the usage information.

28. A gateway device for operations at a user premises to provide and manage services of an endpoint device associated with the gateway device, the gateway device comprising:

a first interface for enabling bi-directional network layer communications with the endpoint device associated with the gateway device;

a second interface for enabling at least some bi-directional communications with a service management center and at least one storage area external to the premises via a wide area network;

a database containing an endpoint information table, wherein the endpoint information table contains information related to the endpoint device which includes a unique id of the endpoint device, a name of the endpoint device, a MAC address of the endpoint device, and a status of whether the endpoint device is available or unavailable;

an endpoint manager module configured to initiate a back-up process at the endpoint device by accessing the endpoint information table and utilizing the unique id of the endpoint device, the name of the endpoint device, the MAC address of the endpoint device, and the status of the endpoint device, wherein upon initiation by the endpoint manager module the endpoint device sends the data to be backed up to the gateway device;

a storage configured to store the data received from the endpoint device; and a backup manager configured to communicate via the wide area network with the service management center to determine whether the endpoint device is authorized to have the stored data backed up to the at least one storage area external to the premises, wherein upon confirmation from the service management center that the endpoint device is authorized to backup the stored data to the at least one storage area external to the premises, the backup manager sends the stored data received from the endpoint device to the at least one storage area external to the premises via the wide area network for storage therein, wherein the stored data sent to the at least one storage area is compressed and encrypted.

29. The gateway device of claim 28, wherein the data to be backed up sent from the endpoint device is at least one of encrypted and compressed when received by the gateway device.

30. The gateway device of claim 28, wherein the gateway device is further configured:
- to receive the data to be backed up sent from the endpoint device that is at least one of unencrypted and uncompressed; and
- to encrypt and compress the data to be backed up sent from the endpoint device.

31. The gateway device of claim 28, wherein the gateway device is further configured to receive the data to be backed up sent from the endpoint device at a first time and send the stored data received from the endpoint device to the at least one storage area external to the premises via the wide area network for storage therein at a second, later time.

32. The gateway device of claim 28, wherein the gateway device is further configured to receive information from the service management center configuring the backup manager to manage the backups and the restores of the stored data on the at least one storage area between the endpoint device and the at least one storage area.

33. The gateway device of claim 32, wherein the backup manager is further configured to communicate with the service management center to receive a storage area access key in response to the endpoint device being authorized to have the stored data backed up to the at least one storage area external to the premises; and
wherein the backup manager is only allowed to send the stored data received from the endpoint device to the at least one storage area with the storage area access key.

34. The gateway device of claim 28, wherein the storage is inaccessible by a user of the endpoint device.

35. The gateway device of claim 34, wherein the storage is configured to receive and store at least a portion of data to be backed up from other gateway devices via the wide area network.

36. A system for providing and managing services of an endpoint device comprising:
- a gateway device at a user premises, the gateway device comprising:
  - a first interface for enabling bi-directional communications with the endpoint device associated with the gateway device,
  - a second interface for enabling at least some bi-directional communications with at least one storage area external to the user premises via the wide area network,
  - a database containing an endpoint information table, wherein the endpoint information table contains information related to the endpoint device which includes a unique id of the endpoint device, a name of the endpoint device, a MAC address of the endpoint device, and a status of whether the endpoint device is available or unavailable;
  - an endpoint manager module configured to initiate a back-up process at the endpoint device by accessing the endpoint information table and utilizing the unique id of the endpoint device, the name of the endpoint device, the MAC address of the endpoint device, and the status of the endpoint device, wherein upon initiation by the endpoint manager module the endpoint device sends the data to be backed up to the gateway device;
  - a storage configured to store the data received from the endpoint device; and
  - a backup manager configured to communicate via the wide area network with a service management center to determine whether the endpoint device is authorized to have the stored data backed up to the at least one storage area external to the premises, wherein upon confirmation from the service management center that the endpoint device is authorized to backup the stored data to the at least one storage area external to the premises, the backup manager sends the stored data received from the endpoint device to the at least one storage area external to the premises via the wide area network for storage therein, wherein the stored data sent to the at least one storage area is compressed and encrypted; and
- the service management center in communication with the gateway device via the wide area network, the service management center controlling access by the gateway device to the at least one storage area.

37. The system of claim 36, further comprising an access key to the at least one storage area that must be received at the at least one storage area from the gateway device to cause the at least one storage area to store the stored data sent from the gateway device.

38. The system of claim 37, wherein the service management center is configured to receive and maintain the access key from the at least one storage area and to selectively provide the access key to the gateway device.

39. The system of claim 38, wherein the service management center is configured to authenticate whether the gateway device requesting a backup or restore is permitted to use a particular path for the backup or restore.

40. The system of claim 38, wherein the storage is inaccessible by a user of the endpoint device.

41. The system of claim 40, wherein the service management center is configured to manage the storage of the gateway device.

42. The system of claim 41, wherein the service management center is configured to communicate with the gateway device and cause the stored data to be partitioned into separate portions and cause the backup manager to distribute the separate portions to the another gateway device to be stored on a storage of the another gateway device.

43. The system of claim 42, wherein the service management center is configured to cause the separate portions stored on the storage of the another gateway device to be restored to the storage of the gateway device when the gateway device requests a restore and is authenticated for that restore.

\* \* \* \* \*